(12) United States Patent
Kada et al.

(10) Patent No.: US 6,611,871 B1
(45) Date of Patent: Aug. 26, 2003

(54) FIXED LENGTH DATA PROCESSING APPARATUS

(75) Inventors: Kazuhisa Kada, Osaka (JP); Hiroshi Murakawa, Osaka (JP); Shigehisa Sakahara, Osaka (JP); Hidenori Kiuchi, Osaka (JP); Hideaki Mochizuki, Kawasaki (JP); Ritsuko Okura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/280,762

(22) Filed: Mar. 29, 1999

(30) Foreign Application Priority Data

Aug. 6, 1998 (JP) .................................. 10-222975

(51) Int. Cl.[7] .............................................. H04L 12/56
(52) U.S. Cl. ...................................... 709/238; 370/395.1
(58) Field of Search ................................. 709/223–226, 709/230–238; 370/235, 241, 249, 395.1

(56) References Cited

U.S. PATENT DOCUMENTS 5,835,710 A * 11/1998 Nagami et al.
5,872,770 A * 2/1999 Park et al. ................. 370/249
5,974,045 A * 10/1999 Ohkura et al. ............. 370/395

FOREIGN PATENT DOCUMENTS

| JP | 8-204725 | 8/1996 |
| JP | 9-247184 | 9/1997 |
| JP | 410126418 A * | 5/1998 |

* cited by examiner

Primary Examiner—Emanuel Todd Voeltz
(74) Attorney, Agent, or Firm—Katten Muchin Zavis Rosenman

(57) ABSTRACT

A fixed length data processing apparatus has a registration holding unit holding registration information necessary to identify fixed length data that is an object of a processing commonly to transmission routes, and a data processing unit identifying whether received fixed length data is fixed length data that is an object of the processing or not on the basis of at least the registration information in the registration information holding unit to perform a data processing for fault management in the asynchronous communication on the basis of the fixed length data when identifying that the fixed length data is fixed length data that is an object of a processing correspondingly to the transmission route, thereby holding a large volume of information efficiently for identifying fixed length data to process fixed length data with a simple structure.

22 Claims, 47 Drawing Sheets

23~28:RDI 8 LB CELL FORMAT COMMON FIXED PATTERN

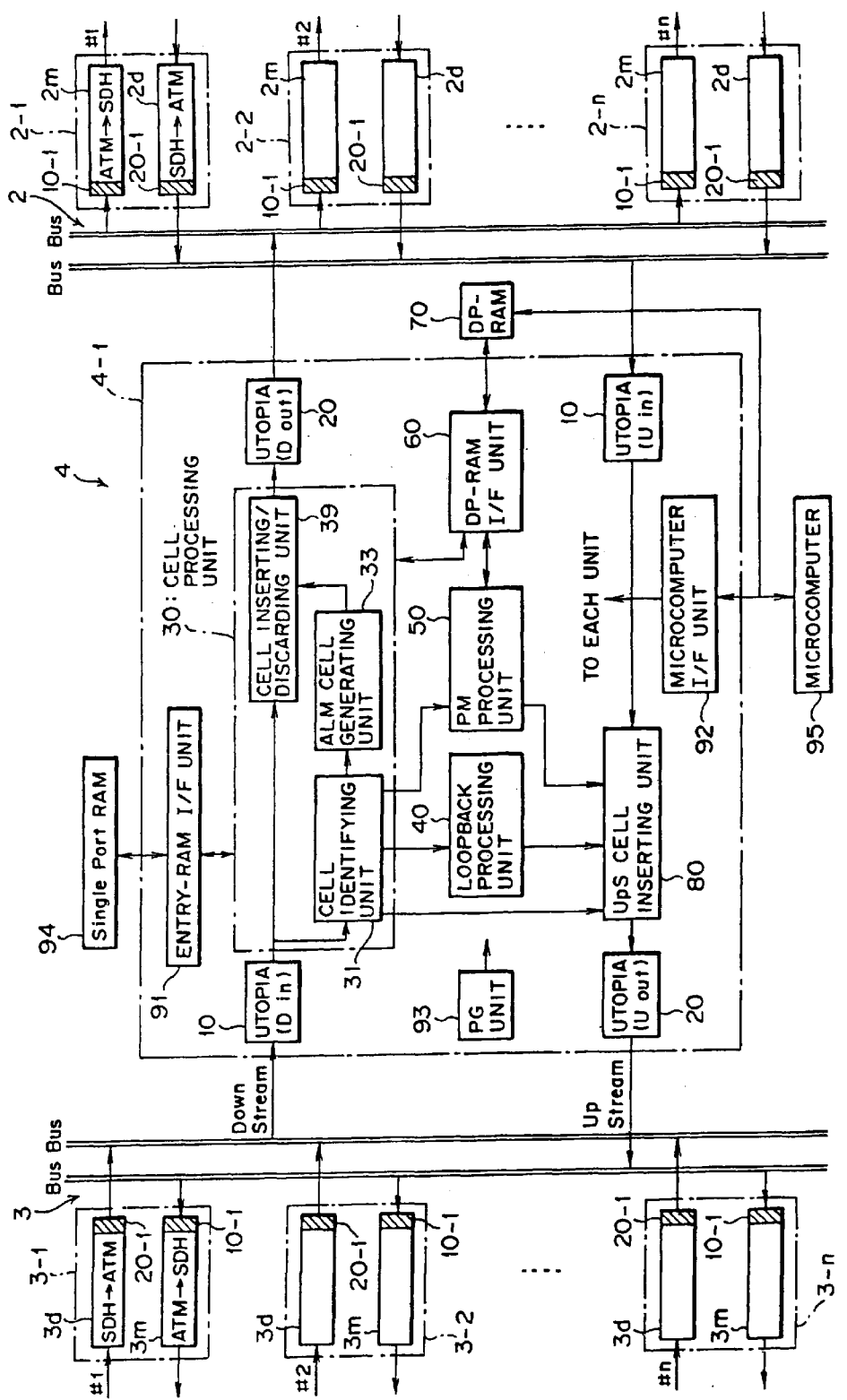

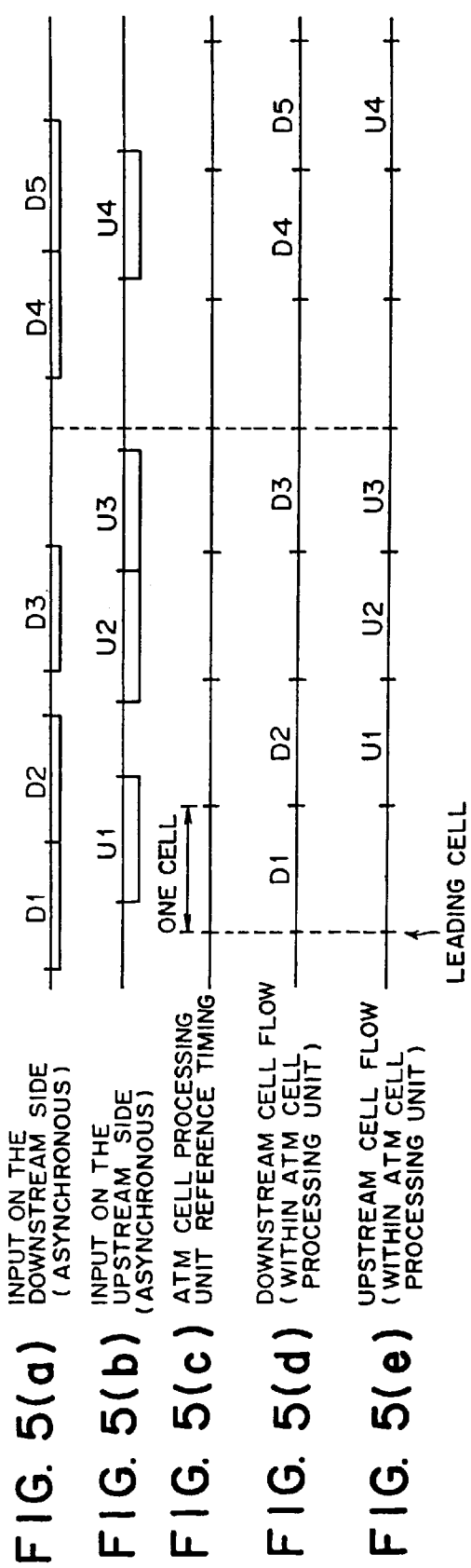

111 A BLOCK: CELL PROCESSING UNIT
110 B BLOCK: PM PROCESSING UNIT (FM)
101 C BLOCK: PM PROCESSING UNIT (OTHER THAN FM)
100 D BLOCK: LB PROCESSING UNIT

FIG. 10(a)

| [clk] | bit 15 14 13 12 | 11 10 9 8 | 7 6 5 4 | 3 2 | 1 0 |
|---|---|---|---|---|---|
| 1 | GFC | VPI | | VCI | |
| 2 | VCI | | | PTI | CLP |
| 3 | UDF1 (HEC) | | UDF2 | | |
| 4 | OAM CELL TYPE | FUNCTION TYPE | DEFECT TYPE | | |
| 5–19 | DEFECT LOCATION (16 byte) / UNUSED (20 byte) | | | | |
| 20 | "6A" | | | | |
| 21–25 | UNUSED (8 byte) | | | | |
| 26 | "6A" | | | | |
| 27 | RESERVED "000000" | | RE-ATTACH EDC (CRC-10)("00") | | |
| 28 | DUMMY BIT "L" | | | | |

FIG. 10(b)

| [clk] | bit 15 14 13 12 | 11 10 9 8 | 7 6 5 4 | 3 2 | 1 0 |
|---|---|---|---|---|---|
| 1 | GFC | VPI | | VCI | |
| 2 | VCI | | | PTI | CLP |
| 3 | UDF1 (HEC) | | UDF2 | | |
| 4 | OAM CELL TYPE | FUNCTION TYPE | LOOPBACK INDICATION | | |
| 5–6 | CORRELATION TAG (4 byte) | | | | |
| 7–12 | LOOPBACK LOCATION ID (OPTIONAL) (16 byte) | | | | |
| 13–22 | SOURCE ID (OPTIONAL) (16 byte) | | | | |
| 23–25 | UNUSED (8 byte) | | | | |
| 26 | "6A" | | | | |
| 27 | RESERVED "000000" | | RE-ATTACH EDC (CRC-10)("00") | | |
| 28 | DUMMY BIT "L" | | | | |

23~28: RDI & LB CELL FORMAT COMMON FIXED PATTERN

FIG. 18

| LSI ADDRESS | BIT | | | | | | | | REG. STATE |
|---|---|---|---|---|---|---|---|---|---|
| | D7 | D6 | D5 | D4 | D3 | D2 | D1 | D0 | |
| 12H | R/W | STS-3c No. | | INTERNAL RAM ADDRESS | | | | | READ/WRITE |
| 13H | HA | | | | | | | | READ/WRITE |
| 14H | B15 | | | ←── VPI/VCI ──→ | | | | B8 | READ/WRITE |
| 15H | B7 | | | | | | | B0 | |
| 16H | | | | E/S | | | | | READ/WRITE |
| 17H | B127 | | | | | | | B120 | |
| 18H | B119 | | | | | | | B112 | |
| 19H | B111 | | | | | | | B104 | |
| 1AH | B103 | | | | | | | B96 | |
| 1BH | B95 | | | | | | | B88 | |
| 1CH | B87 | | | | | | | B80 | |
| 1DH | B79 | | | | | | | B72 | |
| 1EH | B71 | | | LOCATION ID (16 byte) | | | | B64 | READ/WRITE |
| 1FH | B63 | | | | | | | B56 | |
| 20H | B55 | | | | | | | B48 | |
| 21H | B47 | | | | | | | B40 | |
| 22H | B39 | | | | | | | B32 | |
| 23H | B31 | | | | | | | B24 | |
| 24H | B23 | | | | | | | B16 | |
| 25H | B15 | | | | | | | B8 | |
| 26H | B7 | | | | | | | B0 | |
| 27H | | | | CODE | | | | | READ ONLY |

FIG. 19

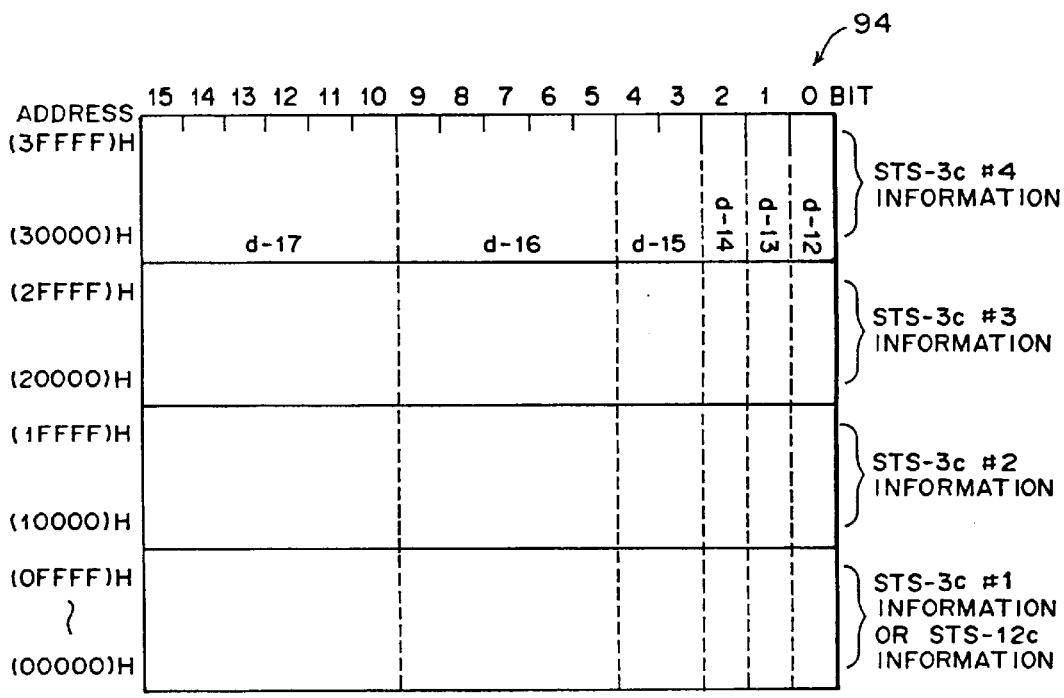

d-12: ENTRY: WHETHER VPI/VCI IS ENTERED ("H": IN PROCESS OF ENTRY)

d-13: VC TERMINATION: WHETHER VPI/VCI IS TERMINATED. WHEN "H", VPI/VCI IS IN (End-to-End) SETTING.

d-14: OAM INVALID:
WHEN "H", OAM CELL UNDERGOES NO PROCESS, PASSES THROUGH WHEN DETECTED.

d-15: E-to-E / Segment:
DESIGNATE End-to-End/Segment OF VPI/VCI. 2bits EXPRESSES 4 STATES. ONLY TWO STATES OF "01" AND "11" ARE DETERMINED. THE OTHER STATES ARE HANDLED AS INVALID (NO Segment DESIGNATION)

d-16: Loop Back ADDRESS:
SHOW WHICH ch AMONG 32ch THAT ARE OBJECTS OF Loop Back VPI/VCI CORRESPONDS TO d-17: VC ALM ADDRESS:
SHOW WHICH CHANNEL AMONG 64ch THAT ARE OBJECTS OF VC-AIS/RDI DETECTION VPI/VCI CORRESPONDS TO a-7: SHOW STS-3c #
    00: STS-3c #1 or STS-12C
    01: STS-3c #2
    10: STS-3c #3
    11: STS-3c #4 a-8: VPI ( HIGH ORDER 5 bits AMONG 8 bits )

"H": VP
"L": NORMAL d-7 : SHOW VC-AIS STATE ("H": AIS)

d-8 : CANCELING TIMER FOR VC-AIS
2.5 SECOND COUNTER, COUNTED UP EVERY 156msec d-9 : SHOW VC-RDI STATE ("H": RDI)

d-10: CANCELING TIMER FOR VC-RDI,
2.5 SECOND COUNTER,
COUNTED UP EVERY 156msec a-1 : STS-3c IDENTIFICATION ADDRESS
  00 : STS-3c #1 / STS-12c
  01 : STS-3c #2
  10 : STS-3c #3
  11 : STS-3c #4 a-2 : VPI (8 bits) OF ALM Cell
  WHEN VPI IS LESS THAN 8bits,
  ADD "0" TO HIGH ORDER bits

FIG.29

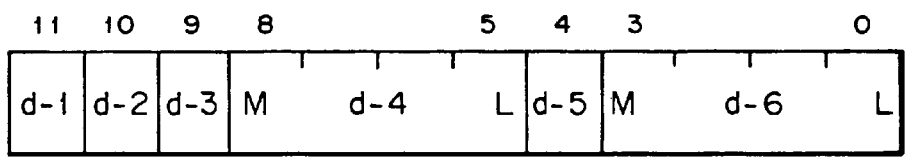

d-1 : SHOW VP-AIS STATE ("H":AIS)

d-2 : FLAG "500mF" SHOWING WHETHER ALARM CELL IS SENT WITHIN THE INITIAL 500msec AFTER GETTING INTO VP-AIS STATE OR SONET ALM STATE
("L":SEND COMPLETE)
("H":SEND NOT COMPLETE)

d-3 : FLAG "1sF" USED TO SEND ALARM CELL AT 1 sec INTERVALS d-4 : VP-AIS CANCELING TIMER,
2.5 SECOND COUNTER, COUNTED UP EVERY 156 msec d-5 : SHOW VP-RDI STATE ("H":RDI)

d-6 : VP-RDI CANCELING TIMER,
2.5 SECOND COUNTER, COUNTED UP EVERY 156 msec a-3 : STS-3c IDENTIFICATION ADDRESS 00 : STS-3c#1 / STS-12c
      01 : STS-3c#2
      10 : STS-3c#3
      11 : STS-3c#4 a-4 : VC-AIS/RDI MANAGING INTERNAL ADDRESS
     (VC-ALM ADDRESS SET IN ENTRY RAM)
     (0～63)

a-5 : STS-3c IDENTIFICATION ADDRESS
  00: STS-3c #1 / STS-12c
  01: STS-3c #2
  10: STS-3c #3
  11: STS-3c #4 a-6 : LOW ORDER 4bits OF VC TERMINATION SETTING ch(6bits)

d-11 : HOLD VPI OF VPI/VCI TO WHICH VC TERMINATION IS SET

FIG.43

|  | TRANSFER | | RECEIVE CONFIRM | | GENERATE | |
|---|---|---|---|---|---|---|
| [CTR28] | R | W | TM CONFIRM | SEARCH | GENERATE | |
| 0 | ★CLEAR → W1 | | | R1 | | |
| 1 | | | | R1 | R0 | |
| 2 | | | | R1 | R1 | |
| 3 | | | | R1 | | |
| 4 | ○ OK JUDGEMENT → W1 | | | R1 | | |
| 5 | | | | R1 | W2 | |
| 6 | | | | R1 | W3 | |
| 7 | | | | R1 | R4 | |
| 8 | READ CODE → | | R1 | R1 | R5 | |
| 9 | TIMER PROCESSING → | | | R1 | R6 | |
| 10 | | | | R1 | R7 | |
| 11 | × NG JUDGEMENT → | | W1 | R1 | R8 | |
| 12 | | | R0 | R1 | R9 | |
| 13 | | | R1 | R1 | RA | |
| 14 | | | R2 | R1 | RB | |
| 15 | | | R3 | R1 | W1 ←▲ | |
| 16 | READ → R0 | W0 ← SET | | R1 | | |
| 17 | READ → R1 | W1 ← ■ | | R1 | | |
| 18 | | | | R1 | | |
| 19 | | | | R1 | | |
| 20 | READ → R4 | W4 ← SET | | R1 | | |
| 21 | READ → R5 | W5 ← SET | | R1 | | |
| 22 | READ → R6 | W6 ← SET | | R1 | | |
| 23 | READ → R7 | W7 ← SET | | R1 | | |
| 24 | READ → R8 | W8 ← SET | | R1 | | |
| 25 | READ → R9 | W9 ← SET | | R1 | | |
| 26 | READ → RA | WA ← SET | | R1 | | |
| 27 | READ → RB | WB ← SET | | R1 | | |

★ : CLEAR code AFTER OK/NG CODE IS READ
○ : WRITE OK code RESULTING FROM OK JUDGEMENT
× : WRITE NG code RESULTING FROM TIME OUT
■ : WRITE transmit wait code AT THE TIME OF MICROCOMPUTER SETTING AND CLEAR TIMER
▲ : WRITE receive wait code WHEN LB CELL IS GENERATED

FIXED LENGTH DATA PROCESSING APPARATUS

BACKGROUND OF THE INVENTION (1) Field of the Invention

The present invention relates to a fixed length data processing apparatus, in particular, to a fixed length data processing apparatus suitable for use to execute operation, administration and maintenance (OAM) of ATM (Asynchronous Transfer Mode) communication using fixed length data of 53 bytes called an ATM cell.

(2) Description of Related Art

ATM technique is being introduced for the purpose of realization of B-ISDN (Broadband aspect of ISDN) communication network so as to comply with high speed (large capacity) communications, variable bit rate communication for image, communication systems having various connection configurations such as point-to-point, point-to-n points (n is 2 or more), n points-to-n points, and the like, required presently.

For instance, in SDH (Synchronous Digital Hierarchy) transmission network [called SONET (Synchronous Optical Network) in North America], it is tried to map (store) signals for various communication services as ATM cells (fixed length data for asynchronous communication) onto a portion of payload of an SDH transmission frame [called STM (Synchronous Transfer Module), or STS (Synchronous Transport Signal) in SONET] and transmit the signal.

An ATM cell is mapped onto the transmission frame as above, a recent demand is to identify the ATM cell mapped onto the SDH transmission frame (hereinafter simply referred as a transmission frame, occasionally) as a unit and perform operation, administration and maintenance [a data (cell) processing such as a terminating processing on an OAM cell] even in the SDH transmission network.

In a ring network 1' configuring the SDH transmission network shown in FIG. 48, for example, it is necessary to interpose an ATM processing apparatus 4' for performing the above cell processing between SDH transmitting apparatus 2' and 3'. Each of the SDH transmitting apparatus 2' and 3' is required to have a function of mapping an ATM cell on or taking out (demapping) an ATM cell from a transmission frame. Since the ring network 1' (SDH transmitting apparatus 2' and 3') accommodates a plurality of SDH transmitting apparatus 9'-1 through 9'-n (n is an integer not less than 2) which become transmission points in a lower hierarchy, as shown in FIG. 48, the ATM cell processing apparatus 4'i is required to perform the above cell processing on each transmission point.

In concrete, it is necessary to separately perform the above cell processing on each transmission frame in a lower order handled in each of the SDH transmission apparatus 9'-1 through 9'-n [distinguished as an STS channel #i (i=1 through n) in each of the SDH transmitting apparatus 2' and 3' (in a transmission frame in a higher order)].

For this, each of the SDH transmitting apparatus 2' and 3' has mapping/demapping (MAP/DEMAP) units 2'-1 through 2'-n and 3'-1 through 3'-n according to the number of STS channels #i as shown in FIG. 49, for example. Each of the mapping/demapping units 2'-1 through 2'-n and 3'-1 through 3'-n includes a demapping unit 2'd or 3'd for taking out an ATM cell from a transmission frame in the upstream (UpStream) and or in the down stream (DownStream) and outputting the ATM cell to the ATM cell processing unit 4'-i, and a mapping unit 2'm or 3'm for storing (mapping) an ATM cell from the ATM cell processing unit 4'-i in a transmission frame in the upstream (UpStream) or in the downstream (DownStream) and outputting the ATM cell to another transmitting apparatus. The ATM processing apparatus 4' has ATM cell processing units (data processing units) 4'-1 through 4'-n according to the number of the STS channels #i.

Each of the SDH transmitting apparatus 2' and 3' can thereby perform the above ATM cell mapping/demapping process for each STS channel #i by the mapping/demapping (MAP/DEMAP) units 2'-1 through 2'-n and 3'-1 through 3'-n. The ATM cell processing unit 4'-i can perform the above cell processing for each STS channel #i.

Namely, the ATM processing apparatus 4' performs the cell processing on ATM cells in transmission frames handled by each of the SDH transmitting apparatus 9'-1 through 9'-n separately for each STS channel #i by each exclusive ATM cell processing unit 4'-i serially.

For instance, an ATM cell from the SDH transmitting apparatus 9'-1, 9'-2, . . . or 9'-n in the lower hierarchy of the SDH transmitting apparatus 3' is taken out from a transmission frame in the mapping/demapping unit 3'-1, 3'-2, . . . or 3'-n corresponding to the STS channel #i, and sent to a corresponding ATM cell processing unit 4'-i according to an internal reference cell cycle of the ATM processing apparatus 4'.

The ATM cell undergoes the cell processing in the ATM cell processing unit 4'-i corresponding to the STS channel #i is mapped on a transmission frame in the corresponding mapping unit 2'-1, 2'-2, . . . or 2'-n, and transmitted to the SDH transmitting apparatus 9'-1, 9'-2, . . . or 9'-n accommodated in the lower hierarchy of the SDH transmitting apparatus 2'.

Each of the ATM cell processing units 4'-i identifies an ATM cell, and executes fault management [termination of an AIS (Alarm Indication Signal) or an RDI (Remote Defect Indication) cell] on an ALM (Alarm) cell of an OAM cell, mainly.

For instance, when the ATM processing apparatus 4' receives an OAM (ALM) cell (VP/VC-AIS) indicating occurrence of a trouble within a certain VP/VC connection, the ATM processing apparatus 4' notifies of a similar AIS the downstream, or when receiving an alarm (SONET alarm or the like) in a higher order than AIS, the ATM processing apparatus 4' generates a VP/VC-AIS/RDI cell and sends the cell to a desired destination.

For this, each of the ATM cell processing unit 4'-i has, as shown in FIG. 49, for example, a cell identifying unit 4'a, a cell generating unit 4'b, a cell inserting unit 4'c for downstream, a cell inserting unit 4' d for upstream, and a microcomputer I/F unit 4'e.

The cell generating unit 4'b generates an ALM cell (VP-AIS, VC-AIS), and sends the cell to the downstream through the DnS cell inserting unit 4'c. On the other hand, an ALM cell (VP-RDI, VC-RDI) in the opposite direction is sent to the upstream through the UpS cell inserting unit 4'd.

The microcomputer I/F unit 4'e has an interface to set an operation channel, operation environments and the like from a system CPU or collect maintenance and management information (ALM information and the like).

The ATM cell or the like outputted from the ATM cell processing unit 4'-1, 4'-2, . . . , or 4'-i is again mapped on a transmission frame in the mapping/demapping unit 2'-1, 2'-2, . . . or 2'-n, and receives by another apparatus which is a destination of the ALM cell.

The cell identifying unit 4'a in the above ATM cell processing unit 4'-1 holds information for identifying a cell of an OAM (ALM) cell (VP/VC-AIS) to identify a receive cell by comparing the received cell with the information. However, if the apparatus holds the identification information for each channel [virtual channel (VP/VC) in ATM communication], the apparatus has to hold the identification information for 1024 channels in one STS channel, for example, which leads to an increase in scale of the apparatus.

If a network configuration (connection configuration) of a large capacity transmission such as one-to-n, n-to-n, a variable bit rate communication or the like is complicated, the identification information on an ATM cell is inevitably increased, leading to an increase in scale of the apparatus.

When the network configuration is complicated as above, it is necessary to execute a continuity test in the network other than OAM between stations. However, in the ATM processing apparatus 4' shown in FIG. 49, only the fault management for an ATM cell is executed, but the continuity test on the ATM cell base is not executed. For this reason, it is impossible to appropriately confirm connection between the stations while continuing the network operation.

SUMMARY OF THE INVENTION

In the light of above problem, an object of the present invention is to provide a fixed length data processing apparatus which efficiently holds a large volume of information for identifying fixed length data to process the fixed length data or conduct a continuity test using fixed length data in a communication network handling fixed length data such as an ATM cell and the like.

The present invention therefore provide a fixed length data processing apparatus for processing fixed length data used for an asynchronous communication to which transmission route identification information different from transmission route to transmission route is set, the fixed length data processing apparatus comprising a registration information holding unit for holding registration information necessary to identify fixed length data that is an object of a processing commonly to the transmission routes, and a data processing unit for identifying whether received fixed length data is fixed length data that is an object of a processing or not on the basis of at least the registration information in the registration information holding unit to perform a data processing for fault management in the asynchronous communication on the basis of the fixed length data when identifying that the fixed length data is fixed length data that is an object of a processing correspondingly to the transmission route.

According to the above fixed length data processing apparatus, the registration information holding unit holds registration information necessary to identify fixed length data that is an object of a processing commonly to the transmission routes, and the data processing unit performs the data processing on the basis of the registration data, so that the apparatus can be configured simply.

The present invention further provides a fixed length data processing apparatus for processing fixed length data for asynchronous communication comprising a request generating unit being able to generate an execution request for a continuity test processing in order to confirm a continuity state in the asynchronous communication, and a continuity test processing unit for generating fixed length data for a continuity test when receiving the execution request form the request generating unit, transmitting and receiving the fixed length data to and from another fixed length data processing apparatus via the transmitting apparatus to execute the continuity test processing, and notifying a result of the continuity test processing the request generating unit.

According to the above fixed length data processing apparatus, the request generating unit generating an execution request for a continuity test processing in order to confirm a continuity state in the asynchronous communication, and the continuity test processing unit generates fixed length data for a continuity test when receiving the execution request from the request generating unit, transmits and receives the fixed length data to and from another fixed length data processing apparatus via the transmitting apparatus to execute the continuity test processing, and notifies of a result of the continuity test processing the request generating unit. It is therefore possible to readily execute a continuity test using fixed length data in an asynchronous communication network, and appropriately confirm a connection between stations in the continuity test while continuing an operation of the network.

BRIEF DESCRIPTION OF THE DRAWINGS

FIG. 2 is a block diagram showing the ATM processing apparatus and mapping/demapping units according to the embodiment of this invention;

FIGS. 5(a) through 5(e) are timing diagrams for illustrating a state where a cell from an ATM layer asynchronously inputted to the UTOPIA is transferred to a reference internal process timing in the apparatus according to the embodiment of this invention;

FIGS. 10(a) and 10(b) are diagrams showing data structures in a RAM according to the embodiment of this invention;

FIG. 18 is a diagram showing an example of a structure of a bit map of a microcomputer register according to the embodiment of this invention;

FIG. 19 is a diagram showing an example of a data structure of an entry RAM according to the embodiment of this invention;

FIG. 29 is a diagram showing an example of a data structure in the VP managing RAM according to the embodiment of this invention;

FIG. 43 is a timing diagram for illustrating access timings to the DP-RAM according to the embodiment of this invention;

DESCRIPTION OF THE PREFERRED EMBODIMENTS

Figure 1:
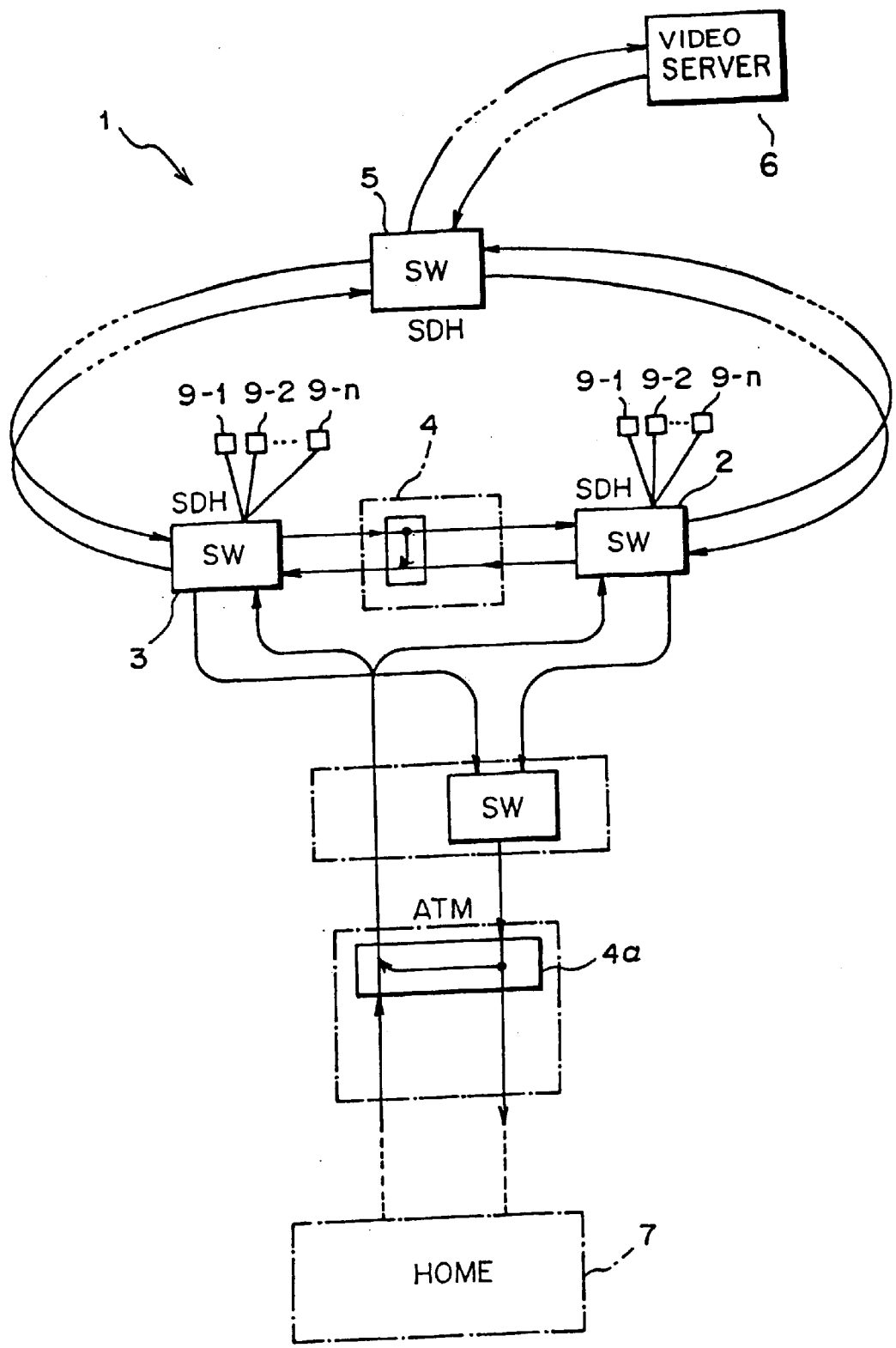
FIG. 1 is a block diagram showing an example of a transmission network configuration to which an ATM processing apparatus according to an embodiment of this invention is applied.

Hereinafter, description will be made of embodiments of this invention referring to the drawings.

(1) Description of a System Structure

FIG. 1 is a block diagram showing a structure of a ring network 1 configuring an SDH transmission network to which a fixed length data processing apparatus according to an embodiment of this invention is applied. The ring network 1 shown in FIG. 1 accommodates a video server 6 which can provide image data and voice data to realize a VOD (Video on Demand) system which can provide desired image and voice such as a movie or the like to a subscriber (user) 7 from the video server 6 at an arbitrary time in response to a video view demand from the subscriber (user) 7 in a remote place.

Hereinafter, description will be made on an assumption that a large volume of information is transmitted in the ring network by the VOD service.

The ring network 1 shown in FIG. 1 comprises SDH transmitting apparatus 2, 3 and 5 transmitting an SDH frame between the video server 6 and the subscriber 7. Each of the SDH transmitting apparatus 2 and 3 comprises, in the lower hierarchy, SDH transmitting apparatus 9-1 through 9-n handling a transmission frame [discriminated as an STS channel i (apparatus identification information) in the SDH transmitting apparatus 2 and 3 (in a transmission frame in a higher order, such as STS-3c or the like)] in a lower order having a lower transmission rate than a transmission frame (STS-12, 48 or the like, for example) handled in the ring network 1.

In the ring network 1, there is provided an ATM processing apparatus (fixed length data processing apparatus) 4 between the SDH transmitting apparatus 2 and 3 to identify each ATM cell mapped on a transmission cell as a unit, and execute operation, administration and maintenance in the ATM communication level.

The ATM processing apparatus 4 according to this embodiment of this invention comprises, as shown in FIG. 2, an ATM cell processing unit 4-1 common to mapping/demapping units (transmitting apparatus) 2-i and 3-i for STS channels #i, thereby performing a process on an ATM cell on each STS channel #i commonly to all the STS channels #i.

As shown in FIG. 2, each of the SDH transmitting apparatus 2 and 3 comprises the mapping/demapping units 2-i or 3-i to perform a mapping/demapping process on an ATM cell on each STS channel #i and exchange the ATM cell with the ATM cell processing unit 4-1. The mapping/demapping unit 3-i comprises a demapping unit 3d for taking out an ATM cell from a transmission frame in the downstream, a mapping unit 3m for storing an ATM cell outputted from the ATM cell processing unit 4-1 on a transmission frame in the upstream, an interface unit 20-1 for exchanging data with an interface unit 10 on the downstream side in the ATM processing apparatus 4, and an interface unit 10-1 for exchanging data with an interface unit 20 on the upstream side in the ATM processing apparatus 4. Similarly, the mapping/demapping unit 2-i comprises a demapping unit 2d for taking out an ATM cell from a transmission frame in the upstream, a mapping unit 2m for storing an ATM cell outputted from the ATM cell processing unit 4-1 on a transmission frame in the downstream, an interface unit 10-1 for exchanging data with the interface unit 20 on the downstream side in the ATM processing apparatus 4, and an interface unit 20-1 for exchanging data with the interface unit 10 on the upstream side in the ATM processing apparatus 4.

The ATM processing apparatus shown in FIG. 2 provided with the ATM cell processing unit 4-1, a dual port RAM 70, a single port RAM 94, and a microcomputer ($\mu$-COM: request generating unit) 95 as a system CPU.

The ATM cell processing unit 4-1 mainly identifies an ATM cell to execute fault management on an ALM (alarm) cell of an OAM cell [termination or the like of an AIS (Alarm Indication Signal) cell or an RDI (Remote Defect Indication) cell and the like]. According to this embodiment, the ATM cell processing unit 4-1 can also execute a continuity test (Loopback; hereinafter referred as "LB" occasionally) by an ATM cell to be described later.

To this end, the ATM cell processing unit 4-1 comprises the interface units 10 and 20 for exchanging an ATM cell with the interface units 10-1 and 20-1 of the mapping/demapping units 2-1 through 2-n and 3-1 through 3-n, a cell processing unit 30, an LB processing unit 40, an interface unit (DUEL PORT RAM I/F) unit 60 for exchanging information with an externally attached dual port RAM 70 to be described later, a cell inserting unit for upstream (hereinafter referred as "UpS cell inserting unit") 80, an entry RAM (ENTRY-RAM) interface unit (hereinafter referred as "RAM access intervening unit", occasionally) 91 for exchanging information with the single port RAM 94 holding information necessary to identify an received cell, and a microcomputer interface unit (hereinafter referred as "microcomputer I/F unit", occasionally) 92 for exchanging information about various settings for PM with the microcomputer 95 and notifying of it to each of the parts.

The ATM cell processing unit 4-1 also comprises a performance monitoring (PERFORMANCE MONITORING; hereinafter referred as "PM" occasionally) process unit 50 for monitoring a state of cell discarding or a state of cell flow.

The interface unit 10 (for receiving) shown in FIG. 2 is configured with a UTOPIA (Universal Test & Operation PHY Interface for ATM) in this embodiment. The interface unit 10 receives a cell in asynchronization from an arbitrary mapping/demapping unit (physical layer) 2-i or 3-i based on UTOPIA interface standard, and sends the received cell to the cell processing unit 30 according to a reference timing in the ATM cell processing unit 4-1.

The interface unit 20 (for transmission) shown in FIG. 2 is configured with a UTOPIA, as well, which transmits a cell to an arbitrary mapping/demapping unit (physical layer) 2-i or 3-i in asynchronization based on UTOPIA interface standard. The interface unit 10-1 (for reception) and the interface unit 20-1 (for transmission) in the mapping/demapping units 2-i and 3-i (physical layer) are also configured with UTOPIAs.

Hereinafter, the UTOPIAs 10, 10-1, 20, 20-1 will be described in detail.

(1-1) Description of the UTOPIA 20-1

Figure 3A:
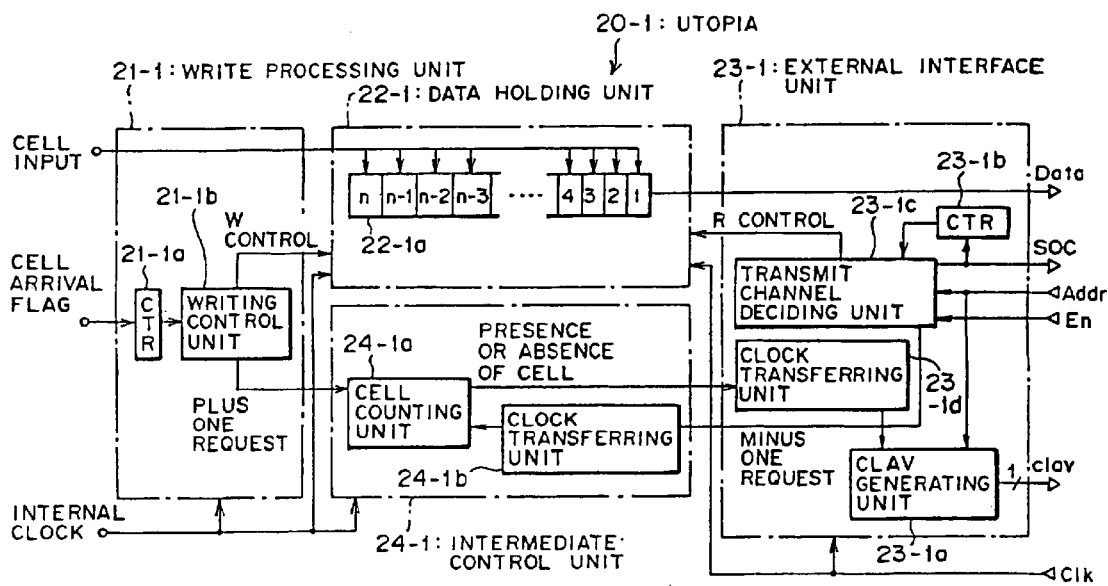
FIGS. 3(a) and 3(b) are block diagrams showing examples of detailed structures of UTOPIAs in the mapping/demapping units according to the embodiment of this invention.

FIG. 3(a) is a block diagram showing an example of a detailed structure of the UTOPIA 20-1 for transmission in the above mapping/demapping unit 2-i or 3-i (physical layer). As shown in FIG. 3(a), the UTOPIA 20-1 comprises a write processing unit 21-1, a data holding unit 22-1, an intermediate control unit 24-1 and an external interface unit 23-1.

The data holding unit 22-1 holds a cell demapped in the demapping unit 2d (3d). In consideration that a cell reading process is halted in an external interface unit 23-1 due to delay of the data processing in the ATM processing apparatus 4, the data holding unit 22-1 comprises a data holding buffer 22-1a which can hold a plurality of cells.

The write processing unit 21-1 successively writes cells demapped in the demapping unit 2d (3d) in the above data holding buffer 22-1a. To this end, the write processing unit 21-1 comprises a counter 21-1a and a write control unit 21-1b.

The counter 21-1a counts up a count value by clocks corresponding to a length of cells with a cell arrival flag (H level) indicating cell input from the demapping unit 2d (3d) as a trigger. The writing control unit 21-1b executes a write control on the data holding buffer 22-1a according to an output (count value) of the counter 21-1a, thereby successively writing cells transmitted from the demapping unit 2d (3d) one by one in the data holding buffer 22-1a.

The intermediate control unit 24-1 monitors the number of cells (holding status) held in the above data holding buffer 22-1a to manage presence/absence of a cell to be transmitted to the ATM processing apparatus 4. According to this embodiment, the intermediate control unit 24-1 comprises a cell counting unit (CTR) 24-1a, as shown in FIG. 3(a).

Incidentally, reference numeral 24-1b denotes a clock transferring unit.

The above cell counting unit 24-1a counts up its count value according to "plus one request (receive complete signal)" received each time a cell is written in the data holding buffer 22-1a by the above writing control unit 21-1*b*, while counting down the count value according to "minus one request (transmit complete signal) received each time a cell is read out from the data holding buffer 22-1*a* by the transmit channel deciding unit 23-1*c* (to be described later) in the external interface unit 23-1. When the count value is not less than 1, it is known that the data holding buffer holds a cell.

The clock transferring unit 24-1*b* matches clocks for the above "plus one request" and "minus one request" notified the cell counting unit 24-1*a*. The clock transferring unit 24-1*b* matches clocks for the above requests by transferring a clock for the above "minus one request" notified according to an operation clock on the side of the external interface unit 23-1 (ATM processing apparatus 4) to a basic operation clock of the write processing unit 21-1 [on the side of the demapping unit 2*d*(3*d*)].

The clock transferring unit 24-1*b* is required since the external interface unit 23-1 operates according to a clock different from a clock on the side of the write processing unit 21-1 received from the ATM processing apparatus 4. Basically, the clock transferring unit 24-1*b* is dispensable when the write processing unit 21-1 and the external interface unit 23-1 operate according to the same clock.

The external interface unit 23-1 reads a cell held in the above data holding buffer 22-1*a*, and transmits the cell to the ATM processing apparatus 4. The external interface unit 23-1 comprises, as shown in FIG. 3(*a*), for example, a clav generating unit 23-1*a*, a counter 23-1*b*, a transmit channel deciding unit 23-1*c* and a clock transferring unit 23-1*d*.

When an address (Addr) signal from the ATM processing apparatus 4 indicates an STS channel #i handled by the UTOPIA 20-1 of its own and the UTOPIA 20-1 of its own is designated as a UTOPIA 20-1 that is an object of cell reception by the ATM processing apparatus 4, the clav generating unit 23-1*a* determines whether a count value of the cell counting unit 24-1*a* is not less than 1 or not. When the count value is not less than 1 and a cell to be transmitted exists, the clav generating unit 23-1*a* notifies of it the ATM processing unit 4 (UTOPIA 10) using a clav signal.

The transmit channel deciding unit 23-1*c* reads a cell held in the data holding buffer 22-1*a* of the data holding unit 22-1. When receiving a transmit permission from the UTOPIA 10 in response to the above notification by the clav generating unit 23-1*a* [when an enable signal (En) becomes H level], the transmit channel deciding unit 23-1*c* reads one cell from the data holding buffer 22-1*a*, and transmits the cell along with a signal SOC (H level) indicating initiation of cell reading (transmitting) to the UTOPIA 10.

The counter 23-1*b* counts up its count value by clocks corresponding to a length of cells with the cell reading (H level of the above transmit start signal SOC) by the transmit channel deciding unit 23-1*c* as an opportunity (trigger). The transmit channel deciding unit 23-1*c* monitors the count value to determine an end of cells being now read out, thereby performing the next reading process.

The clock transferring unit 23-1*d* transfers the clock for a signal indicating presence/absence of a cell from the cell counting unit 24-1*a* inputted to the clav generating unit 23-1*a* to the basic operation clock of the external interface unit 23-1 (on the side of the ATM processing apparatus 4). Incidentally, the clock transferring unit 23-1*d* is dispensable when the write processing unit 21-1 and the external interface unit 23-1 operate according to the same clock, similarly to the clock transferring unit 24-1*b* in the intermediate control unit 24-1.

In the UTOPIA 20-1 for transmitting in the mapping/demapping unit 2-*i* or 3-*i* (physical layer) with the above structure, cells taken out from a frame by the demapping unit 2*d* (3*d*) are successively written in the data holding buffer 22-1*a* by the writing control unit 21-1*b*. At this time, the intermediate control unit 24-1 counts up a count value of the cell counting unit 24-1*a* according to "plus one request" outputted from the writing control unit 21-1*b* each time a cell is written in the data holding buffer 22-1*a*.

In the external interface unit 23-1, when an STS channel #i handled by the transmit channel deciding unit 23-1*c* is indicated by an address (Addr) signal and its own UTOPIA 20-1 is designated as a UTOPIA 20-1 that is an object of cell reception by the ATM processing apparatus (UTOPIA 10), the clav generating unit 23-1*a* determines whether a count value of the cell counting unit 24-1*a* in the intermediate control unit 24-1 is not less than 1 or not. When the count value is not less than 1, the clav generating unit 23-1*a* makes the clav signal "H" level, and notifies the UTOPIA 10 that the UTOPIA 20-1 of its own holds a cell to be transmitted.

When receiving a transmit permission from the UTOPIA 10 in response to the above notification (when the STS channel #i handled by itself is indicated in the address signal, and the enable signal becomes H level), the transmit channel deciding unit 23-1*c* starts to read cells from the data holding buffer 22-1*a* and makes the reading start signal SOC H level, and reads only one cell from the data holding buffer 22-1*a* according to the count value of the counter 23-1*b*.

The transmit channel deciding unit 23-1*c* sends "minus one request" to the cell counting unit 24-1*a* in the intermediate control unit 24-1 when reading a cell from the data holding buffer 22-1*a*. The cell counting unit 24-1*a* counts down the count value by one when receiving the "minus one request".

After that, each time an address signal from the UTOPIA 10 indicates the STS channel #i handled by itself, the UTOPIA 20-1 repeats the above transmitting (reading) process so long as a cell is held in the data holding buffer 22-1*a*, so as to successively read cells held in the data holding buffer 22-1*a* and transmit the cells to the UTOPIA 10 (ATM processing unit 4).

(1-2) Description of the UTOPIA 10-1

FIG. 3(*b*) is a block diagram showing a detailed structure of the UTOPIA 10-1 for transmitting in the above mapping/demapping unit 2-*i* or 3-*i* (physical layer). As shown in FIG. 3(*b*), the UTOPIA 10-1 comprises an external interface unit 11-1, a data holding unit 12-1, an intermediate control unit 14-1 and a read processing unit 13-1.

The data holding unit 12-1 holds a cell processed in the ATM processing apparatus 4. In this case, in consideration that the cell reading process might stop in the read processing unit 13-1 due to delay of the mapping process in the mapping unit 2*m* (3*m*), the data holding unit 12-1 comprises a data holding buffer 12-1*a* which can hold a plurality of cells in units of cell.

The external interface unit 11-1 receives a cell processed in the ATM processing apparatus 4, and makes the above data holding buffer 12-1*a* hold the cell (writes the cell in the data holding buffer 12-1*a*). The external interface unit 11-1 comprises, as shown in FIG. 3(*b*), a clav generating unit 11-1*a*, a counter 11-*b*, a writing control unit 11-1*c* and a clock transferring unit 11-1*d*.

When an address (Addr) signal indicates an STS channel #i handled by itself and the ATM processing apparatus 4 (UTOPIA 20) designates the UTOPIA 10-1 of its own as a UTOPIA 10-1 that is an object of cell reception, the clav generating unit 11-1*a* determines whether there is a free space (a room for a received cell) in the data holding buffer 12-1*a* or not on the basis of a count value of a cell counting unit 14-1a (to be described later) in the intermediate control unit 14-1. When there is a free space, the clav generating unit 11-1a notifies of it the UTOPIA 20 using a clav signal (H level).

The counter 11-1b counts up its count value by clocks corresponding to a length of cells with H level of a cell transmission start signal SOC from the UTOPIA 20. The writing control unit 11-1c monitors the count value of the counter 11-1b to determine an end of the received cells so as to successively write the next received cell.

When receiving a receive permission from the UTOPIA 20 in response to the notification about a free space in the data holding buffer 12-1a from the above clav generating unit 11-1a (when an enable signal becomes H level), the writing control unit 11-1c writes received cells in the data holding buffer 12-1a according to the count value of the above counter 11-1b. The clock transferring unit 11-1d transfers a clock for a signal indicating presence/absence of a free space from the cell counting unit 14-1a inputted to the clav generating unit 11-1a to a basic operation clock of the external interface unit 11-1 (on the side of the ATM processing apparatus 4).

The intermediate control unit 14-1 monitors the number of cells (holding status) in the above data holding buffer 12-1a to manage presence/absence of a cell to be transmitted to the mapping unit 2m (3m) and a free space in the data holding buffer 12-1a. To this end, the intermediate control unit 14-1 comprises a cell counting unit (CTR) 14-1a. Incidentally, reference numeral 14-1b denotes a clock transferring unit.

The above cell counting unit 14-1a counts up its count value according to "plus one request" received each time a cell is written in the data holding buffer 12-1a by the above counter 11-1b, while counting down the count value according to "minus one request" received each time a cell is read out from the data holding buffer 12-1a by a reading control unit 13-1a (to be described later). When the count value is not less than 1, it is known that a cell is held in the data holding buffer 12-1a. Further, when the count value is below a capacity value of the data holding buffer 12-1a, it is known that there is a free space in the data holding buffer 12-1a.

The above clock transferring unit 14-1b matches the clocks for "plus one request" from the writing control unit 11-1c and "minus one request" from the reading control unit 13-1a notified the cell counting unit 14-1a. In this case, the clock transferring unit 14-1b is dispensable when the external interface unit 11-1 and a read processing unit 13-1 operate according to the same clock.

Figure 3B:
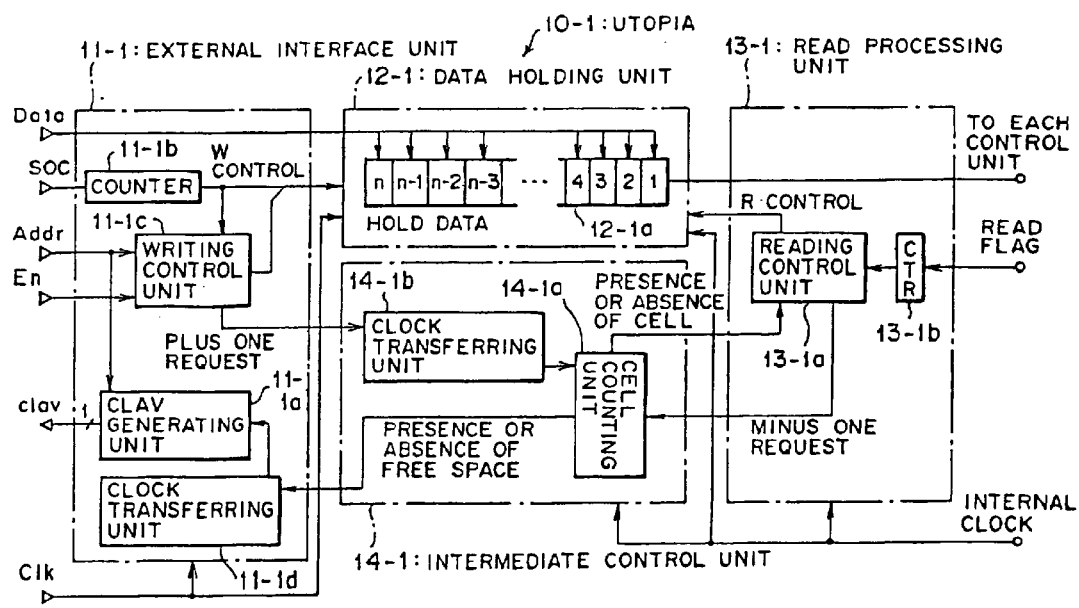

The above read processing unit 13-1 successively reads out cells from the data holding unit 12-1a according to a cell transmit request (read flag) from the mapping unit 2m (3m). To this end, the read processing unit 13-1 comprises, as shown in FIG. 3(b), the reading control unit 13-1a and a counter 13-1b.

The counter 13-1b counts up a count value thereof by clocks corresponding to a length of cells with the read flag (H level) from the mapping unit 2m (3m) as a trigger. The reading control unit 13-1a successively reads out the cells from the data holding buffer 12-1a one by one according to the count value of the counter 13-1b so long as a cell is held in the data holding buffer 12-1a. The reading control unit 13-1a sends the above "minus one request" to the cell counting unit 14-1a in the intermediate control unit 14-1 each time a cell is read out.

In the UTOPIA 10-1 for transmitting in the mapping/demapping unit 2-i or 3-i (physical layer) with the above structure, when an address (Addr) signal from the ATM processing apparatus 4 (UTOPIA 20) indicates an STS channel #i handled by the UTOPIA 10-1 and the UTOPIA 10-1 is designated as a UTOPIA 10-1 that is an object of cell reception, the clav generating unit 11-1a determines whether there is a free space in the data holding buffer 12-1a or not on the basis of a count value of the cell counting unit 14-1a in the intermediate control unit 14-1. When there is a free space, the clav generating unit 11-1a makes the clav signal H level, and notifies of it the UTOPIA 20.

When receiving a receive permission from the UTOPIA 20 (when the enable signal becomes H level) in response to the notification, the writing control unit 11-1c writes a received cell (DATA) in the data holding buffer 12-1a according to a count value of the counter 11-1b that starts to count up with H level of the transmission start signal SOC from the UTOPIA 20 as a trigger.

At this time, the writing control unit 11-1c sends "plus one request" to the cell counting unit 14-1a in the intermediate control unit 14-1 each time one cell is written in the data holding buffer 12-1a. The cell counting unit 14-1a counts up the count value by one when receiving the "plus one request".

After that, each time an address signal from the UTOPIA 20 indicates the STS channel #i handled by itself, the UTOPIA 10-1 performs the above receiving (writing) process so long as there is a free space in the data holding buffer 12-1a to successively write cells in the data holding buffer 12-1a.

In the read processing unit 13-1, the counter 13-1b starts to count up with that the read flag from the mapping unit 2m (3m) becomes H level as a trigger. With this, the reading control unit 13-1a successively reads out cells from the data holding buffer 12-1a according to a count value of the counter 13-1b so long as a cell is held in the data holding buffer 12-1a, and sends the cells to the mapping unit 2m (3m). The reading control unit 13-1a outputs "minus one request" to the cell counting unit 14-1a in the intermediate control unit 14-1 each time one cell is read out.

(1-3) Description of the UTOPIA 10

Figure 4A:
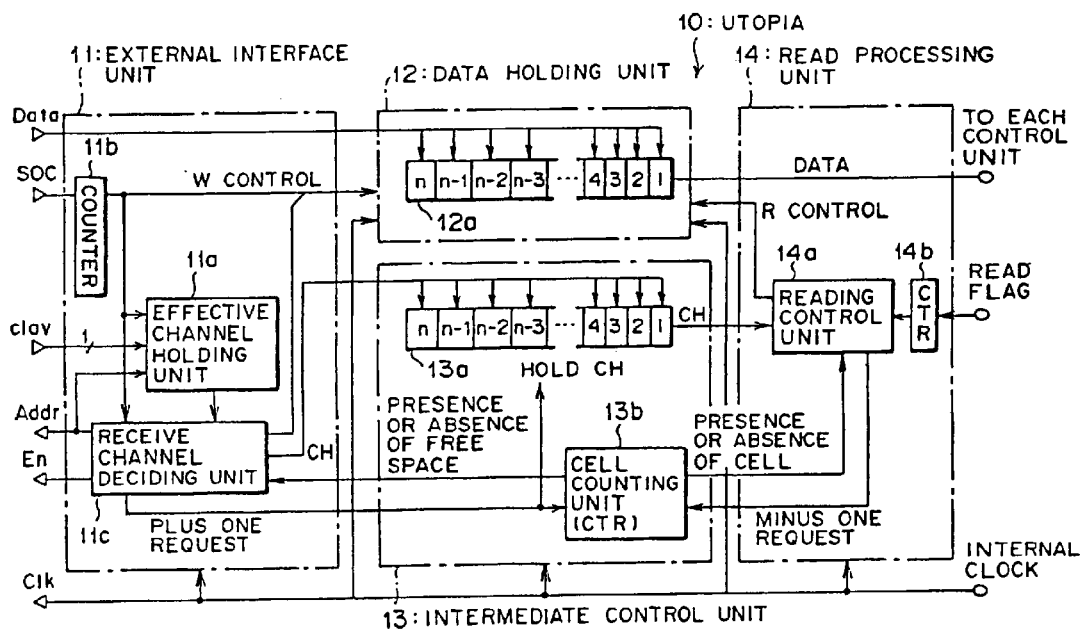
FIGS. 4(a) and 4(b) are block diagrams showing examples of detailed structures of UTOPIAs in the ATM processing apparatus according to the embodiment of this invention.

FIG. 4(a) is a block diagram showing an example of a detailed structure of the UTOPIA 10 for receiving in the above ATM processing apparatus 4 (ATM layer) As shown in FIG. 4(a), the UTOPIA 10 comprises an external interface unit 11, a data holding unit 12, an intermediate control unit 13 and a read processing unit 14.

The data holding unit 12 holds a cell transmitted from the above UTOPIA 20-1 on the side of the mapping/demapping unit 2-i or 3-i (physical layer). In this case, in consideration that the cell reading process might stop in the read processing unit 14 due to delay of the data processing in the UTOPIA 20 to be described later, the data holding unit 12 comprises a data holding buffer 12a which can hold a plurality of cells in units of cell.

The intermediate control unit 13 monitors the number of cells (holding status) held in the above data holding buffer 12a to manage presence/absence of a cell to be outputted to a cell processing unit 30 to be described later and a free space in the data holding buffer 12a, while managing STS channels #i of cells held in the data holding buffer 12a. To this end, the intermediate control unit 13 comprises an STS channel holding buffer 13a and a cell counting unit (CTR) 13b.

The STS channel holding buffer 13a holds an STS channel #i of a cell held in the above data holding buffer 12a. As will be described later, an STS channel #i decided by a receive channel deciding unit (writing control unit) 11c (to be described later) in the external interface unit 11 is written in the STS channel holding buffer 13a.

Namely, the above data holding buffer 12a and the STS channel holding buffer 13a can store a cell and an STS channel #i [identification information on physical layer (mapping/demapping unit 2-i or 3-i)], respectively.

The cell counting unit 13b counts the number of cells of each STS channel #i held in the buffer 13a. The cell counting unit 13b comprises counters (not shown) for respective channels #i to manage the number of held cells of respective STS channels #i by counting up/counting down a count value of a corresponding counter (counter not shown for each STS channel #i) in response to "plus one request"/ "minus one request" received each time a cell is written in/read out from the data holding buffer 12a by the receive channel deciding unit 11c and the reading control unit 14a (to be described later).

The external interface unit (receiving interface unit) 11 receives a cell from an arbitrary mapping/demapping unit 2-i or 3-i (physical layer) correlates the cell with an STS channel #i of the cell, and writes the cell and the STS channel #i in the buffers 12a and 13a, thereby managing the received cell for each STS channel #i.

The external interface unit 11 gives a cell transmit permission to an arbitrary UTOPIA 20-1 on the basis of the cell holding status in the TUOPIA 20-1 to receive a cell from the UTOPIA 20-1. As shown in FIG. 4(a), the external interface unit 11 comprises an effective channel holding unit 11a, a counter 11b and the receive channel deciding unit 11c.

When the receive channel deciding unit 11c designates a UTOPIA 20-1 that is an object of cell reception in polling (serially) using an address signal, the effective channel holding unit 11a holds a clav signal indicating whether the UTOPIA 20-1 has a cell to be transmitted or not (H level when the UTOPIA 20-1 has a cell, or L level when not) sent back from each of the UTOPIAs 20-1, thereby storing cell holding status information on each STS channel #i.

The receive channel deciding unit 11c decides an STS channel #i [UTOPIA 20-1] that is an object of cell reception on the basis of the holding status information held in the effective channel holding unit 11a and free space information on the data holding buffer 12a managed for each STS channel #i by the cell counting unit 13b, sends an enable signal (H level) and an address signal indicating a receive STS channel #i (gives a transmit permission) to a UTOPIA 20-1 of the decided receive STS channel #i, receives a cell from the UTOPIA 20-1, and writes the received cell in the data holding buffer 12a, while writing the above decided receive STS channel #i in the STS channel holding buffer 13a.

Namely, the above receive channel deciding unit 11c receives notifications about the cell holding status from a plurality of UTOPIAs 20-1 [physical layer (mapping/ demapping units 2-i or 3-i) serially, so as to decide a UTOPIA 20-1 to which the above enable signal (H level) should be given. The receive channel deciding unit 11c sends the above "plus one request" to the cell counting unit 13b each time one cell and an STS channel #i of the cell are written.

The counter 11b counts up its count value by clocks corresponding to a length of cells with a cell transmission start signal SOC (H level) from the UTOPIA 20-1 as a trigger. The receive channel deciding unit 11c monitors the count value of the counter 11b to determine an end of the received cells, and starts decision of the next receive STS channel #i at that timing (decide timing).

The read processing unit 14 reads a cell written in the data holding buffer 12a by the above external interface unit 11, reads an STS channel #i corresponding to the cell from the STS channel holding buffer 13a, and outputs the cell and the STS channel #i to the cell processing unit 30 to be described later. The read processing unit 14 comprises, has shown in FIG. 4(a), a reading control unit 14a and a counter 14b.

The counter 14b counts up its count value by clocks corresponding to a length of cells with a read flag (H level) from the cell processing unit 30 (to be described later) as a trigger. The reading control unit 14a successively reads out cells from the data holding buffer 12a each time the count value of the counter 14b becomes an initial value so long as a cell is held in the data holding buffer 12a. The reading control unit 14a sends the above "minus one request" to the cell counting unit 13b each time one cell is read out.

According to this embodiment, the cell processing unit 30 (to be described later) sends the above read flag in units of length of a cell (unit of one cell).

Hereinafter, description will be made in detail an operation of the UTOPIA 10 for receiving in the ATM processing apparatus 4 (ATM layer) with the above structure according to this embodiment.

The receive channel deciding unit 11c of the external interface unit 11 sends an address signal in order (serially) to any one of the UTOPIAs 20-1 for transmitting in an opposite mapping/demapping unit 2-i or 3-i to designate a UTOPIA 20-1 that is an object of cell reception in polling.

When the UTOPIA 20-1 is designated as a UTOPIA 20-1 that is an object of cell reception by the above address signal, the clav generating unit 23-1a [refer to FIG. 3(a)] in the external interface unit 23-1 sends back a cell holding status (as to whether the UOPTIA 20-1 holds a cell to be transmitted or not) using a clav signal.

The external interface unit 11 serially receives the clav signals in the above order designated by the effective channel holding unit 11a to store cell holding status information on each STS channel #i, and displays the stored contents in the receive channel deciding unit 11c.

The receive channel deciding unit tic decides a UTOPIA 20-1 (STS channel #i) that is an object of cell reception on the basis of the stored contents (cell holding status information) and presence/absence of a free space in the data holding buffer 12a managed for each STS channel #i in the cell counting unit 13b in the intermediate control unit 13, and sends an enable signal (H level) and an address signal to the decided UTOPIA 20-1.

Namely, the external interface unit 11 polls a cell holding status in the UTOPIA 20-1 for each physical layer (mapping/ demapping unit 2-i or 3-i), serially receives notification about the cell holding status of each UTOPIA 20-1, confirms the cell holding status of each STS channel #i, and decides which mapping/demapping unit 2-i or 3-i (UTOPIA 20-1) of an STS channel #i among the STS channels #i a transmit permission should be given to.

The UTOPIA 20-1 starts to read a cell by the transmit channel deciding unit 23-1c. In the external interface unit 11, the counter 11b operates (counts up) with a cell reading start signal SOC (H level) sent from the transmit channel deciding unit 23-1c of the UTOPIA 20-1 as a trigger.

According to a count value of the counter 11b, the receive channel deciding unit 11c executes a writing control on the buffers 12a and 13a to write a received cell in the data holding buffer 12a in the data holding unit 12, while writing an STS channel #i of the cell in the STS channel holding buffer 13a in the intermediate control unit 13.

At this time, the receive channel deciding unit 11c sends "plus one request" with respect to the number of held cell to the cell counting unit 13b in the intermediate control unit 13 each time one cell is written in the data holding buffer 12a.

The cell counting unit 13*b* counts up a count value of the STS channel #i to update information about the number of cells held in the data holding buffer 12*a* each time the cell counting unit 13*b* receives the "plus one request".

On the other hand, the read processing unit 14 refers to each count value of the cell counting unit 13*b* in the intermediate control unit 13 on occasion to monitor presence/absence of a cell in the data holding buffer 12*a*. If a cell is held in the data holding buffer 12*a*, the read processing unit 14 reads a cell in the order written from the data holding buffer 12*a* and reads an STS channel #i of the read cell from the STS channel holding buffer 13*a*, and outputs the cell and the STS channel #i to the cell processing unit 30 (Ups cell inserting unit 80).

At this time, the reading control unit 14*a* sends "minus one request" with respect to the number of held cell to the cell counting unit 13*b* each time the reading control unit 14*a* reads one cell from the data holding buffer 12*a*. The cell counting unit 13*b* counts down a count value of a corresponding STS channel #i each time the cell counting unit 13*b* receives the "minus one request" to update information about the number of held cells of the STS channel #i, and shifts forward a position in the STS channel holding buffer 13*a* at which the next STS channel #i is written.

Namely, the above external interface unit 11, the data holding unit 12 and the intermediate control unit 13 function as a received data managing unit for receiving a cell from an arbitrary physical layer among a plurality of physical layers (mapping/demapping units 2-i or 3-i) and managing the cell for each STS channel #i based on the STS channel #i as identification information about the physical layer. The read processing unit 14 transmits a cell along with the STS channel #i managed by the received data managing unit to the cell processing unit 30 to be described later.

As above, the read processing unit 14 outputs, for example, received cells (D1, D2, D3, D4 and D5) in the downstream shown in FIG. 5(*a*) received at an asynchronous timing from a physical layer (mapping/demapping unit 3-i) at a timing in synchronization with a length of the cell (at a reference timing in the ATM cell processing unit 4-1; cell synchronization) to the cell processing unit 30 (to be described later) [refer to FIGS. 5(*c*) and 5(*d*)].

Received cells (U1, U2, U3 and U4) in the upstream shown in FIG. 5(*b*) received at an asynchronous timing from a physical layer (mapping/demapping unit 2-i) are transferred to the reference timing in the ATM cell processing unit 4-1 shown in FIG. 5(*c*), and sent to the cell processing unit 30 (UpS cell inserting unit 80) (to be described later) as shown in FIGS. 5(*d*) and 5(*e*).

Namely, timings for ATM cell flows transmitting the upstream and the downstream (positions of the leading cells) within the ATM cell processing unit 4-1 become the same.

The reference timing in the ATM cell processing unit 4-1 is generated with 28 clocks (CLK) as one cycle, and one cycle is a range to process one cell (53 bytes). The reason why 28 clocks are one cycle is as follows. When a cell of 53 bytes is processed in parallel by 16 bits, one cell can be processed in 27 clocks. However, if an access is had to the single port RAM 94 once in four clocks, for example, 27 clocks cannot be divided. Therefore, 28 clocks are determined to be one cycle. When one cell is not processed in parallel by 16 bits, or when an access timing to the single port RAM 94 is altered, the number of clocks of the reference timing differs. Hereinafter, 28 clocks are assumed to be one cycle, but another clock number may be employed as one cycle.

(1-4) Description of the UTOPIA 20

FIG. 4(*b*) is a block diagram showing a detailed structure of the UTOPIA 20 for transmitting in the above ATM processing apparatus 4 (ATM layer). As shown in FIG. 4(*b*), the UTOPIA 20 comprises a write processing unit 21, a data holding unit 22, an intermediate control unit 23 and an external interface 24.

The data holding unit 22 holds a cell outputted from the cell processing unit 30 (UpS cell inserting unit 80) (to be described later). In consideration that a cell reading process in the external interfacing unit 24 might halt due to delay of a mapping process in the mapping unit 2*m* (3*m*), the data holding unit 22 comprises a data holding buffer 22*a* which can hold a plurality of cells.

The intermediate control unit 23 monitors the number of cells (holding status) held in the above data holding buffer 22*a* to manage presence/absence of a cell to be outputted to the UTOPIA 10-1, while managing an STS channel #i of the cell held in the data holding buffer 22*a*. To this end, the intermediate control unit 23 has an STS channel holding buffer 23*a* and a cell counting unit (CTR) 23*b*.

The STS channel holding buffer 23*a* holds an STS channel #i of a cell held in the above data holding buffer 22*a*, in which an STS channel #i outputted together with a cell from the cell processing unit 30 (UpS cell inserting unit 80) (to be described later) is written by a writing control unit 21*a* of the write processing unit 21.

Namely, the above data holding buffer 22*a* and the STS channel holding buffer 23*a* function as a storing unit for transmission which can store a cell and an STS channel #i [identification information on a physical layer (mapping/demapping unit 2-i or 3-i)].

The cell counting unit 23*b* counts the number of cells held in the buffer 22*a* for each STS channel #i. To this end, the cell counting unit 23*b* comprises counters (not shown) for respective STS channels #i to count up/count down of a count value of a corresponding counter (counter not shown for each STS channel #i) according to "plus one request"/ "minus one request" received each time the writing control unit 21*a* (to be described later) and a transmit channel deciding unit (reading control unit) 24*a* (to be described later) write/read a cell in the buffer 22*a*, thereby managing the number of held cells of each STS channel #i.

The write processing unit 21 receives a cell processed in the cell processing unit 30 (UpS cell inserting unit 80) (to be described later), and successively writes the cell in the data holding buffer 22*a*, while successively writing an STS channel #i of the cell in the STS channel holding buffer 23*a*. To this end, the write processing unit 21 comprises, as shown in FIG. 4(*b*), a counter 21*b* and the writing control unit 21*a*.

The counter 21*b* counts up with a cell arrival flag (H level) indicating a cell input from the cell processing unit 30 (UpS cell inserting unit 80—to be described later) as a trigger. The writing control unit 21*a* executes a writing control on the buffers 22*a* and 23*a* according to an output (count value) of the counter 21*b* to write a cell from the cell processing unit 30 (UpS cell inserting unit 80) (to be described later) in the data holding buffer 22*a*, while writing an STS channel #i from the cell processing unit 30 (UpS cell inserting unit 80) (to be described later) in the STS channel holding buffer 23*a*.

Namely, the above write processing unit 21 receives a cell to be transmitted to the UTOPIA 10-1 (opposite physical layer (mapping/demapping unit 2-i or 3-i)] and an STS channel #i of the cell from the cell processing unit 30 (UpS cell inserting unit 80) (to be described later), correlates the cell with the STS channel #i, and writes the cell and the STS channel #i in the buffers 22a and 23a, thereby managing the cell for each STS channel #i.

The external interface unit 24 reads a cell to be transmitted to the opposite physical layer (mapping/demapping unit 2-i or 3-i) (UTOPIA 10-1) from the data holding buffer 22a, and transmits the cell to the UTOPIA 10-1. The external interface unit 24 is configured as a permitted transmission type transmitting interface unit which gives a cell receive permission to an arbitrary UTOPIA 10-1 on the basis of the cell holding status (room for received cells) in the UTOPIA 10-1, and transmits the cell.

Figure 4B:
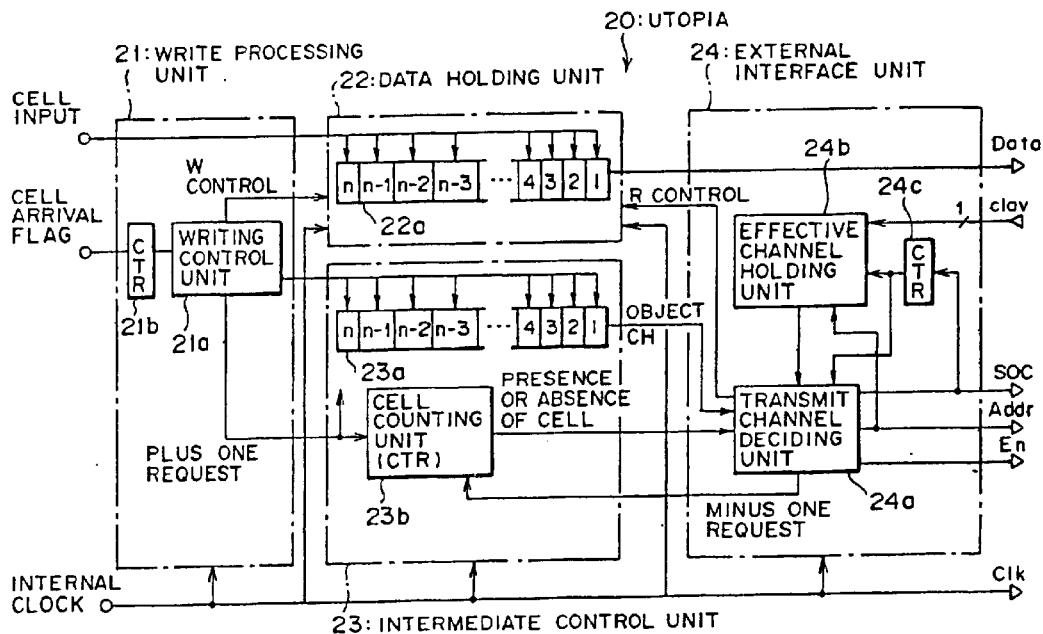

As shown in FIG. 4(b), the external interface unit 24 further comprises an effective channel holding unit 24b, a counter 24c, and a transmit channel deciding unit 24a.

When the transmit channel deciding unit 24a designates in polling (serially) a UTOPIA 10-1 that is an object of cell transmission using an address signal, the effective channel holding unit 24b holds a clav signal (H level in the case where there is a room, or L level in the case there is no room) indicating a cell holding status sent back from each UTOPIA 10-1, thereby storing the cell holding status (availability for receiving) for each STS channel #i.

The transmit channel deciding unit 24a decides a physical layer (mapping/demapping unit 2-i or 3-i) that is an object of cell transmission on the basis of the information held in the effective channel holding unit 24b and an STS channel #i held in the STS channel holding buffer 23a, sends an address signal (signal indicating an STS channel #i) and an enable signal (H level) (gives a reception permission) to the decided UTOPIA 10-1, reads a cell from the data holding buffer 22a, then transmits the cell to the UTOPIA 10-1.

Namely, the above transmit channel deciding unit 24a serially receives notification about a cell holding status from each of a plurality of UTOPIAs 10-1 [physical layers (mapping/demapping units 2-i or 3-i) ] to decide a UTOPIA 10-1 to which the above enable signal (H level) should be given. The transmit channel deciding unit 24a sends the above "minus one request" to the cell counting unit 23b each time one cell is read out.

The counter 24c counts up its count value by clocks corresponding to a length of cells with a cell transmission start signal SOC (H level) to the UTOPIA 10-1 as a trigger. The above transmit channel deciding unit 24a monitors a count value of the counter 24c to determine an end of the transmit cells, and starts to decide the next transmit channel (STS channel #i) at that timing (decide timing).

The UTOPIA 20 for transmitting in the ATM processing apparatus 4 (ATM layer) with the above structure according to this embodiment starts to count up by the counter 21b in the write processing unit 21 when receiving a cell arrival flag from the cell processing unit 30 (UpS cell inserting unit 80) (to be described later), and executes the writing control on the data holding buffer 22a in the data holding unit 22 and the STS channel holding buffer 23a in the intermediate control unit 23 according to a count value of the counter 21b, thereby successively writing a cell and an STS channel #i of the cell outputted from the cell processing unit 30 (UpS cell inserting unit 80) (to be described later) in the buffers 22a and 23a.

At this time, the writing control unit 21a sends "plus one request" with respect to the number of held cell to the cell counting unit 23b in the intermediate control unit 23 each time one cell is written in the data holding buffer 22a. The cell counting unit 23b updates a count value of a corresponding counter (counter not shown for each STS channel #i), and successively shifts a position in the STS channel holding buffer 23a at which the STS channel #i is written to the next to update the position each time the cell counting unit 23b receives the "plus one request".

In the external interface unit 24, the transmit channel deciding unit 24a sends an address signal in order (serially) to any one of the opposite UTOPIAs 10-1 for physical layer, thereby designating a UTOPIA 10-1 that is an object of cell transmission in polling.

When the UTOPIA 10-1 is designated as a UTOPIA 10-1 that is an object of cell transmission by the above address signal, the clav generating unit 11-1a [refer to FIG. 3(b)] in the external interface unit 11-1 sends back a cell holding status (as to whether there is a room for received cells or not) to the UTOPIA 20 (external interface unit 24) using a clav signal.

The external interface unit 24 serially receives the clav signal in the order designated, stores the cell holding status of each STS channel #i, and displays the stored contents in the transmit channel deciding unit 24a.

The transmit channel deciding unit 24a decides an STS channel #i [physical layer (UTOPIA 10-1)] that is an object of cell transmission on the basis of the stored contents (cell holding status information), presence/absence of a cell in the data holding buffer 22a managed for each STS channel #i by the cell counting unit 23b in the intermediate control unit 23 and the STS channel #i stored in the STS channel holding buffer 23a in the intermediate control unit 23.

Namely, the external interface unit 24 polls a cell holding status (room for received cells) in each physical layer (UTOPIA 10-1), serially receives a notification (clav signal) about the above cell holding status from each physical layer (UTOPIA 10-1) to ascertain a holding status of cells of each STS channel #i, and decides which physical layer among the physical layers (UTOPIAs 10-1) a cell receive permission should be given to.

The transmit channel deciding unit 24a sends an address signal and an enable signal (H level) to a UTOPIA 10-1 for the above decided transmit STS channel #i, reads a cell from the data holding buffer 22a, and transmits the cell along with a reading start signal SOC to the above UTOPIA 10-1.

At this time, the transmit channel deciding unit 24a sends "minus one request" with respect to the number of held cells to the cell counting unit 23b each time one cell is read out from the data holding buffer 22a. The cell counting unit 23b counts down a count value of the corresponding STS channel #i each time the cell counting unit 23b receives the "minus one request" to update information on the number of held cells of the STS channel #i, and shifts forward a position in the STS channel holding buffer 23a at which the next STS channel is written by one.

Namely, the above write processing unit 21, the data holding unit 22 and the intermediate control unit 23 manage a cell processed in the cell processing unit 30 (UpS cell inserting unit 80) to be described later for each physical layer on the basis of an STS channel #i as identification information on a physical layer (mapping/demapping unit 2-i or 3-i). The external interface unit 24 transmits the managed cells to an arbitrary physical layer on the basis of the above STS channel #i.

Figure 6:
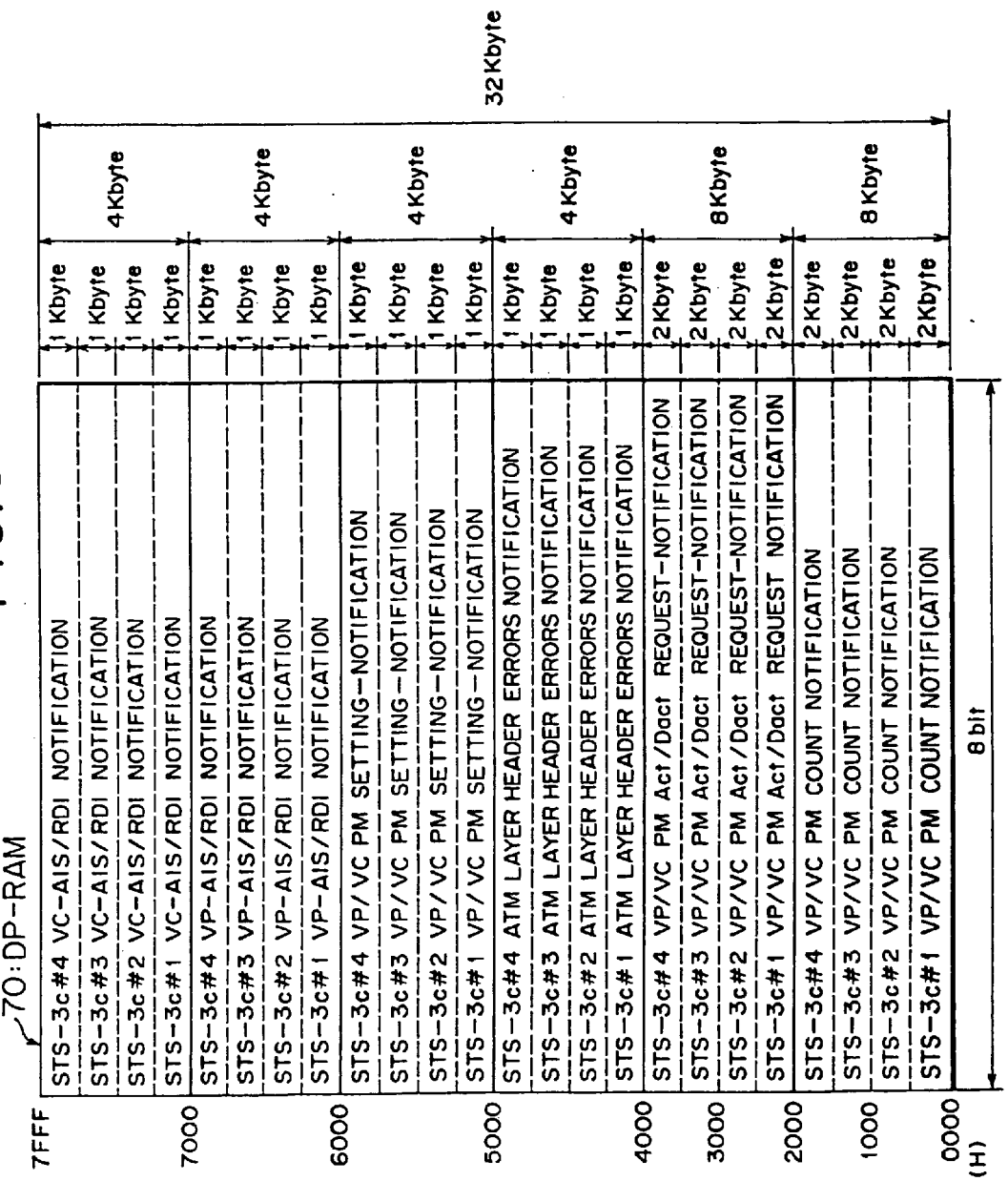
FIG. 6 is a block diagram showing a DP-RAM according to the embodiment of this invention.

The DP-RAM I/F unit 60 shown in FIG. 2 interfaces with the external DP-RAM 70. The DP-RAM I/F unit 60 writes ALM (AIS, RDI) information from the cell processing unit 30 in the DP-RAM 70, reads information relating to a PM process set in the DP-RAM 70 from the microcomputer 95, and writes information to be notified the microcomputer 95 from the PM processing unit 50. The DP-RAM 70 can hold information about VC-AIS/RDI, VP-AIS/RDI and the like for each STS-3c [STS channel #i (i=1 to 4)] when handling, for example, four channels of STS-3c, as shown in FIG. 6.

The UpS cell inserting unit (inserting unit) 80 inserts each cell according to an ALM cell insert request (request for inserting an ALM cell) from the cell processing unit 30, an LB cell inserting request (request for inserting an LB cell) from the LB processing unit 40 and a PM cell insert request (request for inserting a PM cell) from the PM processing unit 50. Further, the UpS cell inserting unit 80 generates ALM when detecting disconnection of a cell flow in the upstream.

Figure 7:
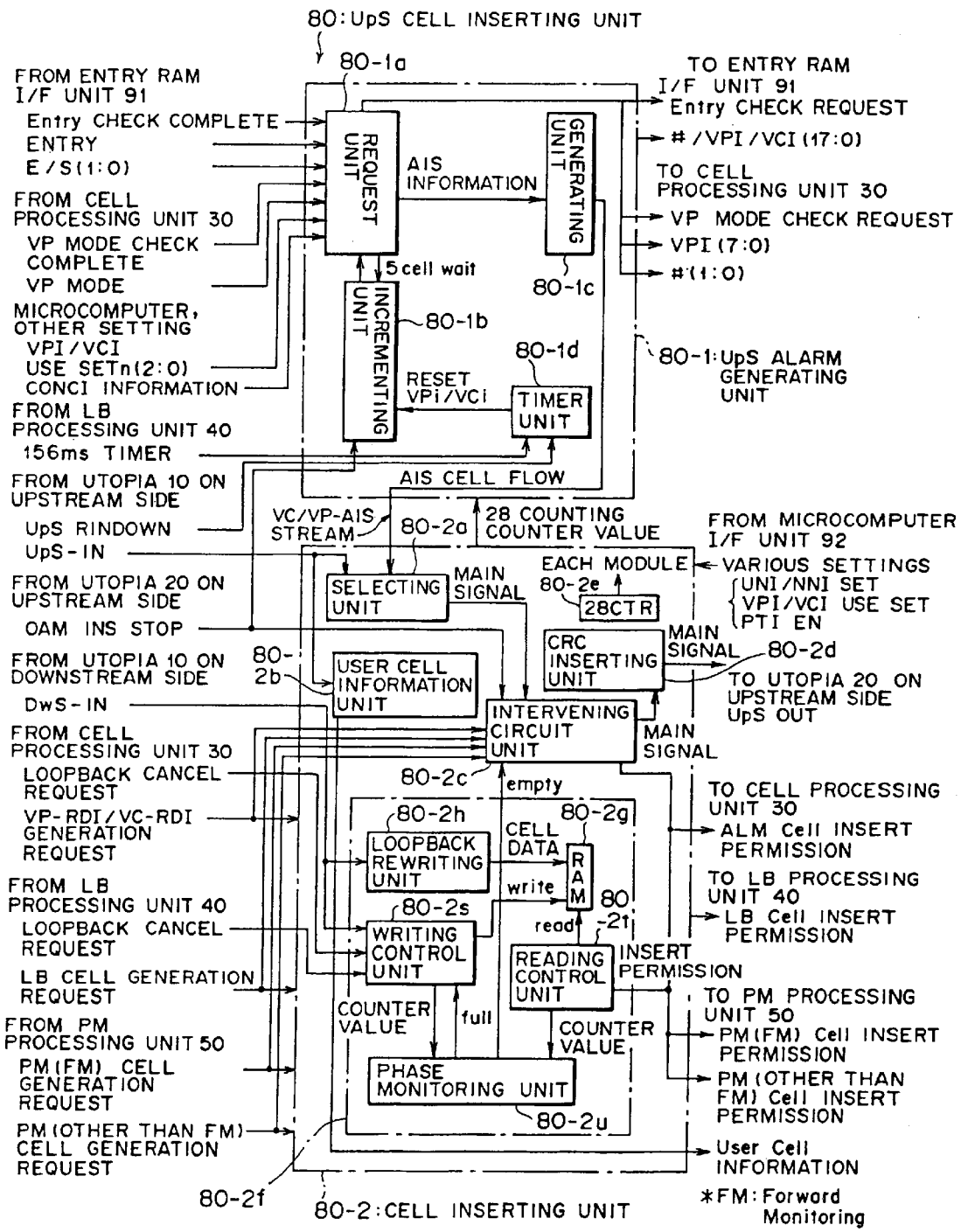
FIG. 7 is a block diagram showing an UpS cell inserting unit according to the embodiment of this invention.

To this end, the UpS cell inserting unit 80 comprises, as shown in FIG. 7, an UpS alarm generating unit 80-1, and a cell inserting unit 80-2.

The UpS alarm generating unit 80-1 generates an ALM cell, which comprises, as shown in FIG. 7, a request unit 80-1a, an incrementing unit 80-1b, a generating unit 80-1c and a timer 80-1d.

The request unit 80-1a outputs a check request to check an entry RAM 94 (to be described later) or a VP termination information RAM 37 (to be described later) to a RAM access intervening unit 91 or the cell processing unit 30 when input disconnection is detected, determines whether an AIS cell is generated or not on the basis of entry information or VP termination information received from the cell processing unit 30 or the like, and sends the AIS information to the generating unit 80-1c when generating the AIS cell. The incrementing unit 80-1b corrects VPI (Virtual Path Identifier)/VCI (Virtual Channel Identifier) [transmission route identification information]. The timer unit 80-1d holds a time interval at which an AIS cell is generated. When input disconnection is detected, the generating unit 80-1c generates an AIS cell, and sends the AIS cell to the cell inserting unit 80-2.

When input disconnection is detected, the timer unit 80-1d starts a 1 s (second) timer, the incrementing unit 80-1b sets VPI to "000h (h:hex)" and VCI to "000h", the request unit 80-1a outputs a check request to the VP termination information RAM 37 and the entry RAM 94 on the basis of the VPI/VCI and determines whether an AIS cell is generated or not on the basis of read information, and the generating unit 80-1c outputs an AIS cell when the AIS cell is determined to be generated.

Figure 8:
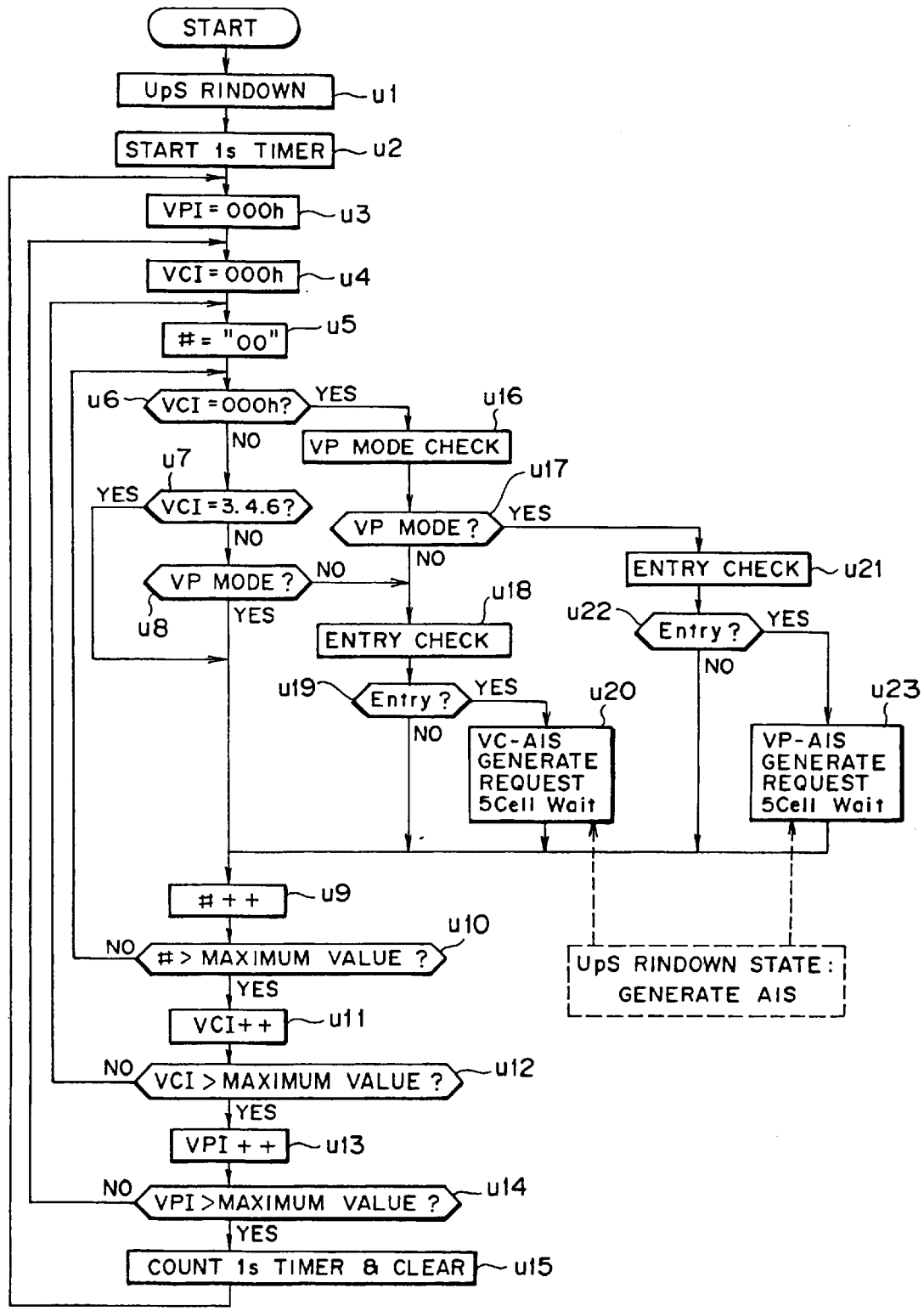
FIG. 8 is a flowchart for illustrating a process of generating an AIS cell in the UpS cell inserting unit according to the embodiment of this invention.

FIG. 8 is a flowchart for illustrating generation of an alarm cell when input disconnection is detected. When an input disconnection status is detected (Step u1), the timer unit 80-1d starts the 1s timer (Step u2), the incrementing unit 80-1b sets VPI to "000h" (h or H is in hexadecimal), VCI to "000h" and STS channel #i to "00" (Steps u3 to Steps u5).

The request unit 80-1a determines whether VCI is "000h" or not (Step u6). When VCI is "000h", the request unit 80-1a generates a request to check VP mode (from YES route at Step u6 to Step u16), and determines whether VP mode or not on the basis of data read out from the VP termination information RAM 37 (whether termination is set or not) (Step u17). Irrespective of whether VP mode is set or not, the request unit 80-1a outputs an entry check request (request for checking an entry—from YES route at Step u17 to Step u21, or from NO route at Step u17 to Step u18) to determine whether Entry is set or not (Step u19 and u22).

When VP termination and Entry are set, the request unit 80-1a outputs a VP-AIS cell generate request (request for generating a VP-AIS cell) to the generating unit 80-1c, and gets into a 5Cell wait status after outputting the generate request (from YES route at Step u22 to Step u23). When VP termination is not set and Entry is set, the request unit 80-1a outputs a VC-AIS cell generate request (request for generating a VC-AIS cell) to the generating unit 80-1c, and gets into a 5Cell wait status after outputting the generate request (from YES route at Step u19 to Step u20). When Entry is not set (determined as NO route at Step 19 or Step u22), or after the request unit 80-1a outputs a generate request to the generating unit 80-1c, the request unit 80-1a counts up a value of the STS channel #i (Step u19 to Step u9, Step u20 to Step u9, Step u22 to Step u9 or Step u23 to Step u9).

When the request unit 80-1a outputs the VP-AIS/VC-AIS generate request to the generating unit 80-1c, AIS information as generated cell information is transmitted from the request unit 80-1a to the generating unit 80-1c.

When the VCI is not "000h", the request unit 80-1a further determines whether VCI is any one of "3", "4" and "6" (from NO route at Step u6 to Step u7). When VCI is not any one of "3", "4" and "6", the request unit 80-1a determines whether VPI/VCI is set to VP mode or not (from NO route at Step u7 to Step u8). When the VPI/VCI is not in the VP mode, the request unit 80-1a outputs an entry check request (from NO route at Step u8 to Step u18). When VPI/VCI is in VP mode or VCI is any one of "3", "4" and "6", the request unit 80-1a shifts a counting-up process to count up a value of the STS channel #i (Step u7 to Step u9, or from YES route at Step u8 to Step u9).

The request unit 80-1a then determines whether a value counted-up of the STS channel #i is the maximum value or not (Step u10), repeats the above process until the value of the STS channel #i becomes the maximum value (until determined YES at Step u10) (Step u6 to Step u10, or Step u16 to Step u23), and successively counts up the VCI value (Step u11).

The request unit 80-1a determines whether a counted-up VCI value is the maximum value or not (Step u12), repeats the above process until the VCI value becomes the maximum value (until determined YES at Step u12) and successively counts up the VPI value (Step u13).

Further, the request unit 80-1a determines whether a counted-up VPI value is the maximum value or not (Step u14), repeats the above process (Steps u4 to u14, Steps u16 to u23) until the VPI value becomes the maximum value (until determined YES at Step u14). After that, a value of the timer unit 80-1d is updated (Step u15).

The UpS cell inserting unit 80 generates a AIS cell flow while satisfying a minimum cell insertion interval when input disconnection is detected. When generating an AIS cell, the UpS cell inserting unit 80 repeats a VP MODE check and an entry check on each VPI/VCI while detecting the input disconnection, and outputs a request to generate an AIS cell when a condition is satisfied. Incidentally, an input disconnection status is a condition to start and continue the flowchart.

As stated above, the UpS alarm generating unit 80-1 functions as an input disconnection state detecting unit for detecting input disconnection in the upstream and an alarm generating unit for periodically generating an AIS cell toward another ATM processing apparatus 4.

The cell inserting unit 80-2 shown in FIG. 7 inserts each cell transmitted from the cell processing unit 30, the LB processing unit 40 or the PM processing unit 50 to an empty cell area in a cell flow sent from the UTOPIA 10 (refer to FIG. 2) on the upstream side.

To this end, the cell inserting unit 80-2 comprises, as shown in FIG. 7, for example, a selecting unit 80-2a, a USER cell information unit 80-2b, an intervening circuit unit 80-2c, a CRC inserting unit 80-2d, a 28-counting counter 80-2e, an FIFO unit 80-2f.

The selecting unit 80-2a selects a cell flow.

The selecting unit 80-2a selects either a cell flow from the UTOPAI 10 (refer to FIG. 2) on the upstream side or a cell flow from the UpS alarm generating unit 80-1. After input disconnection is detected, the selecting unit 80-2*a* switches a main signal from a normal cell flow to an AIS cell flow generated by the UpS cell alarm generating unit 80-1, and outputs.

When an ATM cell to be inserted into an empty area in the ATM cell flow exists other than a loopback cell (LB cell), the intervening circuit unit (intervening circuit) 80-2*c* intervenes insert timings for the loopback LB cell and the other ATM cell. The intervening circuit unit 80-2*c* preferentially outputs data held in the FIFO unit 80-2*f*, whereas outputting an insert cell from the cell processing unit 30, LB processing unit 40 or the PM processing unit 50 when no cell data to be looped back is prepared in the FIFO unit 80-2*f*.

In concrete, the intervening circuit unit 80-2*c* manages cells that are objects of insertion in the order of cell insert request signals' arrival, and outputs the cells in the order of their arrival. When the cell insert request signals arrive at the same time, the intervening circuit unit 80-2*c* outputs the cells in the order of priority.

For this, the intervening circuit unit 80-2*c* encodes the cell insert request signals having arrived, and manages the signals, where a cell insert request signal having a higher priority from the cell processing unit 30, the LB processing unit 40 or the PM processing unit 50 is given a code having a larger value. However, the intervening circuit unit 80-2*c* preferentially inserts data from the FIFO unit 80-2*f* since the data from the FIFO unit 80-2*f* is outside the arrival order management. Incidentally, no request is expressed by "0".

Table 1 below shows an example of codes in the arrival order management.

TABLE 1

EXAMPLE OF CODES IN ARRIVAL ORDER MANAGEMENT

| Priority | Type of Generate Request | Management Code | Remarks |
|---|---|---|---|
| 1 | FIFO | — | Top Priority |
| 2 | Generate RDI | 111 | Basically, in the order of arrival. |
| 3 | PM (FM) | 110 | |
| 4 | PM (other than FM) | 101 | Applied only when requests arrive simultaneously. |
| 5 | Generate LB | 100 | |

Figure 9:
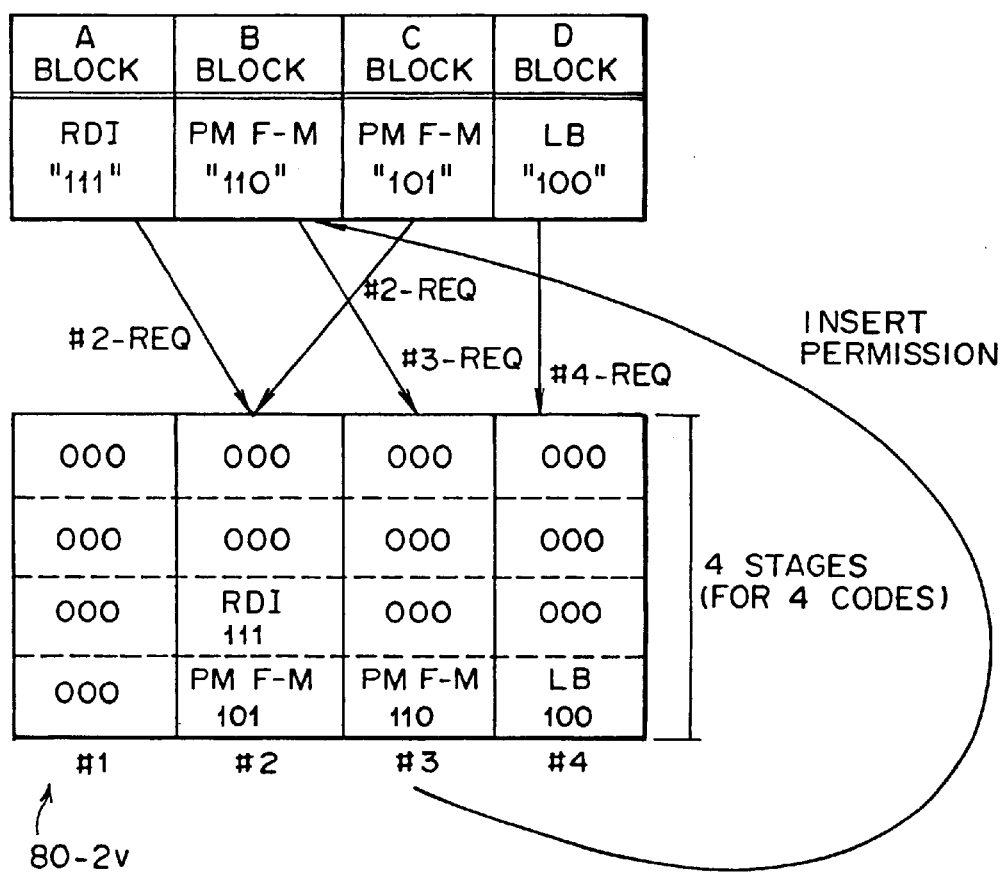
FIG. 9 is a diagram showing an example of a data structure in a RAM according to the embodiment of this invention.

Codes of cells shown at priority 2 to 5 in the above Table 1 are held for each STS channel #i in a memory 80-2*v*, as shown in FIG. 9. The intervening circuit unit 80-2*c* reads a code (Table 1 above) managed in the order of arrival when cell data to be looped back (loopback data) is not yet prepared in the FIFO unit 80-2*f*.

When reading the code, the intervening circuit unit 80-2*c* selects a code having the highest priority among the leading codes of each STS channel #i.

For instance, the memory 80-2*v* shown in FIG. 9 is assumed to have codes, that is, a code of a PM (other than FM cell) cell insert request generated first in the STS channel #2, a code of an RDI cell insert request generated secondary in the STS channel #2, a code of an LB cell insert request generated thirdly in the STS channel #4, and a code of an LB cell insert request generated fourthly in the STS channel #3. The intervening circuit unit 80-2*c* selects a code "110" of the PM cell (FM cell) in the STS channel #3 having the highest priority among the codes in the lead held for the STS channels #1 through #4, and outputs an insertion permit signal (signal for permitting to insert a cell) to the PM processing unit 50.

When reading a code in the next occasion, the intervening circuit unit 80-2*c* selects an STS channel #1, #2 or #4 other than the STS channel #3 selected in the last occasion. This time, the STS channel #4 has to be preferentially selected.

The intervening circuit unit 80-2*c* excludes a code in the STS channel #i that is an object of insert inhibition in the selection, so that a main signal of the STS channel #i that is an object of insert inhibition is interrupted while the intervening circuit unit 80-2*c* receives a cell insertion inhibit signal from the UTOPIA 20 on the upstream side.

The CRC inserting unit 80-2*d* adds calculated CRC-10 information to the main signal from the intervening circuit 80-2*c*, and outputs the data to the UTOPIA 20 (refer to FIG. 2) on the upstream side. For example, the CRC inserting unit 80-2*d* adds data [to be described later with reference to FIG. 10 (23–28)] not held in a DP-RAM 80-2*g* to be described later, operates CRC, and adds the operated CRC to the added data.

The FIFO unit 80-2*f* holds VP-RDI or VC-RDI information generated in the cell processing unit 30 and LB cell information to the opposite ATM processing apparatus 4, and outputs the information in the order of arrival. As shown in FIG. 7, the FIFO unit 80-2*f* comprises the DP-RAM 80-2*g*, a loopback rewriting unit 80-2*h*, a writing control unit 80-2*s*, a reading control unit 80-2*t*, a phase monitoring unit 80-2*u*.

The DP-RAM (loopback data holding unit) 80-2*g* holds loopback LB cell data and RDI cell data (hereinafter referred as "FIFO", occasionally), which holds, as shown in FIGS. 10(*a*) and 10(*b*), holds only a part [region at (1 to 22) in FIGS. 10(*a*) and 10(*b*)] of loopback data. FIG. 10(*a*) shows an example where the DP-RAM 80-2*g* holds an RDI cell, while FIG. 10(*b*) shows an example where the DP-RAM 80-2*g* holds an LB cell.

Here, the DP-RM 80-2*g* is configured with a dual port RAM (DP-RAM) of 110 words×16 bits, which can hold 5 cells (22 words for one cell) of cell data to be looped back (RDI cell, LB cell) shown in FIGS. 10(*a*) and 10(*b*).

Figure 11:
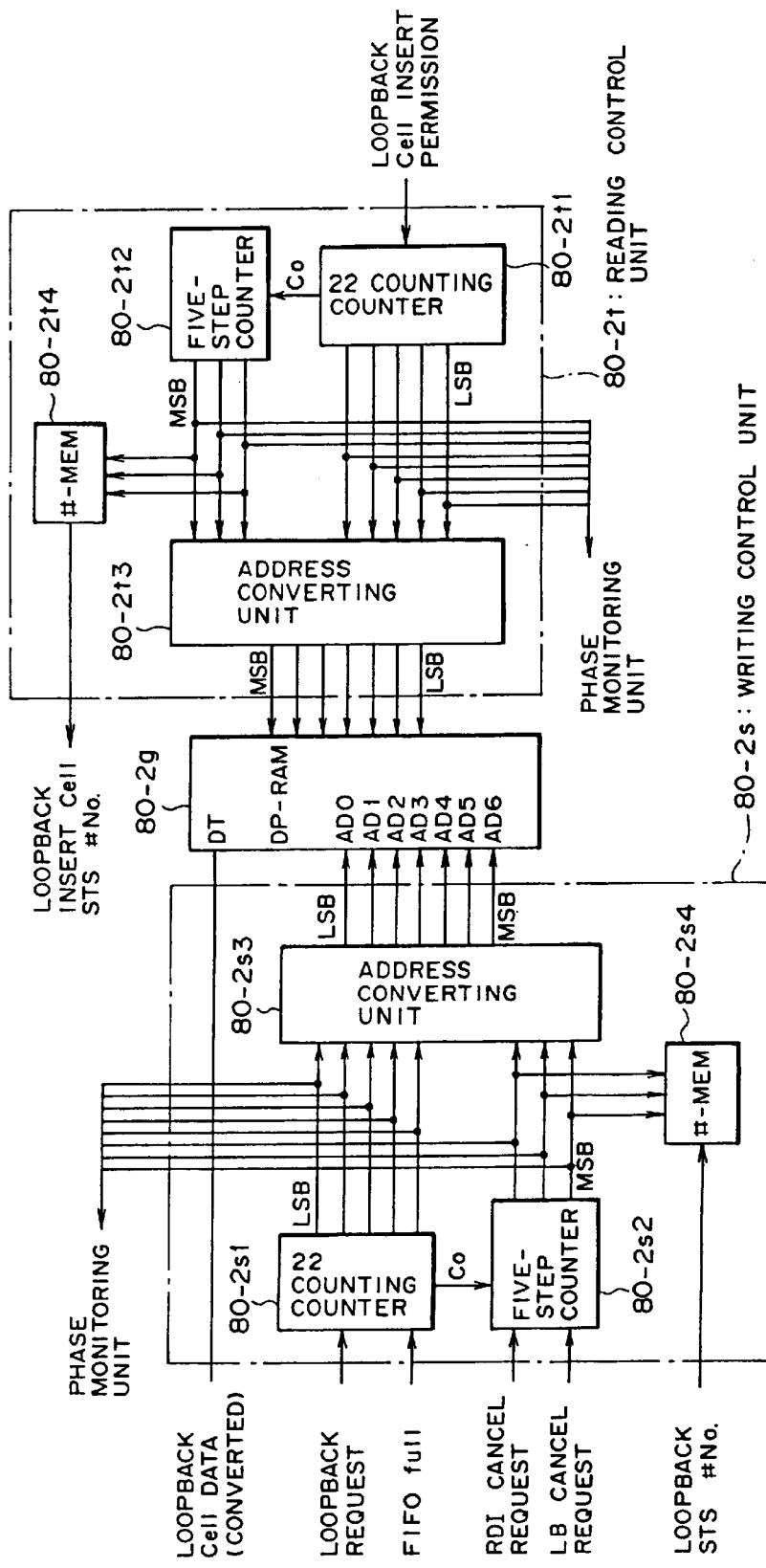
FIG. 11 is a block diagram showing a writing control unit and a reading control unit according to the embodiment of this invention.

The data in the cell to be looped back is written in the DP-RAM 80-2*g* under a control of the writing control unit 80-2*s*, and read out from the DP-RAM 80-2*g* under a control of the reading control unit 80-2*t*. FIG. 11 is a block diagram showing structures of the writing control unit 80-2*s* and the reading control unit 80-2*t*.

The writing control unit 80-2*s* writes the cell data to be looped back in the DP-RAM 80-2*g* at the time of a loopback write request, and cancels the received data to be looped back by receiving a cancel signal.

To this end, the writing control unit 80-2*s* comprises, as shown in FIG. 11, a 22-counting counter 80-2*s*1, a five-step counter 80-2*s*2, an address converting unit 80-2*s*3, a #-MEM 80-2*s*4.

The 22-counting counter 80-2*s*1 executes 22-counting process in 22-counting operation at the time of a loopback request to give an address to the DP-RAM 80-2*g*. When receiving a FIFO-FULL signal, the 22-counting counter 80-2*s*1 nullifies the loopback request, and does not count.

The 5-counting counter 80-2*s*2 receives a carry-out signal of the 22-counting counter 80-2*s*1, and executes 5-counting process, thereby managing the number of stages of FIFO. When receiving a RDI cancel request (request for canceling a RDI cell: cancel signal) OR an LB cancel request (request for canceling an LB cell: cancel signal), the five-step counter 80-2*s*2 stops updating of a count value, thereby canceling a RDI cell or an LB cell written in the DP-RAM 80-2*g* at that time.

For instance, when there is no request to cancel FIFO generated from a final result of determination (AIS, LB, loopback determination) on a cell to be looped back immediately before an end of capturing, the 5-counting counter 80-2s increments a 5-counting count value. When there is a cancel request, the 5-counting counter 80-2s2 does not increment the number of stages, so as to be over-written at the time of the next write request since writing in the FIFO 80-2g becomes invalid. The LB cancel request is transmitted from the LB processing unit 40 when the LB cell to be looped back does not correspond to data to be looped-back to another fixed-length data processing apparatus 4.

When the cell inserting unit 80-2 is notified from the LB processing unit 40 that data to be looped back held in the FIFO 80-2g is not data to be looped back to another ATM processing apparatus 4, the cell inserting unit 80-2 cancels the data to be looped back held in the FIFO 80-2g.

The address converting unit 80-2s3 converts a 22-counting count value (5 bits)×a 5-counting count value (3 bits) into a value of 7 bits (0 to 109). The #-MEM 80-2s4 holds an STS channel #i number of a cell to be looped back at the time of a loopback request.

Figure 12:
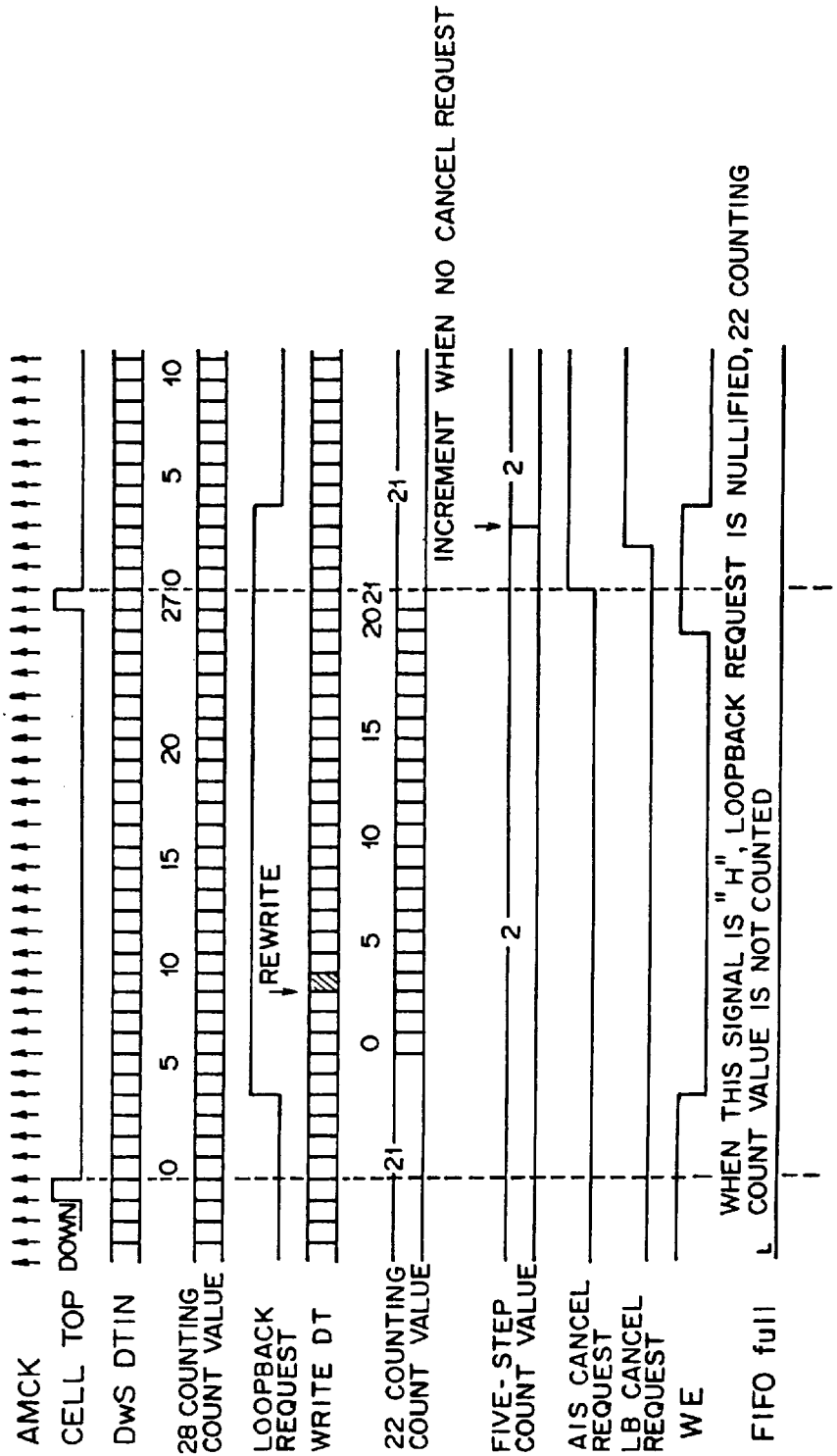
FIG. 12 is a timing diagram for illustrating an operation of the writing control unit according to the embodiment of this invention.

FIG. 12 is a timing diagram for illustrating an operation of the writing control unit 80-2s. The 22-counting counter 80-2s1 operates in order to capture data in a specified part of a cell to be looped back, and the address converting unit 80-2s3 gives an address to the FIFO 80-2g. When there is no FIFO cancel request signal generated from a final result of determination (AIS, LEB loopback determination) on a cell to be looped back immediately before an end of capturing, the 5-counting counter 80-2s2 increments a 5-counting count value. When there is a cancel request, the 5-counting counter 80-2s2 does not increment the number of stages.

In this case, there is no writing in the FIFO 80-2g, and the data is over-written at the time of the next write request. A reading is done by a generation permit signal after intervening.

On the other hand, the writing control unit 80-2t reads the cell data written in the DP-RAM 80-2g when received an loopback cell insert permission signal (signal for permitting to insert an loopback 5 cell). As shown in FIG. 11, the reading control unit 80-2t comprises a 22-counting counter 80-2t1, a 5-counting counter 80-2t2, an address converting unit 80-2t3 and a #-MEM 80-2t4.

The 22-counting counter 80-2t1 executes 22-counting process when a cell to be looped back is inserted. The 5-counting counter 80-2t2 manages the number of stages of FIFO. The 5-counting counter 80-2t2 receives a carry-out signal of the 22-counting counter 80-2t1 to execute 5-counting 15 process. The address converting unit 80-2t3 converts a 22-counting count value (5 bits)×a 5-counting count value (3 bits) into a value of 7 bits (0 to 109). The #-MEM 80-2t4 holds STS channel #i information of a leading cell in the FIFO 80-2g during an insert request, which is configured with a flip-flop of 2 bits×five stages.

Figure 13:
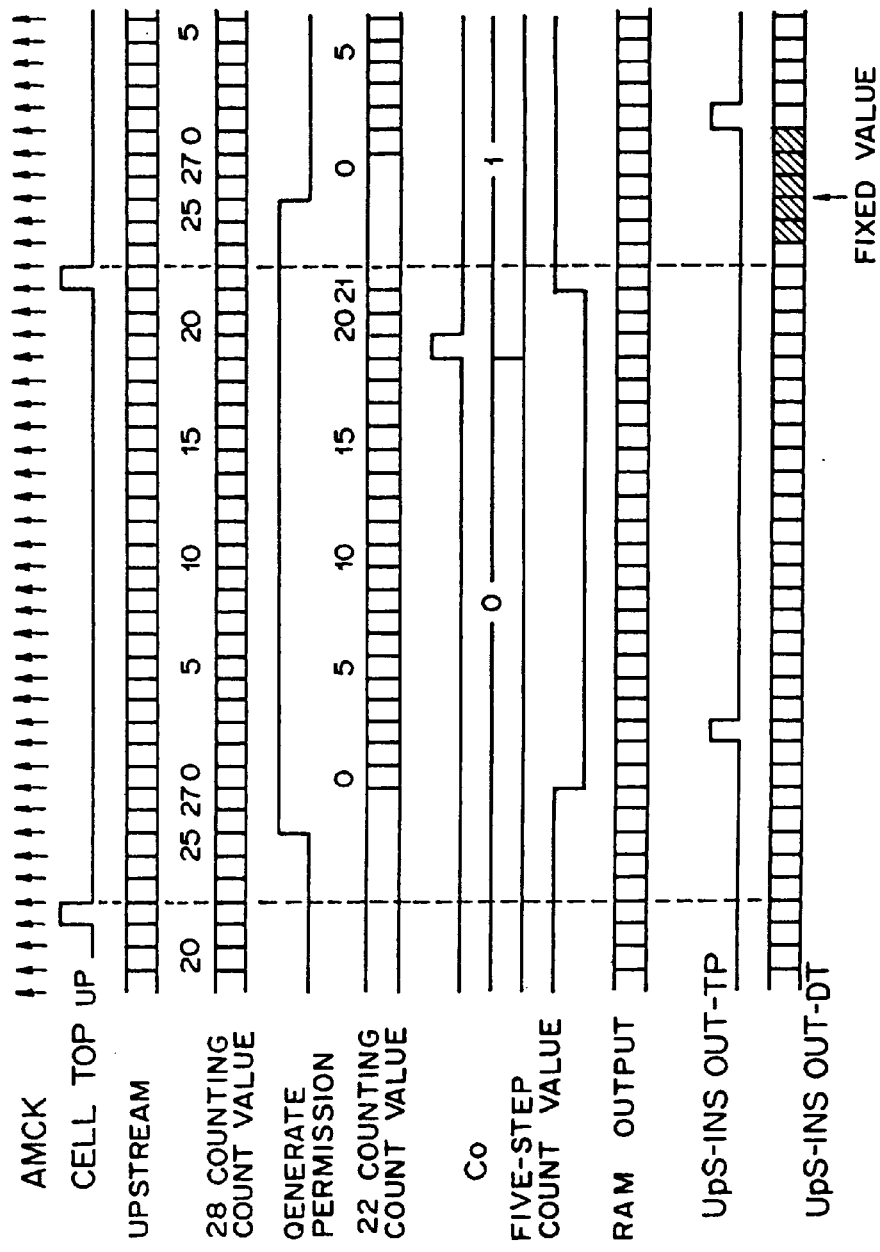
FIG. 13 is a timing diagram for illustrating operations of the reading control unit and the writing control unit according to the embodiment of this invention.

FIG. 13 is a timing diagram for illustrating an operation of the reading control unit 80-2t. With reception of a generation permit signal for a cell to be looped back held in the FIFO 80-2g as an opportunity, the 22-counting counter 80-2t1 operates, the address converting unit 80-2t3 gives an address to the FIFO 80-2g, and cell data to be looped back is successively outputted from a region designated by the address.

The phase monitoring unit 80-2u shown in FIG. 7 monitors a phase difference between a write address and a read address of the DP-RAM 80-2g, and generates FIFO-FULL or FIFO-empty according to a data holding status of the FIFO 80-2g.

FIFO-FULL indicates that no writing is done in the DP-RAM 80-2g, which nullifies a write request signal in the writing control unit 80-2s. With respect to FIFO-empty, the phase monitoring unit 80-2u outputs this signal as a cell to be looped back insert request to the intervening circuit unit 80-2c when there is cell data which can be looped back held in the DP-RAM 80-2g.

Figure 14:
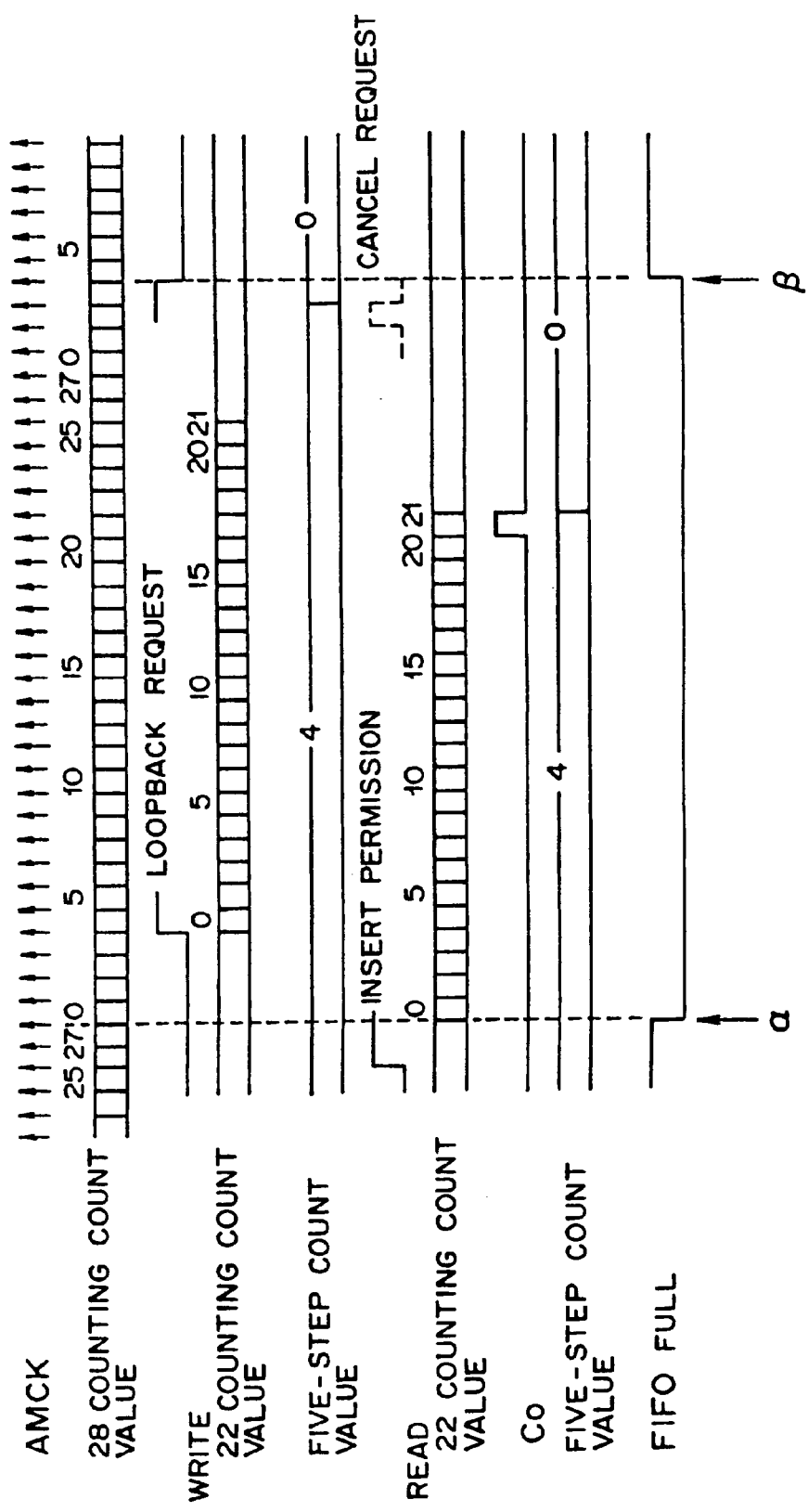
FIG. 14 is a timing diagram for illustrating an operation of a phase monitoring unit according to the embodiment of this invention.
Figure 15:
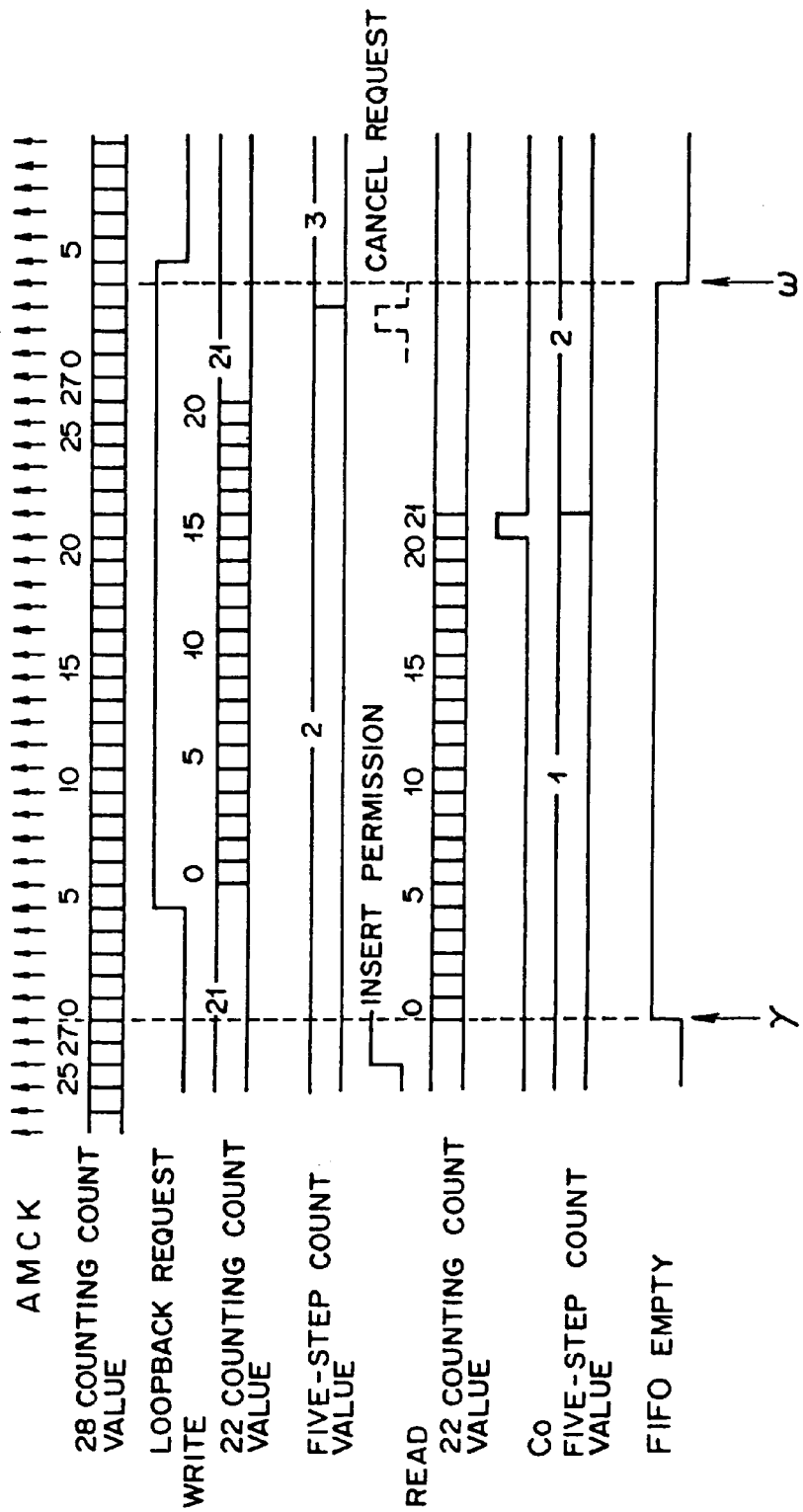
FIG. 15 is a timing diagram for illustrating an operation of the phase monitoring unit according to the embodiment of this invention.

FIGS. 14 and 15 are timing diagram for illustrating an operation of the phase monitoring unit 80-2u. As shown at a timing a in FIG. 14, the phase monitoring unit 80-2u makes a FIFO-full signal "L" if conditions that an insertion permit signal is "H", the FIFO-full signal is "H" and a read 5-counting count value is equal to a write 5-counting count value are satisfied when a 28-counting count value is "27". As shown at a timing β, if conditions that the loopback request is "H", the cancel request is "L", the FIFO-full signal is "L" and a read 5-counting count value is equal to a write 5-counting count value are satisfied when a 28-counting count value is "3", the phase monitoring unit 80-2u makes the FIFO-full signal "H".

On the other hand, as shown at a timing γ in FIG. 15, if conditions that the insertion permit signal is "H", the FIFO-empty signal is "L" and a read 5-counting count value is smaller than a write 5-counting count value are satisfied when a 28-counting count value is "27", the phase monitoring unit 80-2u makes the FIFO-empty signal "H" As shown at a timing ω, if conditions that the loopback request is "H", the cancel request is "L", the FIFO-empty signal is "H" and a read 5-counting count value is smaller than a write 5-counting count value are satisfied, the phase monitoring unit 80-2u makes the FIFO-empty signal "L".

The loopback rewriting unit 80-2h shown in FIG. 7 receives loopback cell data outputted from the UTOPIA 10 on the downstream side, and rewrites loopback information [Loopback Indication (refer to FIG. 44)] "1" to "0".

When there are a plurality of requests to access to the entry RAM 94, the ENTRY-RAM I/F (intervening control unit) 91 shown in FIG. 2 intervenes (intervenes timings) on the basis of a predetermined order of priority of RAM access to perform an access processing to the entry RAM 94. Table 2 below shows the order of priority of access to the entry RAM 94.

TABLE 2

EXAMPLE OF ORDER OF PRIORITY
OF ACCESS TO ENTRY RAM 94

| | Access Timing | | | | | | | |
|---|---|---|---|---|---|---|---|---|
| Item of Access | A | B | C | D | E | F | G | Priority |
| Receive Entry Check | 1 | — | — | — | — | — | — | HIGH |
| Entry Setting (μ-com)Access | 2 | 1 | 1 | 1 | 1 | 1 | 1 | |
| LB Setting (μ-com)Access | 3 | 2 | 2 | 2 | 2 | 2 | 2 | |
| ALM Cell Generation (UpStream) Entry Check | — | — | — | 3 | — | — | — | |
| ALM Cell Generation (DownStream) Entry Check | 4 | 3 | 3 | 4 | 3 | 3 | 3 | LOW |

Figure 16:
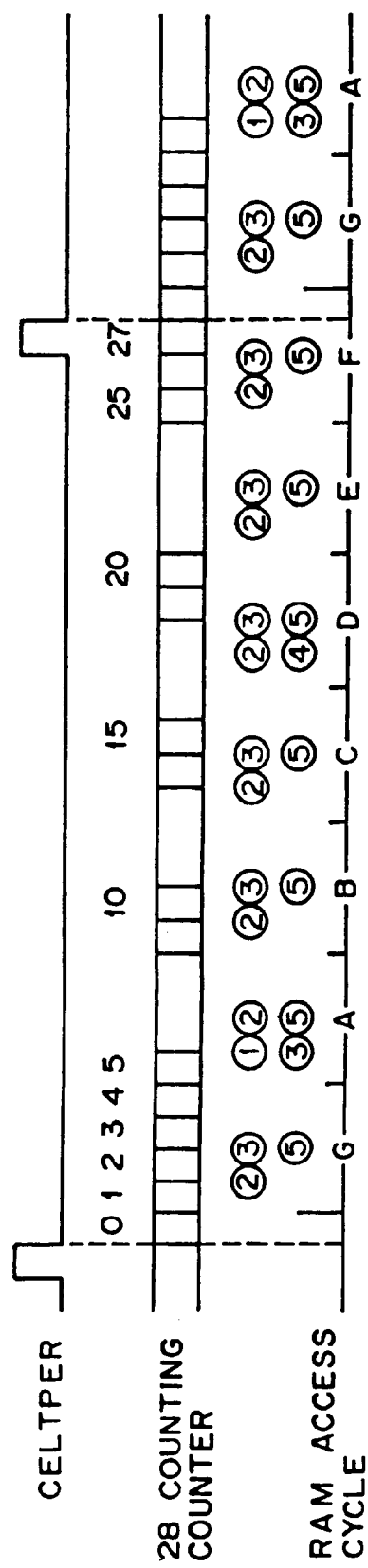
FIG. 16 is a timing diagram for illustrating access timings to an entry RAM of a RAM access intervening unit according to the embodiment of this invention.

FIG. 16 is a timing diagram for illustrating access timings to the entry RAM 94. As shown in FIG. 16, when there are a plurality of access requests at a predetermined access timing (opportunity indicated at any one of A through G in the above Table 2), an access to the entry RAM 94 is had according to the order of priority shown in the above Table 2. An opportunity to access to the entry RAM 94 in order to make a receive entry check is determined at an access timing A.

The microcomputer I/F unit 92 (also referred as "microcomputer interfacing unit") interfaces with the microcomputer 95. A setting of a system operation mode, a setting of an operation channel and the like are sent from the microcomputer 95, and these kinds of information are notified the ATM cell processing unit 4-1. The microcomputer I/F unit 92 relays transmission/reception of data between a microcomputer transfer I/F unit 42-1 (refer to FIG. 45) and the microcomputer 95. The microcomputer I/F unit 92 receives setting data for LB processing, information about the number of times of retry and the like from the microcomputer 95, and transmits the data to the microcomputer transfer I/F unit 42-1 in the LB processing unit 40. Further, the microcomputer I/F unit 92 receives entry information and the like from the microcomputer 95, and transmits the data to the entry RAM 94.

Figure 17:
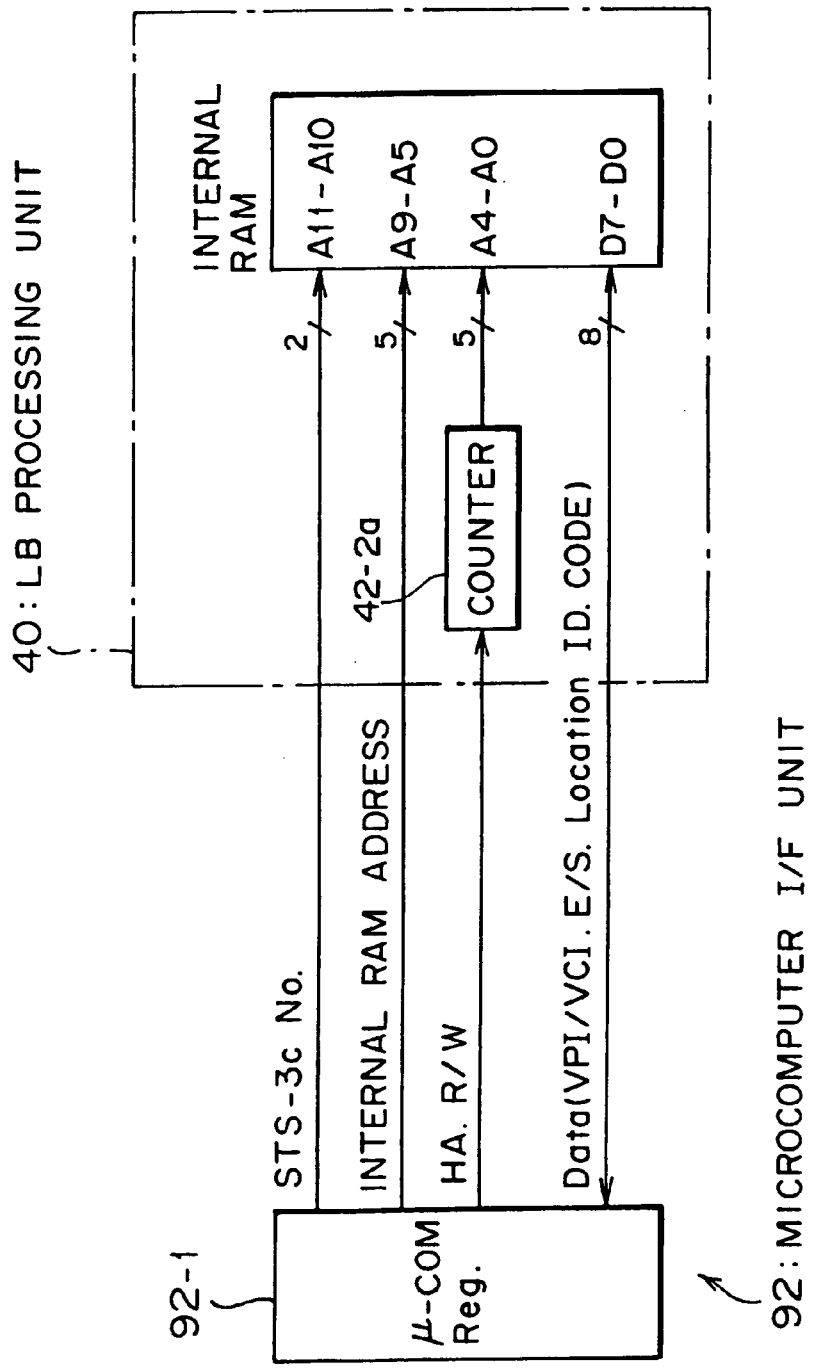
FIG. 17 is a block diagram showing a microcomputer I/F unit according to the embodiment of this invention.

The microcomputer I/F unit 92 holds setting data (to be described later) from the microcomputer 95 to the LB processing unit 40, while holding the setting data read out from the LB processing unit 40. To this end, the microcomputer I/F unit 92 comprises, as shown in FIG. 17, a microcomputer register 92-1. The microcomputer register (register) 92-1 holds setting data, holding predetermined information in a predetermined region as shown in FIG. 18, for example. Hereinafter, a region in which information shown in FIG. 18 is held is referred as a bit map.

The bit map shown in FIG. 18 holds information showing either write setting or read setting (R/W) STS channel #i information (STS-3c. NO), internal RAM address (refer to "d-16" in FIG. 19 to be described later), information inhibiting an access to the microcomputer 95 set by software [HA (referred as HA bit, occasionally), VPI/VCI, E/S, information showing a loopback point for LB cell (Location ID) and internal codes for notifying the microcomputer 95 (refer to Table 5 shown later).

Figure 20:
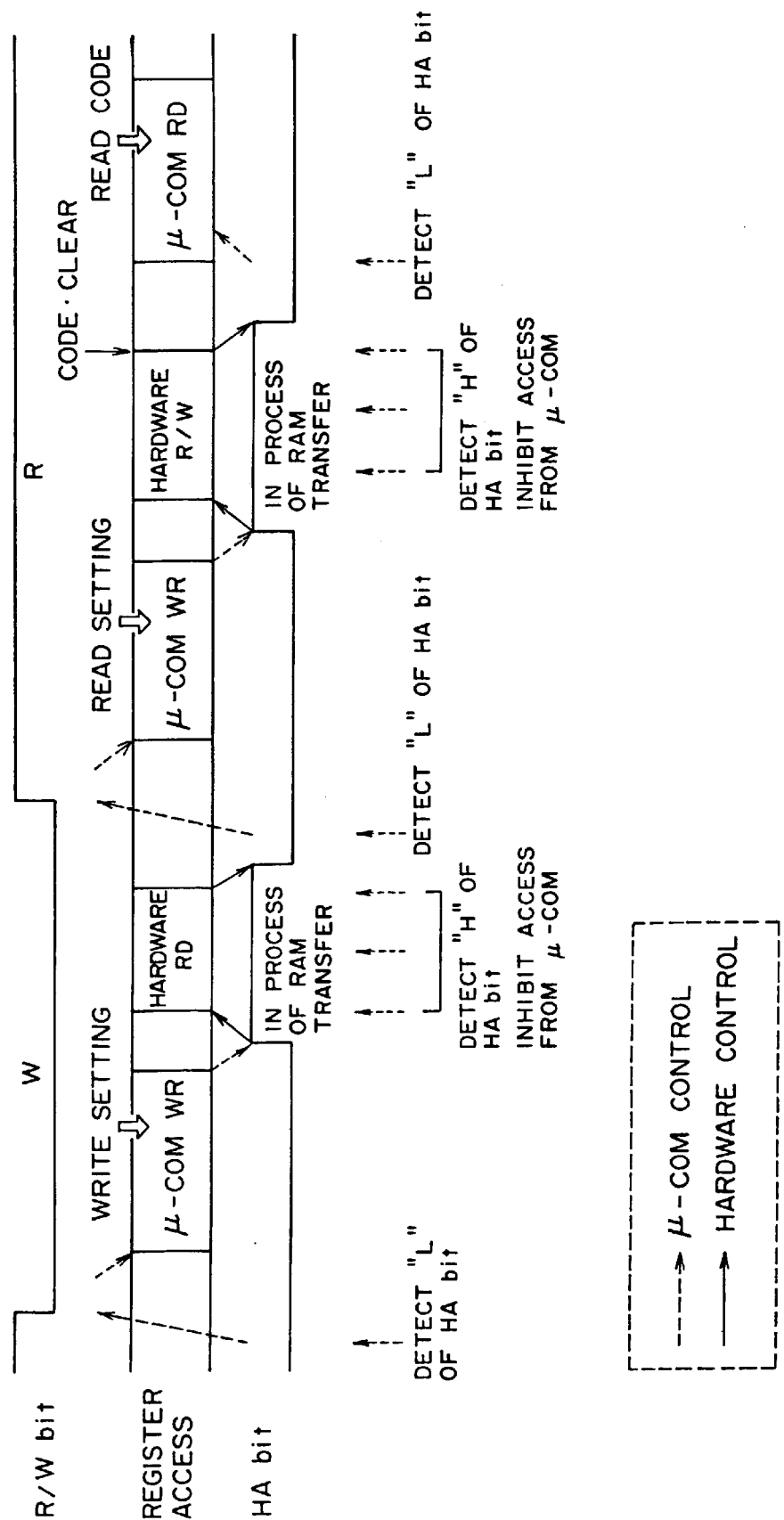
FIG. 20 is a timing diagram for illustrating access timings to the microcomputer register according to the embodiment of this invention.

FIG. 20 is a timing diagram for illustrating access timings to the microcomputer register 92-1. As shown in FIG. 20, in the case of a control on writing from the microcomputer 95 to the LB processing unit 40, the microcomputer 95 writes "W" on the bit map when detecting that HA bit is "L", writes STS channel #i information, an internal RAM address, information on VPI/VCI, E/S (End-to End/segment; refer to FIG. 19) and the like, after that, sets the HA bit to "H".

These kinds of information are transmitted from the microcomputer register 92-1 to the LB processing unit 40. Data held at "14H (H:hex)" to "16H" in the bit map shown in FIG. 18 is written in a region (to be described later; refer to FIG. 41) specified by an address (internal address) of the DP-RAM 44 (to be described later; refer to FIG. 40) of the STS channel #i shown in FIG. 18.

In the case of a control executed when setting data is read from the LB processing unit 40 to the microcomputer 95, the microcomputer 95 writes "R" along with STS channel #i information, an internal RAM address, and VPI/VCI on the bit map when detecting that the HA bit is "L". These kinds of information are transmitted from the microcomputer register 92-1 to the LB processing unit 40. Setting data read out from a desired DP-RAM 44 (to be described later; refer to FIG. 40) is held on the bit map, and the microcomputer 95 reads the data held on the bit map.

As shown in FIG. 20, when the HA bit is "H", an access from the microcomputer 95 is inhibited. For instance, when data is transferred from the LB processing unit 40 to the microcomputer register 92-1, the microcomputer 95 cannot rewrite data on the bit map, and a setting data rewriting control or a reading control is executed for each channel.

Figure 21:
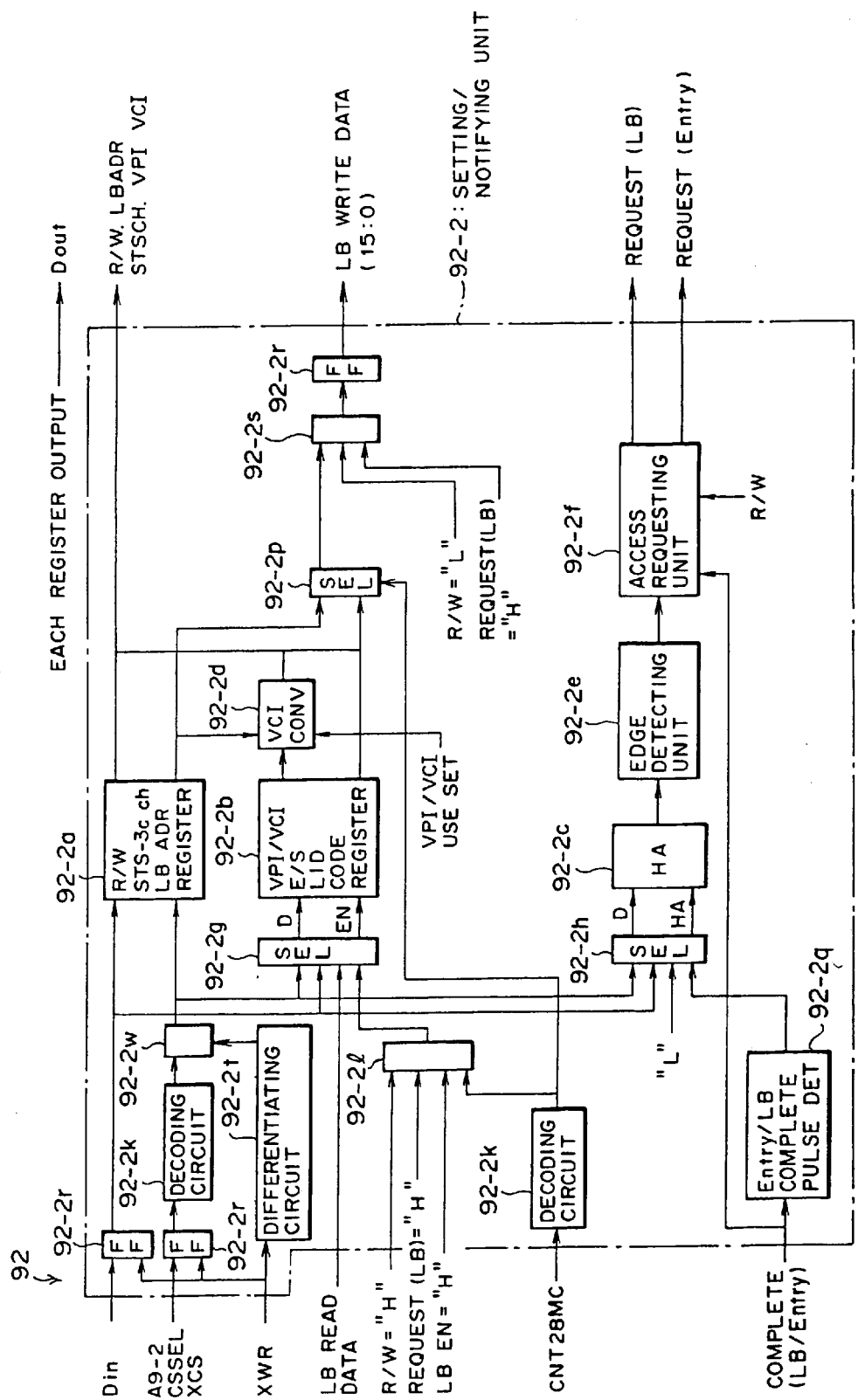
FIG. 21 is a block diagram showing the microcomputer I/F unit according to an embodiment of this invention.

Further, the microcomputer I/F unit 92 comprises a setting/notifying unit 92-2 shown in FIG. 21, for example, in order to notify data set from the microcomputer 95. The setting/notifying unit 92-2 notifies of data from the microcomputer register 92-1 the LB processing unit 40, while notifying of data read out from the LB processing unit 40 the microcomputer 95. When the setting/notifying unit 92-2 detects a data error, the setting/notifying unit 92-2 corrects the error.

The setting/notifying unit 92-2 comprises, as shown in FIG. 21, for example, a first register 92-2a, a second register 92-2b, a third register 92-2c, a converting unit 92-2d, an edge detecting unit 92-2e, an access requesting unit 92-2f, SELs 92-2g, 92-2p and 92-2h, AND circuits 92-21, 92-2s and 92-2w, a decoding circuit 92-2k, a flip-flop 92-2r and a differentiating circuit 92-2t.

The first register 92-2a holds R/W, an STS channel #i and an LB address read out from the microcomputer register 92-1 or the LB processing unit 40. The second register 92-2b holds VPI/VCI, E/S, an location ID, and an internal code.

The converting unit (error detecting unit, data correcting unit) 92-2d detects an error in the setting data from the microcomputer 95 and corrects the error. When the E/S information set from the microcomputer 95 is "00" or "01", the converting unit 92-2d converts the VCI information into predetermined information. When E/S is "00", for example, the converting unit 92-2d converts the VCI to "4". When E/S is "01", the converting unit 92-2d converts the VCI to "3".

In the above structure, a process of transferring setting data is performed, as shown in FIG. 20.

A PG unit 93 shown in FIG. 2 generates a reference timing in the ATM cell processing unit 4-1.

The PM processing unit 50 performs a monitoring process to monitor an operation condition of the ATM communication on the basis of a cell received by the cell processing unit 30 (to be described later). In concrete, the PM processing unit 50 notifies of a cell identified by the cell processing unit 30 and the PM processing unit 50 the microcomputer 95, and makes a loopback request and count for PM and a PM cell send request based on PM setting from the microcomputer 95.

The entry RAM (registration information holding unit) 94 shown in FIG. 2 discriminates information (registration information) necessary to identify an ATM cell that is an object of the process for each transmission route (VPI/VCI), and holds the information commonly to a plurality of channels. For instance, as shown in FIG. 19, the entry RAM 94 stores various data such as entry information, termination information and the like in an address region designated by 18 bits based on VPI/VCI.

In concrete, for an address of the entry RAM 94, high order 2 bits of the STS channel #i, a part of bits of VPI and a part of bits of VCI, totaling 16 bits are used to hold the above registration information for each STS channel #i and for each VPI/VCI. Namely, the entry RAM 94 can hold entry information for each STS channel #i, and further hold the entry information for each channel in a region corresponding to each STS channel #i.

Address 18 bits of the entry RAM 94 are generated by an address generating/access requesting unit 31b-2 (refer to FIG. 26) to be described later.

Incidentally, the number of bits of VPI and the number of bits of VCI are variable, which can be set for each STS channel #i by a setting from the microcomputer 95.

Hereinafter, description will be made on an assumption that 64 channels are processed in the PM processing and 32 channels are processed in the LB processing per one STS channel #i (155 M/s) including a total of 1024 virtual channels of ATM communication by a setting of the microcomputer 95.

Data in the entry RAM 94 is configured with 1 bit indicating whether VPI/VCI is entered or not (designated by "d-12" in FIG. 19), 1 bit indicating whether VC (VPI/VCI) is terminated or not (designated by "d-13" in FIG. 19), 1 bit that an OAM cell is allowed to pass without undergoing any process when detected (designated by "d-14" in FIG. 19), 2 bits indicating a termination point of a specified channel when desired although the point is not the original termination point (designated by "d-15" in FIG. 19), 5 bits indicating which channel among 32 channels that are objects of LB VPI/VCI corresponds to (designated by "d-16" in FIG. 19), and 6 bits indicating which channel among 64 channels that are objects of VC-AIS/RDI detection VPI/VCI corresponds to (designated by "d-17" in FIG. 19).

When "d-12" in FIG. 19 is "H", it indicates during entry. When "d-13" is "H", VPI/VCI is set to End-to-End. When "d-14" is "H", it means that an OAM cell is allowed to pass through without undergoing the process when detected. In "d-15" in FIG. 19, 2 bits are used to express four states. Here, only two states of "01" and "11" are determined, and the other states are handled as invalid (no Segment designation).

TABLE 3

EXAMPLE OF END-to-END/SEGMENT CODES

| D4 | D3 | Section Designation |
|---|---|---|
| 0 | 0 | Invalid (No segment Designation) |
| 0 | 1 | VP Segment |
| 1 | 0 | Invalid (No Segment Designation) |
| 1 | 1 | VC Segment |

An alarm managing unit 32 to be described later holds information on an alarm state of a channel that is an object of the above VC termination using a VC managing RAM 32d (refer to FIG. 27). According to this embodiment, the number of channels (64 channels) that are object of VC termination in 1 STS channel #i is smaller than the number of channels (1024 channels in total) included in the STS channel #i. For instance, when an address of the VC managing RAM 32d holding information on the VC alarm status is configured with a part of VCI, a region in which no data is held becomes large. For this, in "d-16", an address of the VC managing RAM 32d holding an alarm state of a channel that is an object of VC termination is held so that an alarm state of each channel that is an object of VC termination is continuously held in a region of the VC managing RAM 32d. In other words, information for converting the address is held.

Channels (32 channels) that are objects of the LB processing undergo address conversion, as well.

The cell processing unit 30 (data processing unit) shown in FIG. 2 receives fixed length data and performs a desired data processing on the fixed length data. For instance, the cell processing unit 30 performs a process of identifying data (cell) after cell synchronization (refer to FIG. 5) and a process of terminating/generating an ALM (alarm) cell. The LB processing unit 40 (continuity test processing unit) executes a continuity test. In concrete, the LB processing unit 40 makes a loopback request to loop back an LB cell (cell for continuity test) identified by the cell processing unit 30 and the LB processing unit 40 to the upstream side, or an LB cell send request by the LB setting from the microcomputer 95 to the UpS cell inserting unit 80.

Hereinafter, the cell processing unit 30 and the LB processing unit 40 will be separately described. Incidentally, the same reference character designates a part having a similar function.

Before the description on the cell processing unit 30 and the like, an ALM (alarm) cell terminating/generating process will be first described.

(1-5) Description of an ALM (Alarm) Cell Terminating/Generating Process

When the ATM processing unit 4 shown in FIG. 2 receives a VP-AIS cell from the downstream side, the ATM processing apparatus 4 confirms whether the receives AIS cell is an object of VP termination or not. When the AIS cell is an object of VP termination, the ATM processing apparatus 4 discards the VP-AIS cell, outputs VC-AIS with respect to a VC under a VP which is an object of termination to the mapping/demapping unit 2, and loops back a VC-RDI cell with respect to the VC that is an object of termination to the upstream side and outputs it to the mapping/demapping unit 3. When the received AIS cell is not an object of VP termination, the VP-AIS cell is passed through the ATM processing apparatus 4, and outputted to the mapping/demapping unit 2.

When the cell received from the downstream side is VC-AIS and an object of VC termination, the VC-AIS cell is discarded, while the VC-RDI cell is looped back to the upstream side, and outputted to the mapping/demapping unit 3. When a VC of the received AIS cell is not an object of VC termination, the VC-AIS cell is passed through the ATM processing apparatus 4 and outputted to the mapping/demapping unit 2.

On the other hand, when SONET alarm (higher order alarm having a higher priority than VP-AIS or VC-AIS) is detected from the downstream side, the ATM processing apparatus 4 outputs a VP-AIS cell and a VC-AIS cell with respect to all VPs and VCs that are objects of termination to the mapping/demapping unit 2, while looping back a VP-RDI cell and a VC-RDI cell to the upstream side and outputs them to the mapping/demapping unit 3.

(2) Description of the Cell Processing Unit

Figure 22:
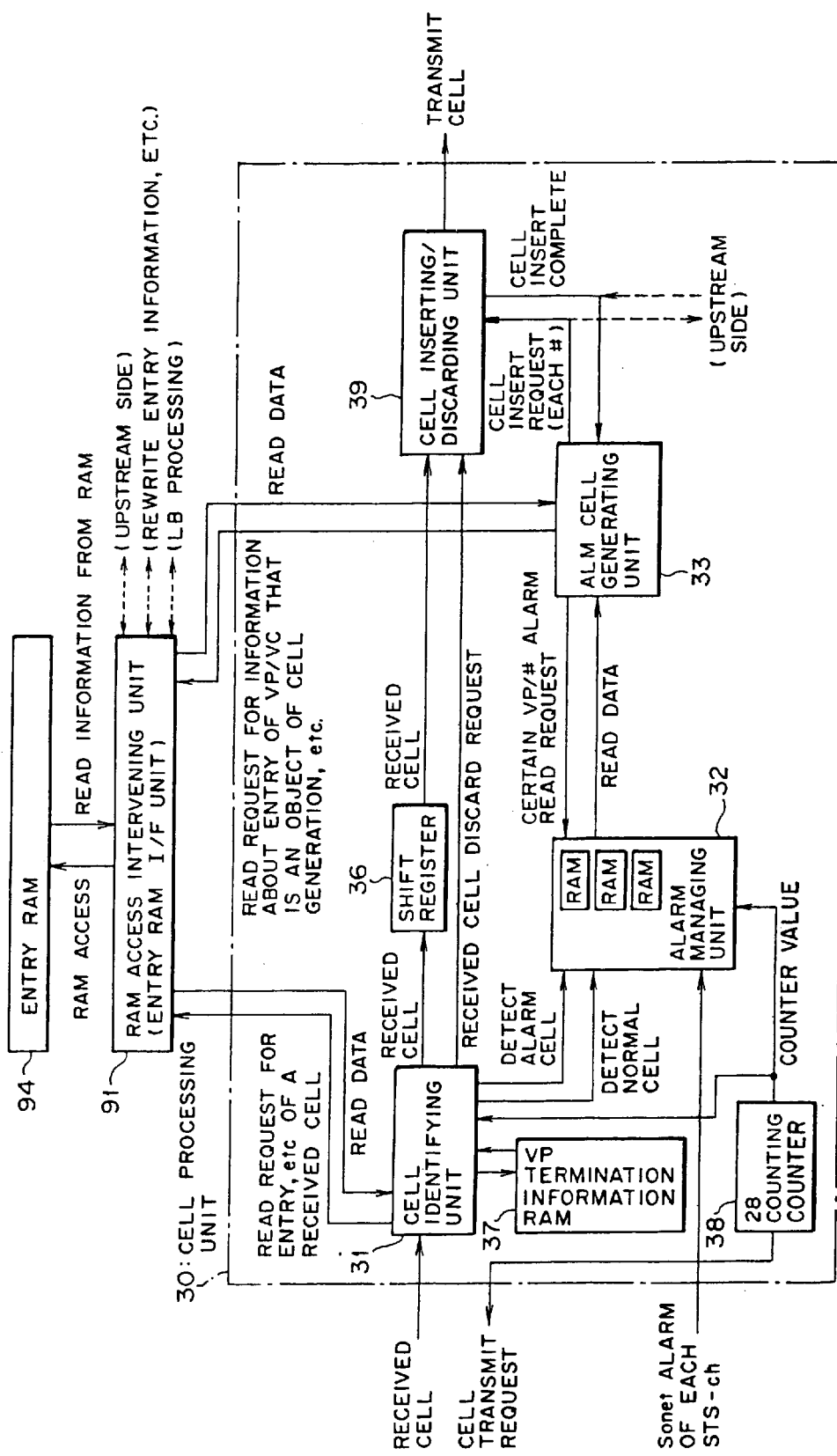
FIG. 22 is a block diagram showing a cell processing unit according to the embodiment of this invention.

The cell processing unit (data processing unit) 30 identifies data (cell) after cell synchronization and performs the ALM cell terminating/generating process, as stated above. To this end, the cell processing unit 30 comprises, as shown in FIG. 22, a cell identifying unit 31, an alarm managing unit 32, an ALM cell generating unit 33, a shift register 36, a VP termination information RAM 37, a 28-counting counter 38 and a cell inserting/discarding unit 39.

Figure 23:
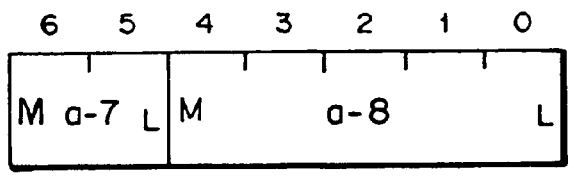
FIG. 23 is a diagram showing an example of a structure of an address of a VP termination information RAM according to the embodiment of this invention.

The VP termination information RAM (termination information holding unit) 37 holds termination information necessary to identify an ATM cell that is an object of termination to be terminated among ATM cells that are objects of the processing commonly to VPI/VCI. The VP termination information RAM 37 stores data shown in FIG. 24 in region designated by an address shown in FIG. 23, for example.

In concrete, an address of the VP termination information RAM 37 is configured with higher order 2 bits (designated by "a-7" in FIG. 23) for an STS channel #i, and the remaining 5 bits (designated by "a-8" in FIG. 23) which are a part (higher order 5 bits) of 8 bits of VPI.

Figure 24:
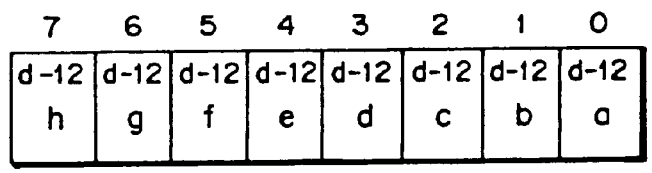
FIG. 24 is a diagram showing an example of a data structure in the VP termination information RAM according to the embodiment of this invention.

Data of the VP termination holds VP mode information (information as to whether the cell is VP terminated or not) on each of 8 VPs in a region designated by an address (refer to FIG. 23), as shown in FIG. 24. Each VP mode information can be expressed with 1 bit since the VP mode information is information indicating whether the cell is VP terminated or not. When the VP mode information is "H", it indicates VP mode. When the VP mode information is "L", it indicates non-VP mode.

VP mode information on these eight VPs is held on the same address. Using lower order 3 bits of the VPI not used for the address (refer to FIG. 23), any one of these eight pieces of held information is specified and read out. For instance, when the lower order 3 bits of the VPI is "000", bits held in a region designated by "d-12a" in FIG. 24 are read out. When "100", bits held in a region designated by "d-12e" in FIG. 24 are read out.

An opportunity to get an access to the VP termination information RAM 37 is at the time of a reading process accompanying a check on VP mode by VPI of a received cell, a reading/writing process accompanying a setting of VP mode from the microcomputer 95, a reading process accompanying a VP mode check on an arbitrary VP when an VP-AIS cell is generated on the downstream side, a reading process accompanying an arbitrary VP mode check when a VP-AIS cell is generated on the upstream side.

The cell identifying unit (identifying unit) 31 reads each piece of information in the entry RAM 94 and the VP termination information RAM 37, and identifies correspondingly to VPI/VCI whether a received ATM cell is data that is an object of processing and termination, and is VP-AIS, VP-RDI, VC-AIS or VP-RDI (alarm data) for notifying an alarm state of the transmission route.

Figure 26:
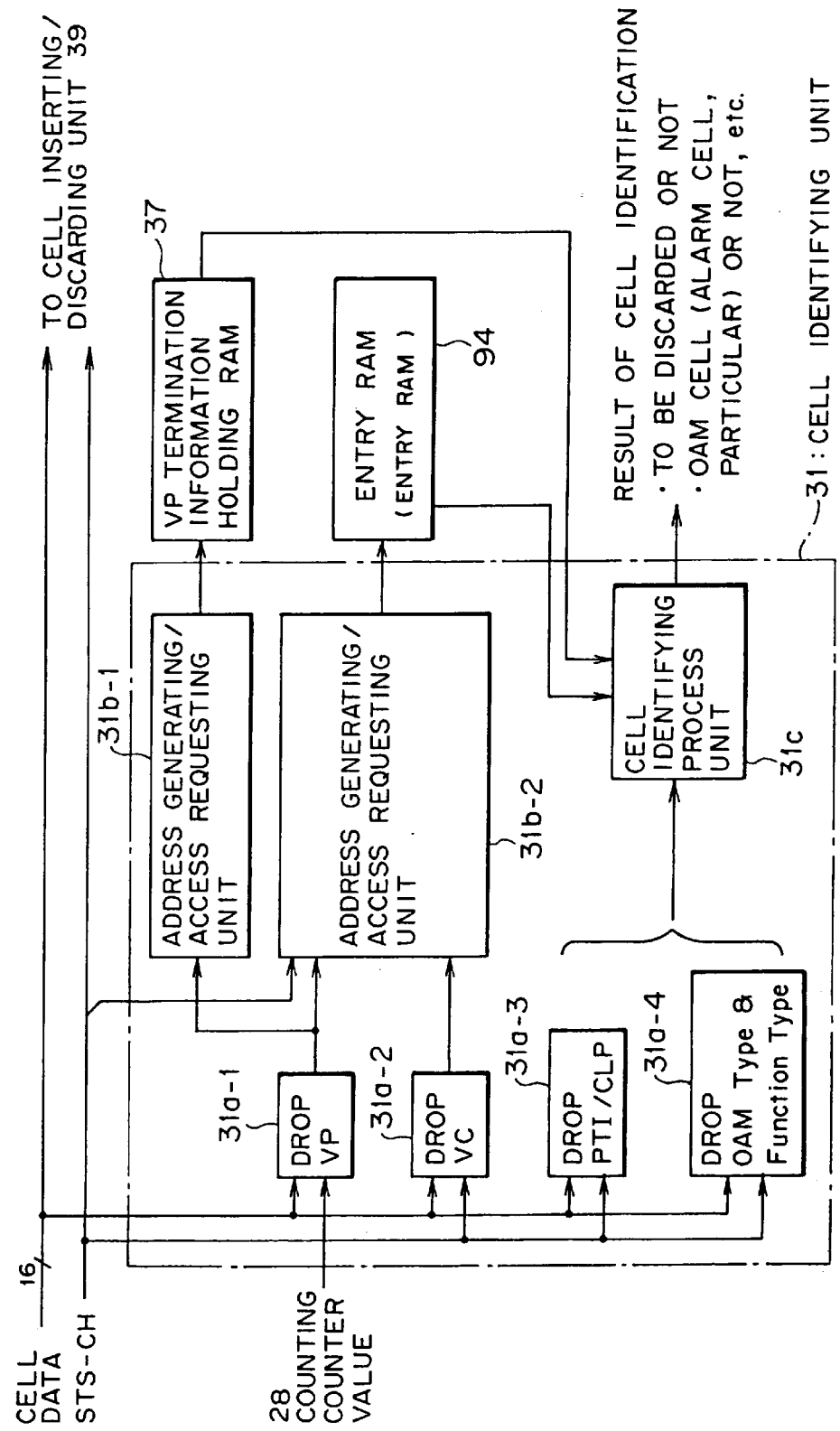
FIG. 26 is a block diagram showing a cell identifying unit according to the embodiment of this invention.

To this end, the cell identifying unit 31 comprises, as shown in FIG. 26, dropping units 31a–j (j=1 to 4), address generating/access requesting units 31b–k (k=1 and 2) and a cell identifying process unit 31c.

Each of the dropping unit 31a–j extracts predetermined information from header of a received ATM cell from the UTOPIA 10. In concrete, the dropping unit 31a-1 extracts information (VPI) on VP, the dropping unit 31a-2 information (VCI) on VC, dropping unit 31a-3 information on PTI/CLP, and the dropping unit 31a-4 information on an OAM type (Type)/function type (Function Type), from the header.

The address generating/access requesting unit 31b-1 generates an address for the VP termination information RAM 37 on the basis of a VPI extracted by the dropping unit 31a-1, and makes a read request (access request) to read information stored in a region designated by the generated address.

The address generating/access requesting unit (address generating unit) 31b-2 generates an address for the entry RAM 94 on the basis of information on an STS channel #i and a VPI/VCI of an ATM cell extracted by the dropping units 31a-1 and 31a-2, and makes a read request (access request) for information held in a region of the entry RAM 94 designated by the generated address.

For instance, the address generating/access requesting unit 31b-2 adds 6 bits in the maximum bit number 8 of VP to 10 bits in the maximum bit number 16 of VC, and generates an address of 16 bits excluding an STS channel number #i. When the number of bits of VP is 6 set by the microcomputer 95 and an address of the entry RAM 94 is "0101001111101100101", high order 2 bits "01" correspond to the STS channel #2, the following 6 bits "010011" correspond to a VP, and low order 10 bits "1101100101" correspond to a VC.

Next, the cell identifying process unit 31c shown in FIG. 26 determines which type of cell a received cell is, whether the received cell should be discarded or not, etc., on the basis of data sent back from the VP termination information RAM 37 and the entry RAM 94, information on PTI/CLP extracted by the dropping unit 31a-3, and information on OAM Type/Function Type extracted by the dropping unit 31a-4.

The cell identifying process unit 31c outputs information signifying that a cell should be discarded, or that an OAM cell (particularly, an ALM cell) is received or the like as a result of cell identification to the alarm managing unit 32, the cell inserting/discarding unit 39 and the like.

The cell identifying unit 31 notifies the alarm managing unit 32 that alarm (cell) is detected. When detecting a cell to be discarded, the cell identifying unit 31 notifies the cell inserting/discarding unit 39 of a discard request to discard the received cell. Contents of a received cell is notified from the cell identifying unit 31 the PM processing unit 50.

When identifying a received cell, the cell identifying unit 31 makes a read request to read entry information and the like on the received cell to the entry RAM interface (entry RAM I/F) unit 91 (to be described later). Read data read out in response to the read request is read out from the entry RAM 94 by the entry RAM I/F unit 91 (to be described later) and sent to the cell identifying unit 31.

When the cell identifying unit 31 identifies that an ATM cell is an alarm cell (alarm data), the alarm managing unit (alarm managing unit) 32 shown in FIG. 22 holds and manages alarm state information correspondingly to VPI/VCI on the basis of the alarm cell.

Figure 27:
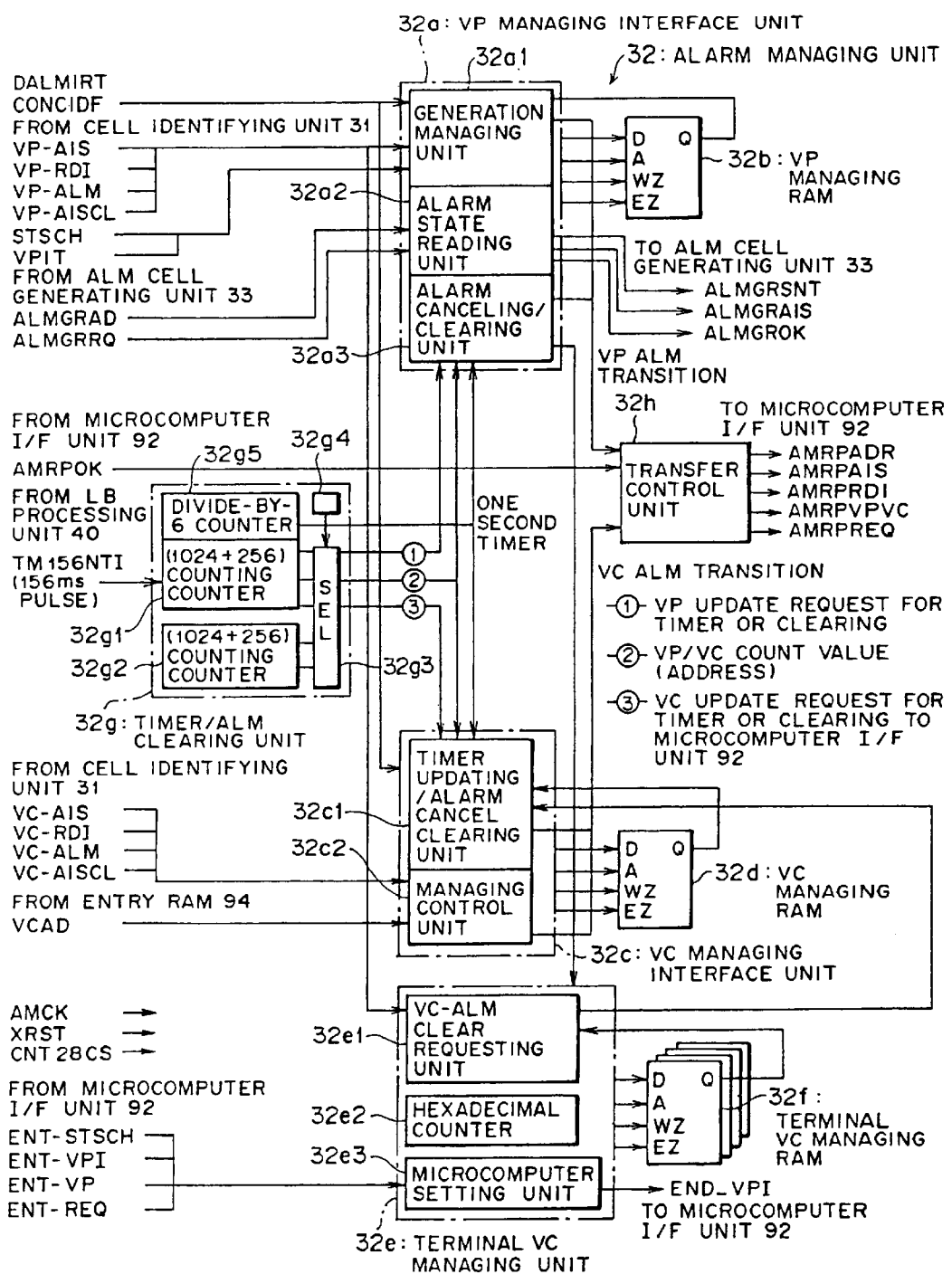
FIG. 27 is a block diagram showing an alarm managing unit according to the embodiment of this invention.

To this end, the alarm managing unit 32 comprises, as shown in FIG. 27, for example, a VP managing interface unit 32a, a VP managing RAM 32b, a VC managing interface unit 32c, a VC managing RAM 32d, a terminal VC managing unit 32e, a terminal VC managing RAM 32f, a timer/ALM clearing unit 32g and a transfer control unit 32h.

The VP managing RAM (virtual path alarm state holding unit) 32b holds alarm state information on a VP (virtual path) correspondingly to a VPI. The VP managing RAM 32b holds data indicating a VP alarm state under a control of the generation managing unit 32a1 (to be described later) in the VP managing interface unit 32a or an alarm canceling/clearing unit 32a3 (to be described later).

Figure 28:
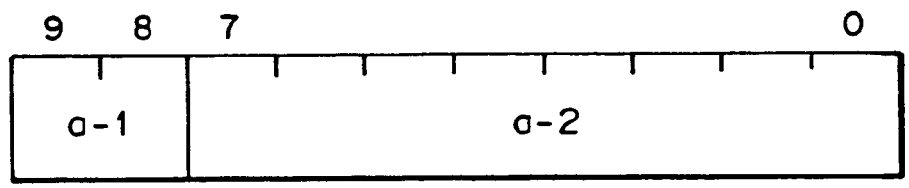
FIG. 28 is a diagram showing an example of a structure of an address of a VP managing RAM according to the embodiment of this invention.

The VP managing RAM 32b stores data shown in FIG. 29 in a region designated by an address shown in FIG. 28, for example.

In concrete, the address of the VP managing RAM 32b is configured with an STS channel #i at high order 2 bits (designated by "a-1" in FIG. 28) of the address and VPI (8 bits) of an ALM cell at the remaining 8 bits (designated by "a-2" in FIG. 28). When VPI is less than 8 bits, "0" is added to the high order bit.

Data held in the VP managing RAM 32b is configured with a bit (designated by "d-1" in FIG. 29) indicating a VP-AIS state, a bit (designated by "d-2" in FIG. 29) indicating whether an alarm cell is sent within the initial 500 msec after VP-AIS state or SONET alarm state starts (an alarm state in a higher level), a bit (designated by "d-3" in FIG. 29) indicating that an alarm cell is sent at intervals of one second, bits (designated by "d-4" in FIG. 29) holding a count value of a VP-AIS canceling timer (2.5 second counter), a bit (designated by "d-5" in FIG. 29) indicating VP-RDI state, and bits (designated by "d-6" in FIG. 29) holding a count value of a VP-RDI canceling timer (2.5 second counter).

The count values of the VP-AIS and VP-RDI canceling timers are counted in every 156 msec by the alarm canceling/clearing unit 32a3 to be described later. Hereinafter, information held in a region of "d-2" in FIG. 29 is referred as a 500 mili flag (500 mF), and information held in a region of "d-3" is referred as a 1 second flag (1 sF), occasionally.

The VP managing interface unit 32a has an access to the VP managing RAM 32b to manage a VP alarm state held in the VP managing RAM 32b. An opportunity to get an access from the VP managing interface unit 32a to the VP managing RAM 32b is at the time of a setting of an alarm when an alarm cell arrives, a canceling of an alarm when a user cell or the like arrives, a canceling of an alarm with time elapsed, a clearing of a lower order alarm by a higher order alarm, a confirmation of presence/absence of an alarm from the alarm cell generating unit 33 (to be described later), etc.

To this end, the VP managing interface unit 32a comprises, as shown in FIG. 27, a generation managing unit 32a1, an alarm state reading unit 32a2 and an alarm canceling/clearing unit 32a3.

When the generation managing unit 32a1 receives a predetermined VP-AIS cell from the cell identifying unit 31, the generation managing unit 32a1 rewrites a bit in a region designated by "d-1" in FIG. 29 to active ("H"), and a flag (designated by "d-2" in FIG. 29) indicating whether an alarm cell is sent within the initial 500 msec after getting into VP-AIS state or SONET alarm state or not to active ("H"), in order to make an alarm state of a predetermined VP in the VP managing RAM 32b the VP-AIS state. When receiving a predetermined VP-RDI cell, the generation managing unit 32a1 rewrites a bit in a region designated by "d-5" in FIG. 29 to active ("H").

When rewriting the alarm state of a predetermined VP to VP-AIS state or rewrite the bit indicating VP-RDI state to active ("H"), the generation managing unit 32a1 sends information signifying that VP-ALM state transits to the transfer control unit 32h. When receiving a cell of VP-AIS or the like, the generation managing unit 32a1 makes an address in the VP managing RAM 32b on the basis of an STS channel #i number and VPI of a received cell.

In response to a read request (ALMGRRQ) to read the alarm state of a VP (alarm cell generating request) designated (ALMGRAD) by the STS channel #i and VPI from the ALM cell generating unit 33 to be described later, the alarm state reading unit 32a2 reads the alarm state [SONET alarm (ALMGRSNT) or VP-AIS (ALMGRAIS)] of a corresponding VPI, and outputs it to the ALM cell generating unit 33.

When reading the alarm state, the alarm state reading unit 32a2 executes a control to whether a sent request to generate an alarm cell is outputted to the ALM cell generating unit 33 or not on the basis of the data held in the VP managing RAM 32b.

For instance, when the alarm state reading unit 32a2 detects that the bit indicating the 500 mF as data of an alarm state of a certain VP is active, the alarm state reading unit 32a2 outputs a send request to generate the first cell to the ALM cell generating unit 33. When outputting the first sent request, the alarm state reading unit 32a2 makes the 500 mF "L", and writes a reverse polarity of a is timer signal (signal from the timer/ALM clearing unit 32g to be described later) in "1 sF".

When the alarm state reading unit 32a2 detects that a bit indicating the 1 sF is active and a polarity of the 1 second timer is the same as the 1 sF when the alarm state reading unit 32a2 detects the 1 sF, the alarm state reading unit 32a2 outputs the second send request to generate a cell to the ALM cell generating unit 33.

If a polarity of the one second timer differs from that of the 1 sF when the alarm state reading unit 32a2 detects the 1 sF, the alarm state reading unit 32a2 does not output the second send request to generate a cell to the ALM cell generating unit 33. The alarm state reading unit 32a2 operates in a similar manner when generating the third and later send request to generate a cell.

The send request to generate a cell is outputted to the ALM cell generating unit 33 when a polarity of the 1 second timer is the same as the 1 sF, since intervals at which the second and later alarm cells are generated are of 1s, and a bit indicating the 1 sF has a polarity reversal of a polarity of the 1 second timer when written in the VP managing RAM 32b. Namely, if a bit indicating the 1 sF having been initially written with a polarity reversal of a polarity of the 1 second timer has the same polarity when the bit is read in the alarm state reading process by the alarm state reading unit 32a2, it means that about one second has been elapsed.

The alarm canceling/clearing unit (cancel processing unit) 32a3 controls to count up a timer value (bits in a region designated by "d-4" or "d-6" in FIG. 29) held in the VP managing RAM 32b on the basis of a count value for the timer from the timer/ALM clearing unit 32g to be described later.

The alarm canceling/clearing unit 32a3 also makes a bit (bit in a region designated by "d-1" or "d-5" in FIG. 29) indicating VP-AIS state or VP-RDI state "L" when the timer value reaches the maximum (2.5 second according to this embodiment). Further, the alarm canceling/clearing unit 32a3 monitors whether SONET alarm (higher order alarm) or a user cell is received or not on the basis of a count value for clearing from the timer/ALM clearing unit 32g to be described later. When detecting SONET alarm or a user cell, the alarm canceling/clearing unit 32a3 makes a bit (bit in a region designated by "d-1" or "d-5" in FIG. 29) indicating VP-AIS state or VO-RDI state "L".

The alarm canceling/clearing 32a3 outputs information representing that the alarm state transits to the transfer control unit 32h when the alarm state is cancelled. The alarm canceling/clearing control 32a3 makes an address from VPI of a received user cell when receiving the user cell, and writes "L" in the object bit.

The VC managing RAM (virtual channel alarm state holding unit) 32d holds alarm state information on a VC (virtual channel) correspondingly to VCI. The VC managing RAM 32d holds data indicating VC alarm state under a control of a timer updating/alarm cancel clearing unit 32c1 and a managing control unit 32c2.

Figure 25:
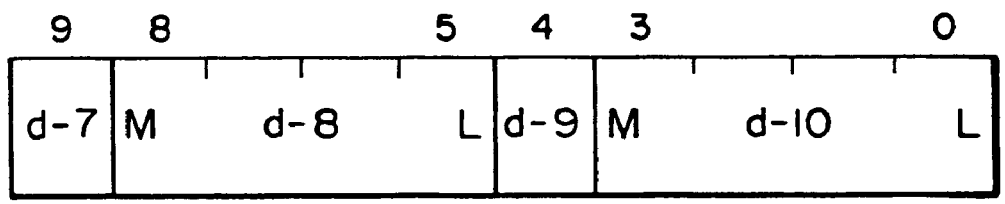
FIG. 25 is a diagram showing an example of a data structure in a VC managing RAM according to the embodiment of this invention.
Figure 30:
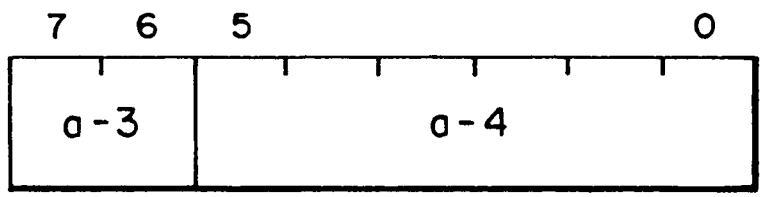
FIG. 30 is a diagram showing an example of a structure of an address of the VC managing RAM according to the embodiment of this invention.

The VC managing RAM 32d stores data shown in FIG. 25 in a region designated by an address shown in FIG. 30, for example.

In concrete, and address of the VC managing nit 32d is configured with an STS channel #i using high order 2 bits (designated by "a-3" in FIG. 30), and an internal address for managing VC-AIS/RDI using the remaining 6 bits (designated by "a-4" in FIG. 30).

The internal address for managing VC-AIS/RDI is a VC alarm address held in the entry RAM 94. According to this embodiment, VCs that are objects of alarm cell transmission/reception in one STS channel (STS-3c) #i are 64, which is smaller than 1024 channels included in one STS channel (STS-3c) #i. For this reason, when the address of the VC managing RAM 32d is configured using each VCI, a region of the VC managing RAM 32d cannot be used effectively. Accordingly, a unique number (0 to 63) is used for an address in a region of the VC managing RAM 32d holding VC alarm information on each channel. The unique number (0 to 63; internal address for managing) is set in the entry RAM 94 (refer to "d-17" in FIG. 19).

Data of the VC managing RAM 32d is configured with 1 bit (designated by "d-7" in FIG. 25) showing a VC-AIS state, 4 bits (designated by "d-8" in FIG. 25) holding a count (2.5 second count) value of a timer for canceling VC-AIS, 1 bit (designated by "d-9" in FIG. 25) showing a VC-RDI state, and 4 bits (designated by "d-10" in FIG. 25) holding a count (2.5 second count) value of a timer for canceling C-RDI. The count values of the timers for canceling VC-AIS and VC-RDI are counted up in every 156 msec. With respect to the VC-AIS state and the VC-RDI state, when bits of each state are "H", the AIS or RDI state is indicated.

Next, the VC managing interface unit 32c gets an access to the VC managing RAM 32d to manage VC management information held in the VC managing RAM 32d. An opportunity to get an access from the VC managing interface unit 32c to the VC managing RAM 32d is a setting of an alarm when an alarm cell arrives, a canceling of an alarm when a user cell or the like arrives, a canceling of an alarm with time elapsed, a clearing of a lower order alarm by a higher order alarm, etc.

To this end, the VC managing interface unit 32c comprises, as shown in FIG. 27, a timer updating/alarm cancel clearing unit 32c1 and a managing control unit 32c2.

When the managing control unit 32c2 receives a predetermined VC-AIS cell from the cell identifying unit 31, the managing control unit 32c2 rewrites a bit in a region designated by "d-7" in FIG. 25 to active "H" so as to make an alarm state of a predetermined VC in the VC managing RAM 32d VC-AIS state. When receiving a VC-RDI cell, the managing control unit 32c2 rewrites a bit in a region designated by "d-9" in FIG. 25 to active ("H") so as to make an alarm state of a predetermined VC VC-RDI state. The managing control unit 32c2 receives a VC-AIS cell when rewriting VC-AIS state or the like, besides writing information in the VC managing RAM 32d on the basis of information (address conversion information) from the entry RAM 94.

The managing control unit 32c2 sends information signifying that VP-ALM state transits to the transfer control unit 32h when rewriting the bit showing VC-AIS state of a predetermined VC to active ("H") or the like.

The timer updating/alarm cancel clearing unit 32c1 controls to count up a timer value (bits in a region designated by "d-8" or "d-10" in FIG. 25) held in the VC managing RAM 32d on the basis of a count value for a timer from the timer/ALM clearing unit 32g to be described later. The timer updating/alarm cancel clearing unit 32c1 functions as a cancel processing unit for making a bit showing VC-AIS state (bit in a region designated by "d-7" in FIG. 25) or a bit showing VC-RDI state (bit in a region designated by "d-9 in FIG. 25) "L" when the timer value reaches a maximum value (2.5 second according to this embodiment). The timer updating/alarm cancel clearing unit 32c1 also monitors whether SONET alarm (higher order alarm) or a user cell is received or not on the basis of a count value for clearing from the timer/ALM clearing unit 32g to be described later, and makes a bit showing VC-RDI state or VC-AIS state (bit in a region designated by "d-7" or "d-9" in FIG. 25) "L" when detecting SONET alarm or the user cell.

The timer updating/alarm cancel clearing unit 32c1 also cancels an alarm state of a predetermined VC by receiving a clear request from a VC-ALM clear requesting unit 32e1 in the terminal VC managing unit 32e to be describing later.

The timer updating/alarm cancel clearing unit 32c1 outputs information signifying that the alarm state transits to the transfer control unit 32h when canceling the alarm state.

The terminal VC managing RAM (virtual path information holding unit) 32f holds VPI to which a VC that can be an object of alarm canceling belongs in the VC managing RAM 32d, which is configured with four RAMs (hereinafter referred as "terminal VC managing RAM") 32f holding information showing which VP a channel (a unique number any one from 0 to 63 set by the microcomputer) assigned for VC termination belongs to.

Figure 31:
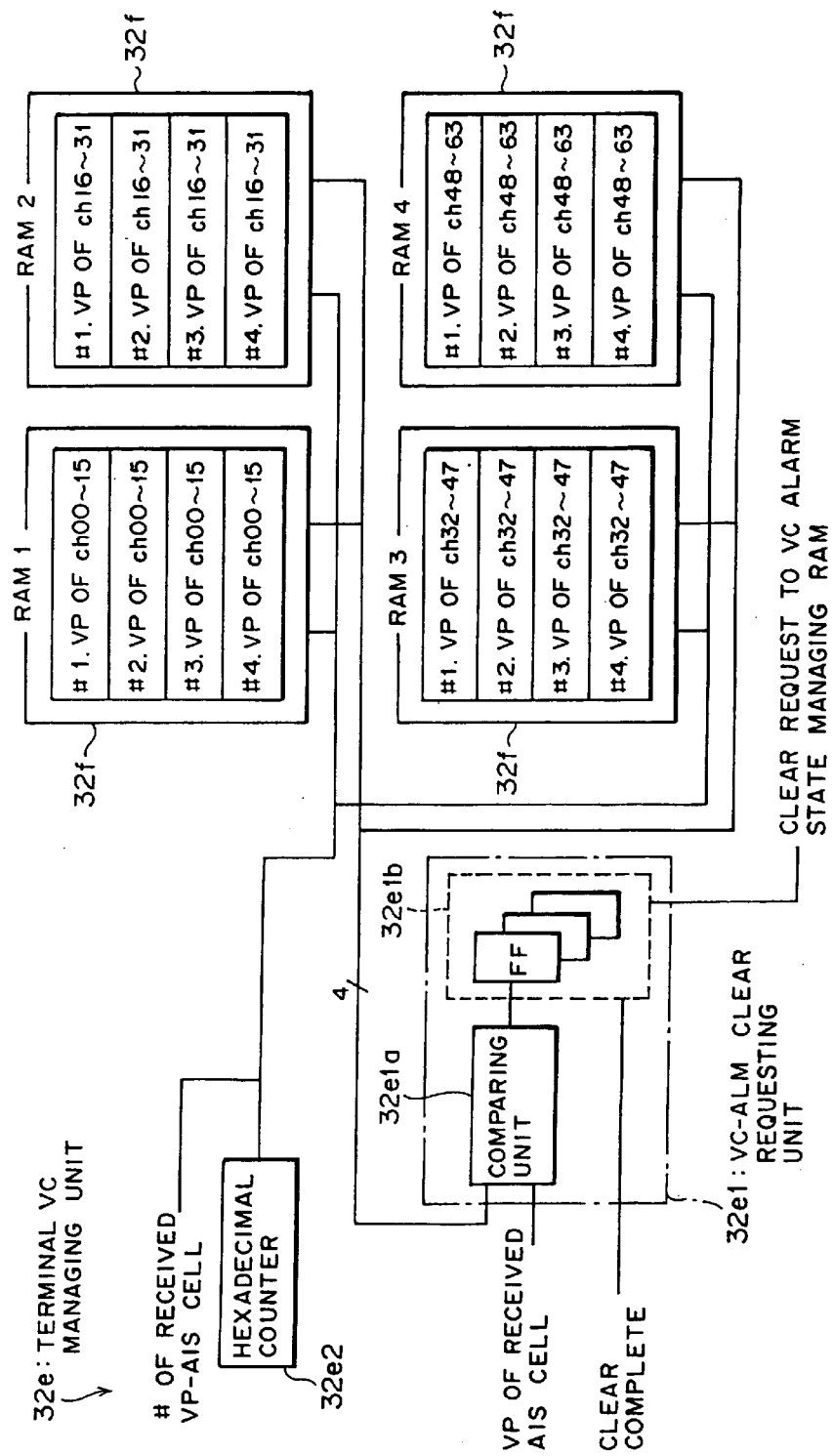
FIG. 31 is a block diagram showing a terminated VC managing RAM according to the embodiment of this invention.

In the terminal VC managing RAMs 32f, VPIs are divided into a plurality of VC groups each consisting of a plurality of VCs, and four RAMs hold the respective groups. In concrete, as shown in FIG. 31, 64 channels of the VC termination channels per one STS channel #i are divided and VPIs for 16 channels are held in each of the terminal VC managing RAM 32f (designated by "RAM 1 through 4" in FIG. 31). Each of the four RAMs 1 through 4 holds VPIs for 16 channels of each STS channel #i, and one terminal VC managing RAM 32f holds VPIs of 64 channels (unique numbers).

Figure 32:
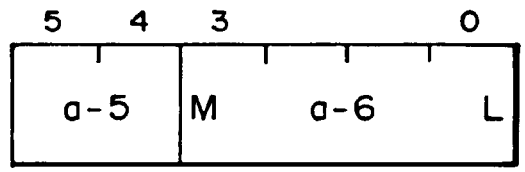
FIG. 32 is a diagram showing an example of a structure of an address of the terminated VC managing RAM according to the embodiment of this invention.
Figure 33:
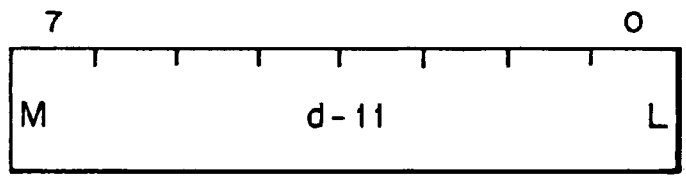
FIG. 33 is a diagram showing an example of a data structure in the terminated VC managing RAM according to the embodiment of this invention.

Each of the terminal VC managing RAMs 32f stores data shown in FIG. 33 in a region designated by an address shown in FIG. 32, for example.

In concrete, an address of each of the terminal VC managing RAMs 32f is configured with an STS channel #i using high order 2 bits (designated by "a-5" in FIG. 32) and low order 4 bits of a VC termination setting channel (6 bits) using the remaining 4 bits (designated by "a-6" in FIG. 32). The VC termination setting channel (6 bits) are low order 4 bits of a unique number set by the microcomputer 95.

Data of each of the terminal VC managing RAMs 32f is configured with 8 bits (indicated by "d-11" in FIG. 33) holding VPI of a VPI/VCI to which VC termination is set.

The terminal VC managing unit 32e specifies a VC to which termination is set belonging to a VP of a received VP-AIS cell in VC-ALM held in the VC managing RAM 32d when detecting an VP-AIS cell. Since the VC managing RAM 32d uses a unique number (conversion address) held in the entry RAM 94 as stated above, it is necessary to specify a corresponding VC when an alarm state of the VC to which termination is set under a VP in the VP-AIS (higher order alarm for VC-AIS) detected state is canceled (cleared).

For this, the terminating VC managing unit 32e comprises, as shown in FIG. 27, the VC-ALM clear requesting unit 32e1, a hexadecimal counter unit 32e2 and a microcomputer setting unit 32e3.

The VC-ALM clear requesting unit 32e1 compares a VPI of a received AIS cell with VPI read out from the terminal VC managing RAM 32f when receiving a VP-AIS cell, and outputs a clear request (serial number) to the VC managing interface unit 32c when the VPIs coincide. As shown in FIG. 31, for example, the VC-ALM clear requesting unit 32e1 comprises a comparing unit 32e1a for comparing VPI of a received AIS cell with VPI read out from the terminal VC managing RAM 32f, and a comparison result holding unit 32e1b.

The above comparing unit 32e1a successively reads out VPIs for 64 channels (channels of unique numbers from 0 to 63) of each STS channel #i in parallel from each of the terminal VC managing RAMs 32f, and successively compares a read VPI with a VPI of the received AIS cell to detect whether the read VPI and the VPI of the received AIS cell coincide with each other or not.

The comparison result holding unit 32e1b comprises 64 flip-flops (FF) per one STS channel #i corresponding to the unique numbers, comprising 256 (4×64) flip-flops in total per 4 STS channels #i. Each of the flip-flops is provided correspondingly to VPIs held in the terminal VC managing RAM 32f.

When the VPI of the received AIS cell coincides with the VPI read out from the terminal VC managing RAM 32f as a result of comparison by the comparing unit 32e1a, a flip-flop corresponding to a channel [a unique number (a channel any one of 0 to 64) set by the microcomputer 95] among the 256 flip-flops holds active "H".

When a VP-AIS cell of the STS channel #3 is received and a VPI of a channel (Ch; unique number) 35 held in the terminal VC managing RAM 32f (RAM 3) coincides with a VPI of the received AIS cell, a bit held in a flip-flop corresponding to the channel 35 in the STS channel #3 is made active ("H").

When the timer updating/alarm cancel clearing unit 32c1 of the above VC managing interface unit 32c detects the bit held in a flip-flop corresponding to the channel 35 in the STS channel #3 at the time of a count value (count value indicating an access timing of the channel 35 in the STS channel #3) for clearing received from the timer/ALM clearing unit 32g to be described later, a VC alarm state held in the VC managing RAM 32d is cancelled.

An address of the VC managing RAM 32d holding VC termination information is a unique number (0 to 63 ch) according to a setting of the microcomputer 95, as above. In order to cancel an alarm state of a VC in a lower order because of reception of a VP-AIS cell, the VC-ALM clear requesting unit 32e1 holds detection information (in other words, a cancel request) on a unique number of a corresponding VPI among VPIs held for each unique number in the terminal VC managing RAM 32f in a predetermined flip-flop among the 256 flip-flops, the timer updating/alarm cancel clearing unit 32c1 clears an alarm state [an active ("H") bit in a region designated by "d-7" and "d-9" in FIG. 25] of a VC that is an object of alarm state monitoring at an access timing for clearing an alarm state of each VC when detecting at that access timing coincidence detection information of the comparing unit 32e1a in a predetermined flip-flop.

The hexadecimal counter 32e2 shown in FIG. 31 generates an address (read address) for each terminal VC managing RAM 32f with reception of STS channel #i information as a trigger. When receiving STS channel #2 information, for example, data of VPIs such as ch00, ch16, ch32, ch48 and the like of the STS channel #2 is read 16 times from the same region of each terminal VC managing RAM 32f (RAM 1 through RAM 4) designated by an address generated by the hexadecimal counter 32e2. The microcomputer setting unit 32e3 controls each terminal VC managing RAM 32f to hold setting information from the microcomputer 95 therein.

As above, the VC-ALM clear requesting unit 32e1 and the hexadecimal counter 32e2 function as a canceling process unit for reading information on a virtual path from each of a plurality of terminal VC managing RAMs 32f within a predetermined cycle to detect information on a virtual path whose alarm data for virtual path is held in the terminal VC managing RAM 32f.

Next, the timer/ALM clearing unit 32g shown in FIG. 27 generates a count value for timer and a count value for clearing, and transmits the generated count values to the alarm canceling/clearing unit 32a3 and the timer updating/alarm cancel clearing unit 32c1.

The count value for timer indicates a timing to update a timer value held in the VP managing RAM 32b and the VC managing RAM 32d and cancel an alarm due to the updating. The count value for clearing indicates a timing to cancel an ALM state of a low order VP or VC by detecting a higher order alarm.

To this end, the timer/ALM clearing unit 32g comprises, as shown in FIG. 27, a counter for timer 32g1, a counter for clearing 32g2, a selector (hereinafter referred "SEL") 32g3, a selector control unit 32g4 and a divide-by-6 counter 32g5.

The counter for timer 32g1 counts up a count value for timer with reception of a 156 ms pulse as an opportunity, and outputs the count value. The count value for timer corresponds to a VP or VC stored in the VP managing RAM 32b or the VC managing RAM 32d. For instance, a certain count value shows timing information to update a timer value of a certain VP or cancel an alarm state because the timer value reaches a maximum value.

The counter for timer 32g1 counts 1024 (0 to 1023) for VPs of four STS channels #i in total since 256 VPs exist in one STS channel #i, for example. On the other hand, the counter for timer 32g1 counts 256 (0–255) for VCs of four STS channels #i in total since 64 VCs are objects of termination in one STS channel #i. Here, the counter for timer 32g1 counts up to 1024+256 in total as one cycle. After completing 1024+256 counts, the counter for timer 32g1 does not count until the next 156 ms pulse is received.

The counter for timer 32g1 transmits a VP update request (request for updating a count value for VP) or a VC update request (request for updating a count value for VC) along with the above count value since a count value for timer in the VP alarm state and a count value for timer in the VC alarm state are duplicated (counts from 0 to 255 are duplicated) When a count value is 254 for VC, for example, the counter for timer 32g1 outputs a count value 254 along with a VC update request.

Next, the counter for clearing 32g2 is a (1024+256)-counting counter. Unlike the counter for timer 32g1, the counter for clearing 32g2 is a free running counter which counts up from 0 to 255 for VC after completing the counting from 0 to 1023 for VP. Since the count value for clearing the VP alarm state and the count value for clearing the VC alarm state are duplicated (counts from 1 to 255 are duplicated), the counter for clearing 32g2 transmits a VP update request or a VC update request along with the above count value. When a count value is 1006 for VP, for example, the counter for clearing 32g2 outputs a count value 1006 along with a VP update request.

The SEL 32g3 switches between a count value of the counter for timer 32g1 and a count value of the counter for clearing 32g2 under a control of the selector control unit 32g4 to output the switched count value, while switching a destination to which the update request for timer or the update request for clearing is outputted.

The selector control unit 32g4 controls the SEL 32g3 so that a count value of the counter for timer 32g1 and a count value of the counter for clearing 32g2 are alternately outputted from the SEL 32g3 when the counter for timer 32g1 and the counter for clearing 32g2 are in a state where the counters 32g1 and 32g2 continue to count up, and a VP update request or a VC update request for timer or clearing is outputted from the SEL 32g to a desired output destination.

In a state where only the counter for clearing 32g2 continues to count up, the selector control unit 32g4 controls the SEL 32g3 to output only a count value from the counter for clearing 32g2 and a VP or VC update request.

For example, the selector control unit 32g4 monitors a count value from the counter for timer 32g1, and alternately switches data outputted from the SEL 32g3 between data for timer and data for clearing (count value and update request) when a count for timer is continuously counted up. On the other hand, in a state where the counter for timer 32g1 does not count up and the count value is constant, he selector control unit 32g4 outputs only a count value for clearing and a VP or VC update request for clearing. At the timing to output a count value from the counter for timer 32g1 and a VP or VC update request, the selector control unit 32g4 can control the SEL 32g3 to prevent a count value for timer and a VP or VC update request from being outputted.

The divide-by-6 counter 32g5 generates a one second timer signal. The one second timer signal is a value that becomes an object in comparing timings when an alarm cell is sent the second time and later.

The transfer control unit 32h shown in FIG. 27 notifies information about transition to the VP-AIS or VD-RDI state from the generation managing unit 32a1 of the VP managing interface unit 32a, information about that an alarm state transits to cancel from the alarm canceling/clearing unit 32a3, information about that an alarm state transmits to cancel from the timer updating/alarm cancel clearing unit 32c1, and information about transition to the VC-AIS or VC-RDI state from the managing control unit 32c2 to the microcomputer 95. These kinds of information is transmitted to the microcomputer 95 through the microcomputer interface unit 92.

Next, the ALM (alarm) cell generating unit (alarm data generating unit) 33 shown in FIG. 22 generates an alarm cell to be notified another ATM processing apparatus 4 (not shown) correspondingly to VPI/VCI on the basis of information such as VP-AIS state and the like held and managed correspondingly to VPI/VCI in the alarm managing unit 32. The alarm held in the alarm managing unit 32 is read out in response to a request from the ALM cell generating unit 33. When the alarm is confirmed, the ALM cell generating unit 33 reads entry information and the like through the RAM access intervening unit 91 to execute an insert request to the cell inserting/discarding unit 39 on the basis of the read information. The ALM cell generating unit 33 stops its process until the cell inserting is completed, and starts an entry check in order to generate a new cell or a process to retrieve an alarm of a different channel only after receiving an insert complete signal.

Figure 34:
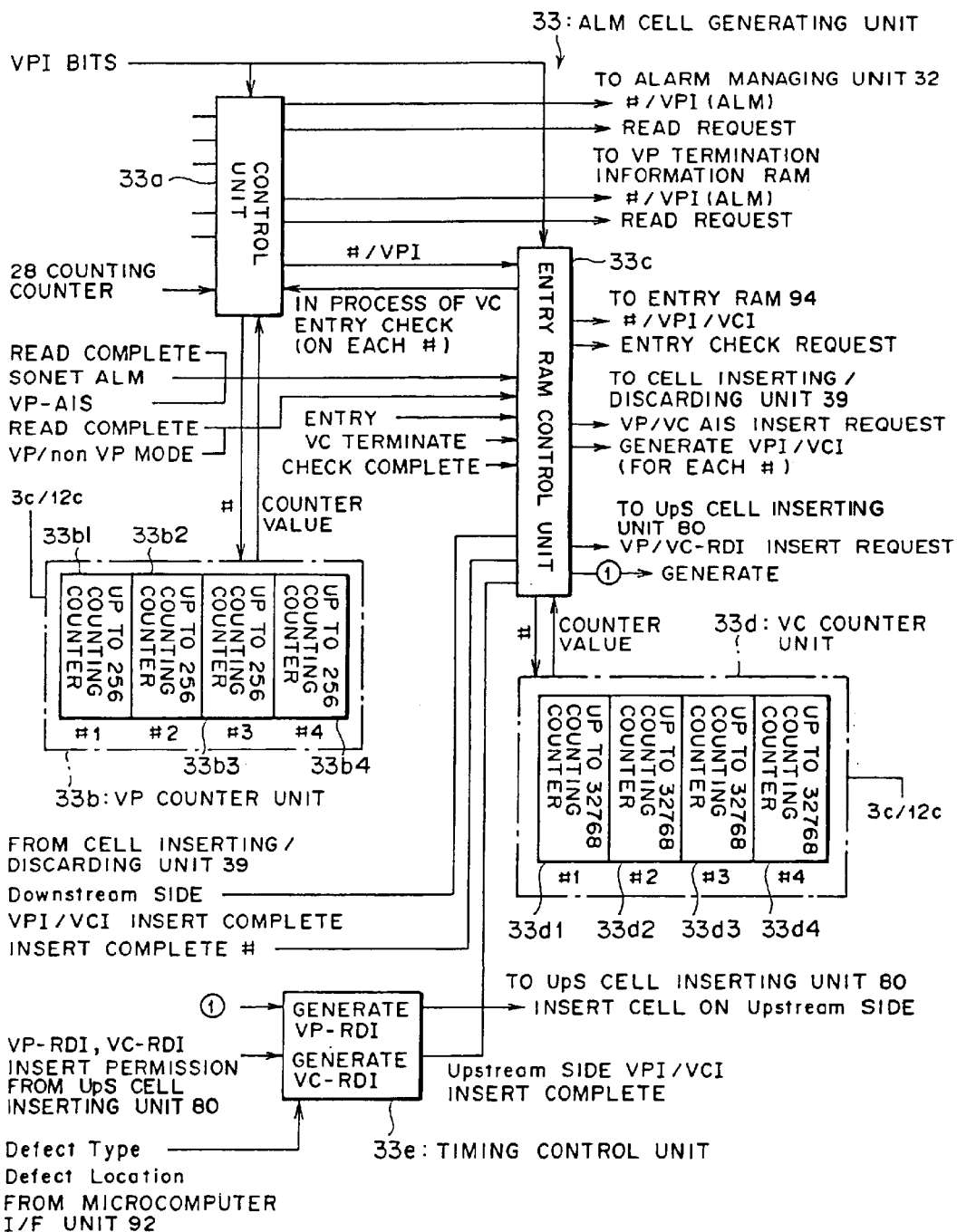
FIG. 34 is a block diagram showing an ALM cell generating unit according to the embodiment of this invention.

To this end, the ALM cell generating unit 33 comprises, as shown in FIG. 34, a control unit 33a, a VP counter unit 33b, an entry RAM control unit 33c, a VC counter unit 33d and a timing control unit 33e.

The control unit 33a outputs a read request to read information on an alarm state to the alarm managing unit 32 and a read request to read VP mode information to the VP termination information RAM 37 along with an STS channel #i and a VPI. A VPI outputted to the alarm managing unit 32 and the VP termination information RAM 37 is specified by a count value outputted from the VP counter unit 33b to the control unit 33a. While receiving a signal indicating that a VC entry request is being made from the entry RAM control unit 33c, the control unit 33a does not make a read request to read an alarm state or the like of another VPI in the STS channel #i to which a VC being now undergoing the entry check belongs.

The VP counter unit 33b specifies a VPI to be transmitted along with a read request when the control unit 33a makes the read request to the alarm managing unit 32 or the like. The VP counter unit 33b comprises 256-counting counters 33b1 through 33b4 for each STS channel #i since one STS channel #i includes 256 VPs. Each of the counter 33b1 through 33b4 starts to count with reception of STS channel information from the control unit 33a as an opportunity, and outputs a count value to the control unit 33a. A count value outputted from each of the counters 33b1 through 33b4 corresponds to a VPI in each STS channel. While the control unit 33a receives a signal indicating during a VC entry from the entry RAM control unit 33c after a count value of an STS channel #1 is outputted, the counter 33b2 outputs a count value to the control unit 33a when receiving information on the STS channel #2.

When the control unit 33a detects a delay of a VC entry check on a certain STS channel #i because of certain circumstances, the control unit 33a can shift to a process to detect generation of another alarm.

Namely, the above control unit 33a and the VP counter unit 33b function as an alarm state detecting unit for detecting an alarm state held and managed for each VPI by the alarm managing unit 32.

The entry RAM control unit 33c executes a control to read information necessary to generate an alarm cell from the entry RAM 94 on the basis of the VP alarm state and the VP termination information read out in response to a read request from the control unit 33a.

The entry RAM control unit 33c outputs an STS channel #i, a VPI and a VCI along with a read request to read information for generating a cell to the entry RAM 94 when detecting a VP alarm state received from the alarm managing unit 32. The STS channel #i and the VPI are received from the control unit 33a, while the VCI to be outputted to the entry RAM 94 is specified by a count value outputted from the VC counter unit 33d.

The entry RAM control unit 33c receives an entry [ENTRY; refer to "d-12" in FIG. 19] and VC termination information (refer to "d-13" in FIG. 19) in response to the read request to determine whether an alarm generate request is outputted or not, outputs a VP/VC-AIS insert request and a generated VPI-VCI to the cell insert/discarding unit 39, outputs a VP/VC-AIS insert request to the UpS cell inserting unit 80, and outputs a generate request to the timing control unit 33e.

The VC counter unit 33d shown in FIG. 34 generates a count value specifying a VCI to be transmitted along with a read request when the entry RAM control unit 33c executes the read request to the entry RAM 94. The VC counter unit 33d comprises four counters 33d1 through 33d4 to specify a count value for each STS channel #i.

Each of the counters 33d1 through 33d4 starts to count up with reception of information on a corresponding STS channel #i as an opportunity, and outputs a count value to the entry RAM control unit 33c. A VCI specified by the count value corresponds to a VCI of bits in a VC in address of the entry RAM 94. In an STS channel #j (j is any one of 1 to 4) in which a maximum number of bits of a VC in a configuration of an address is set to 15 by the microcomputer 95, a counter for the STS channel #j is configured as a maximum of 32768-counting counter.

How many a maximum number of counts is set to each of the counters 33d1 through 33d4 is determined, reflecting a rate of bits of a VPI of an address in the entry RAM 94.

Namely, the above entry RAM control unit 33c and the VC counter unit 33d function as an alarm data generating information detecting unit for detecting information necessary for alarm data in the entry RAM 94 on the basis of information received form the alarm managing unit 32 and the like.

The timing control unit 33e outputs an insert cell to the UpS cell inserting unit 80 when receiving a generate request from the entry RAM control unit 33c and an insert permission to insert a VP-RDI or VC-RDI from the UpS cell inserting unit 80.

Next, the cell inserting/discarding unit (insert processing unit) 39 shown in FIG. 22 discards a specific cell in a cell flow from the UTOPIA 10 on the downstream side, besides inserts a specific ATM cell to the cell flow.

A specific cell to be discarded is an ATM cell receiving that is an object of a cell discard request from the cell identifying unit 31, or an ATM cell that is an object of a discard request from the LB processing unit 40. A specific cell to be inserted is an ATM cell that is an object of an insert request to insert a VP-AIS or a VC-AIS from the ALM cell generating unit 33. An ATM cell to be inserted to a cell flow is generated by the cell inserting/discarding unit 39 on the basis of cell generating information and the like from the ALM cell generating unit 33. When the ATM cell is inserted, the cell inserting/discarding unit 39 cannot insert the cell when receiving an insertion inhibit signal from the UTOPIA 20 on the downstream side, or can insert an ATM cell in response to the insert request only after four ATM cells have passed after insertion of one ATM cell to the cell flow.

Figure 35:
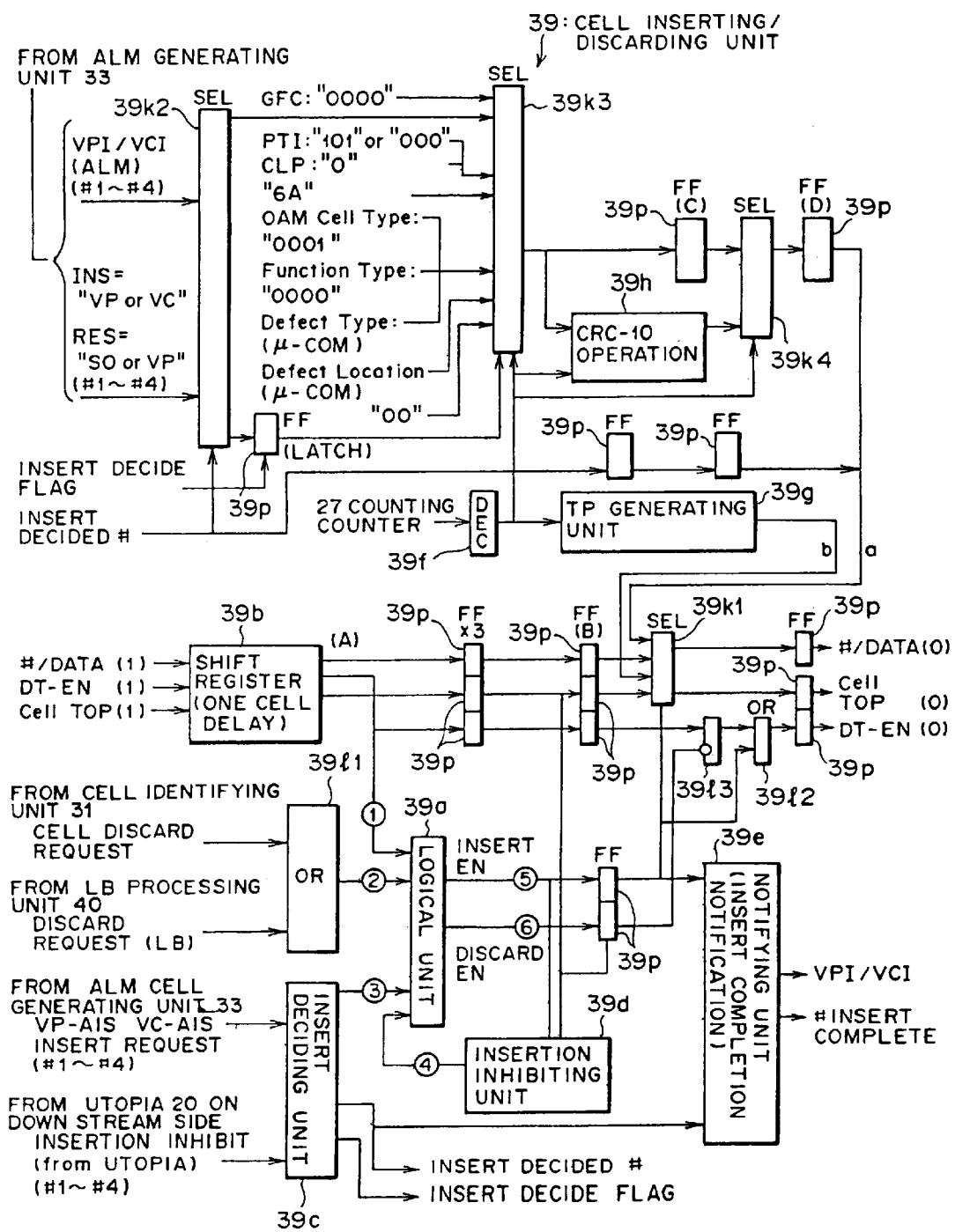
FIG. 35 is a block diagram showing a cell inserting/discarding unit according to the embodiment of this invention.

For this, the cell inserting/discarding unit 39 comprises, as shown in FIG. 35, a logical unit 39*a*, a shift register 39*b*, an insertion deciding unit 39*c*, an insertion inhibiting unit 39*d*, a notifying unit 39*e*, a decoder 39*f*, a TP generating unit 39*g*, an arithmetic unit 39*h*, SELs 39*k*1 through 39*k*4, OR circuits 39*l*1 and 39*l*2, an AND circuit 39*l*3 and a flip-flop 39*p*.

The logic unit 39*a* intervenes to perform any one of processes to pass, insert or discard an ATM cell on the basis of a cell effective signal, an insert request, a discard request and an insertion inhibit signal. The cell effective signal is information indicating that a received cell sent from the shift register 39*b* is effective.

In intervening, the logical unit 39*a* intervenes as shown in Table 4 below to output an insertion enable signal or a discard enable signal.

TABLE 4

EXAMPLE OF INTERVENING PROCESS

| Insertion Inhibit Signal ④ | Cell Effective Signal ① | Discard Request Signal ② | Insertion Decide Signal ③ | Mode | Insert EN ⑤ | Discard EN ⑥ |
|---|---|---|---|---|---|---|
| 0 | 0 | 0 | 0 | Pass | 0 | 0 |
| 0 | 0 | 0 | 1 | Insert | 1 | 0 |
| 0 | 0 | 1 | 0 | Discard | 0 | 1 |
| 0 | 0 | 1 | 1 | Insert | 1 | 0 |
| 0 | 1 | 0 | 0 | Pass | 0 | 0 |
| 0 | 1 | 0 | 1 | Pass | 0 | 0 |
| 0 | 1 | 1 | 0 | Discard | 0 | 1 |
| 0 | 1 | 1 | 1 | Insert | 1 | 0 |
| 1 | 0 | 0 | 0 | Pass | 0 | 0 |
| 1 | 0 | 0 | 1 | Pass | 0 | 0 |
| 1 | 0 | 1 | 0 | Discard | 0 | 1 |
| 1 | 0 | 1 | 1 | Discard | 0 | 1 |
| 1 | 1 | 0 | 0 | Pass | 0 | 0 |
| 1 | 1 | 0 | 1 | Pass | 0 | 0 |
| 1 | 1 | 1 | 0 | Discard | 0 | 1 |
| 1 | 1 | 1 | 1 | Discard | 0 | 1 |

As shown in Table 4 above, the cell inserting/discarding unit 39 inserts an alarm cell generated in the ALM cell generating unit 33 instead of an ATM cell identified as data to be discarded by the cell identifying unit 31.

The shift register 39*b* determines whether a received cell is effective or not. When the received cell is effective, the shift register 39*b* outputs information on it to the logical unit 39*a*.

The insertion deciding unit 39*c* outputs an insert request signal to the logical unit 39*a*, besides outputting insertion decided STS channel #i information and an insertion decide flag to the cell generating side. When receiving an insertion inhibit signal from the UTOPIA 20 on the downstream side, the insertion deciding unit 39*c* does not output an insert request signal to the logical unit 39*a*.

The insertion inhibit unit 39*d* monitors a timing to insert the next cell after a cell is inserted. It is defined that intervals to insert cells are of at least four cells.

On the cell generating side, data from the ALM cell generating unit 33 is generated as a predetermined cell format through the SELs 39*k*2 and 39*k*3. The generated cell is inserted in a main signal of the SEL 39*k*1 by insert EN (insertion enable signal) from the logical unit 39*a* and outputted.

Incidentally, the 28-counting counter 38 shown in FIG. 22 generates a count value on the basis of a frequency divide signal received from the PG unit 93 (to be described later). The generated count value is counted from 1 to 27, which corresponds to 28 clocks of reference timing in the ATM cell processing unit 4-1. The shift register 36 temporarily holds a cell received from the cell identifying unit 31. The VP termination information RAM 37 holds termination information on a VP. The cell inserting/discarding unit 39 transmits a received cell (user cell) from the shift register 36 to the UTOPIA 20 (for transmitting) on the downstream side, discards a cell corresponding to a request to discard a received cell from the cell identifying unit 31, and inserts an ATM cell in response to a cell insert request from the ALM cell generating unit 33.

The cell identifying unit 31 in the cell processing unit 30 with the above structure according to this embodiment reads information from the entry RAM 94 and the VP termination information RAM 37 when receiving an ATM cell from the UTOPIA 10 on the downstream side, identifies contents of the received cell, determines whether the received OAM cell is discarded or not, and outputs a signal of a cell discard request or the like.

When the cell identifying unit 31 identifies that the ATM cell is an alarm cell (alarm data), the alarm managing unit 32 holds and manages alarm state information correspondingly to VPI/VCI on the basis of the alarm cell.

Figure 36:
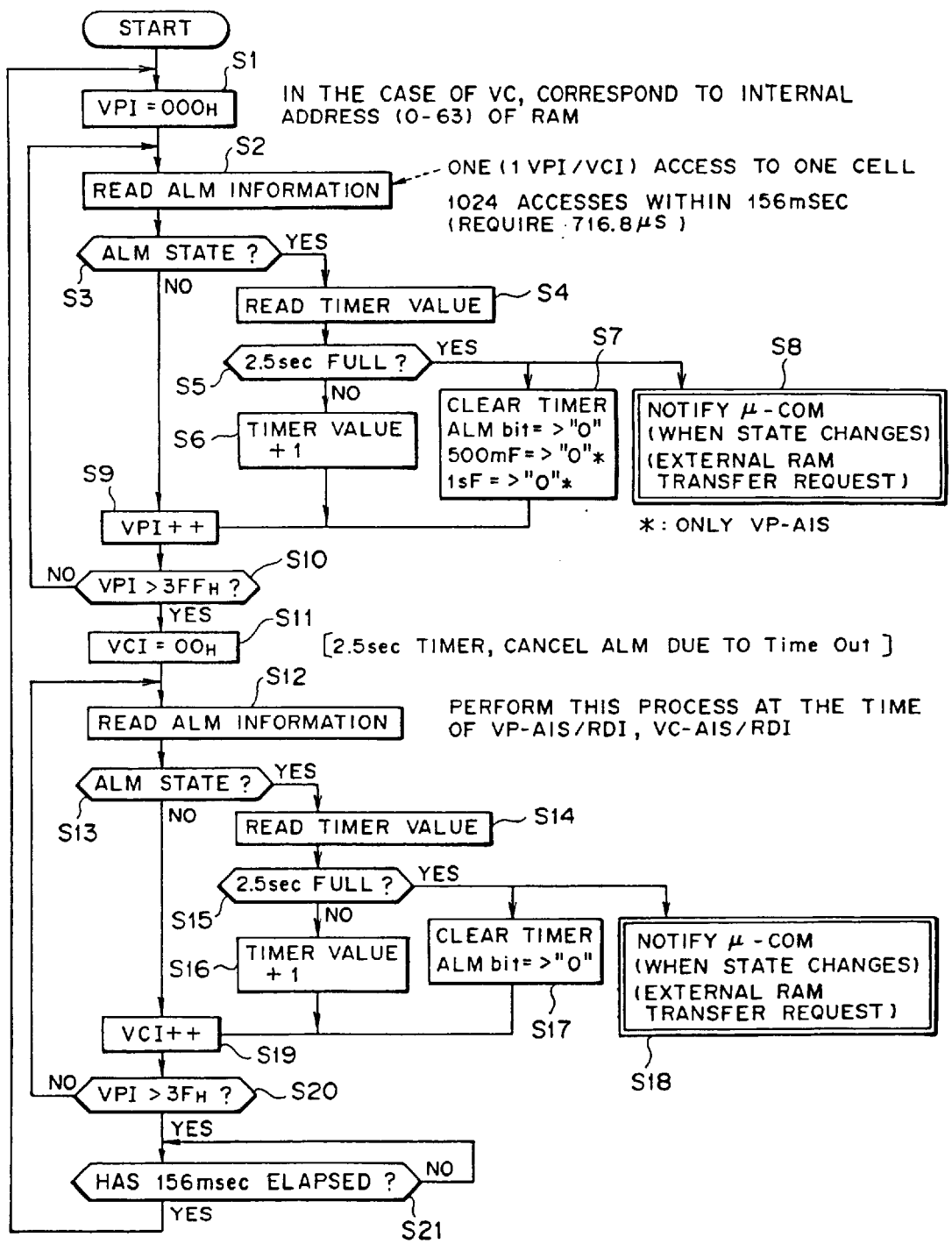
FIG. 36 is a flowchart for illustrating an alarm canceling process in an alarm managing unit according to the embodiment of this invention.

FIG. 36 is a flowchart for illustrating a process of canceling an alarm in the alarm managing unit 32. The alarm canceling/clearing unit 32*a*3 sets a VPI value "000$_H$" (Step S1), and read ALM information in the order from the VPI "000$_H$" ($_H$: hex) (Step S2). At this time, an access is had once to one cell (1 VPI/VCI), and 1024 accesses are had within 156 msec.

The alarm canceling/clearing unit 32*a*3 determines from the read information whether the state is an ALM state or not (Step S3). When detecting the ALM state (if determined YES at Step S3), the alarm canceling/clearing unit 32*a*3 reads a timer value from the VP managing RAM 32*b* (Step s4) and determines whether the timer value reaches a maximum value or not (Step S5). When the timer values does not reach the maximum value, the alarm canceling/clearing unit 32*a*3 counts up (increments) the timer value (from NO route at Step S5 to Step S6). When the timer value reaches the maximum value, the alarm canceling/clearing unit 32*a*3 initializes (clears) the timer value, cancel an alarm bit, clears the 500 mF and the 1 sF, and if there is a change in the ALM state, notifies of it the microcomputer 95 (from YES route at Step S5 to Steps S7 and S8).

When the alarm state is not detected from the information read out by the alarm managing unit 32 (Step S2), the alarm canceling/clearing unit 32*a*3 counts up the VPI (from NO route at Step S3 to Step S9), and determines whether the VPI value reaches a maximum value or not (Step S10).

When the VPI value does not reach the maximum value, the alarm canceling/clearing unit 32a3 performs a VP alarm managing process in the similar manner on the next (incremented) VPI until the VPI value reaches the maximum value (until determined YES at Step S10). When the VPI reaches the maximum value (if determined YES at Step S10), the alarm managing unit 32 starts a process to manage a VC alarm.

Namely, the timer updating/alarm cancel clearing unit 32c1 sets VCI "$00_H$" (Step S11), reads ALM information in the order from VCI "$00_H$" from the VC managing RAM 32d (Step S12), and determines whether the VC is in an alarm state or not (Step S13).

When the VC is in the alarm state, the timer updating/alarm cancel clearing unit 32c1 reads a timer value (from YES route at Step S13 to Step S14), and determines whether the read timer value reaches a maximum value or not (Step S15). When the timer value does not reach the maximum value, the timer updating/alarm cancel clearing unit 32c1 counts up (increments) the timer value by one (from NO route at Step S15 to Step S16). When the timer value reaches the maximum value, the timer updating/alarm cancel clearing unit 32c1 clears the timer value, and cancels an alarm bit (clear "0"). If the VC alarm state is changed, the timer updating/alarm cancel clearing unit 32c1 notifies of it the microcomputer 95 (from YES route at Step S15 to Steps S17 and S18).

On the other hand, when the alarm state is not detected from the information read out by the alarm managing unit 32, the timer updating/alarm cancel clearing unit 32c1 increments a VCI value (from NO route at Step S13 to Step S19), and determines whether the VCI value reaches a maximum value or not (Step S20).

When the VCI value does not reach the maximum value, the timer updating/alarm cancel clearing unit 32c1 performs a process to manage the VC alarm similar to the above on the next (incremented) VCI (from NO route at Step S20 to Steps S12 through S19) until the VCI value reaches the maximum value (until determined YES at Step S20).

When the VCI value reaches the maximum value, the alarm managing unit 32 starts again the process to manage the VP alarm (from YES route at Step S21 to Step S1).

On the other hand, the ALM cell generating unit 33 generates an alarm cell to be notified another ATM processing unit 4 (not shown in FIGS. 1 and 2) correspondingly to VPI/VCI on the basis of information such as a VP-AIS state and the like held and managed correspondingly to VPI/VCI in the alarm managing unit 32.

Figure 37:
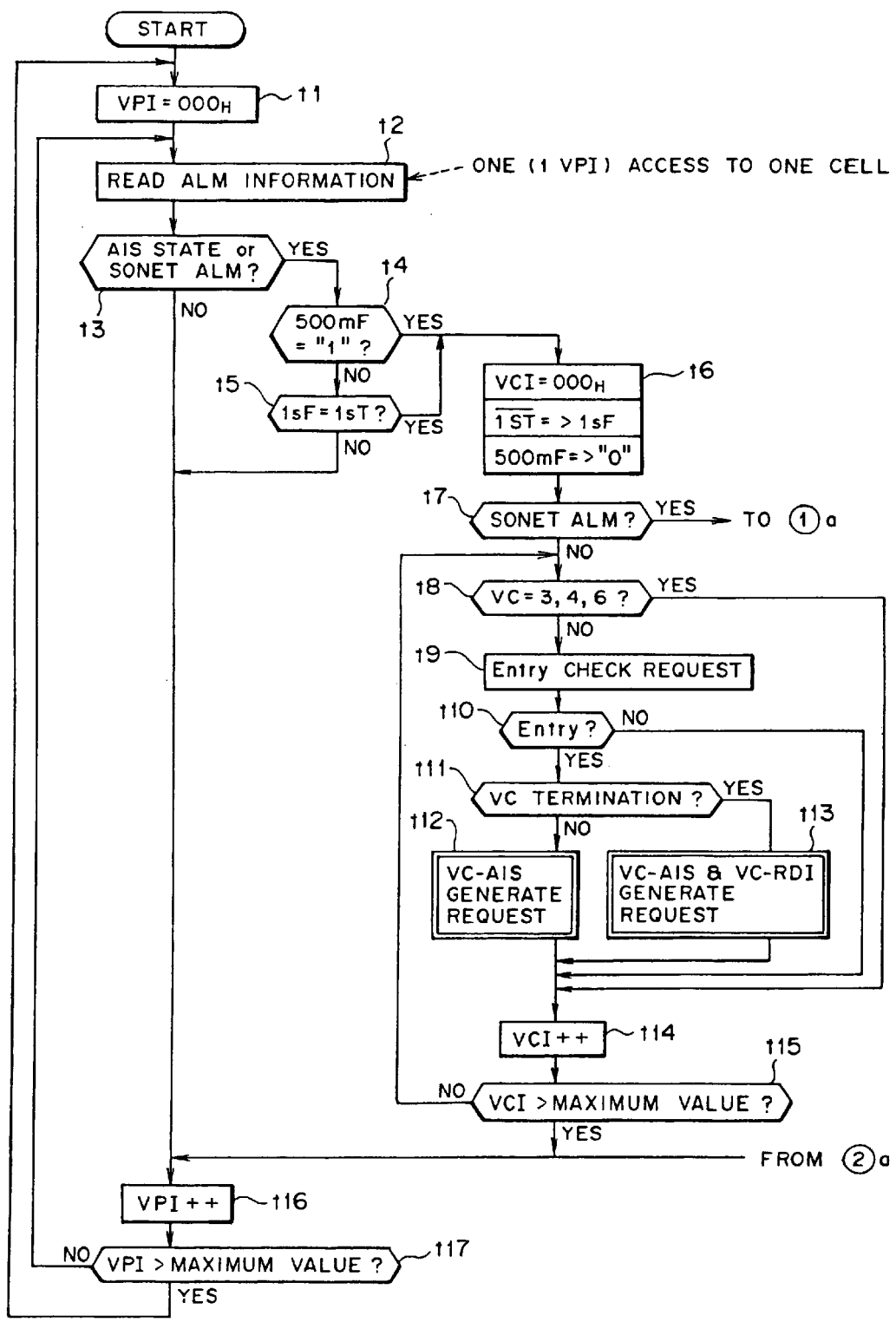
FIG. 37 is a flowchart for illustrating an ALM cell generating process in the ALM cell generating unit according to the embodiment of this invention.
Figure 38:
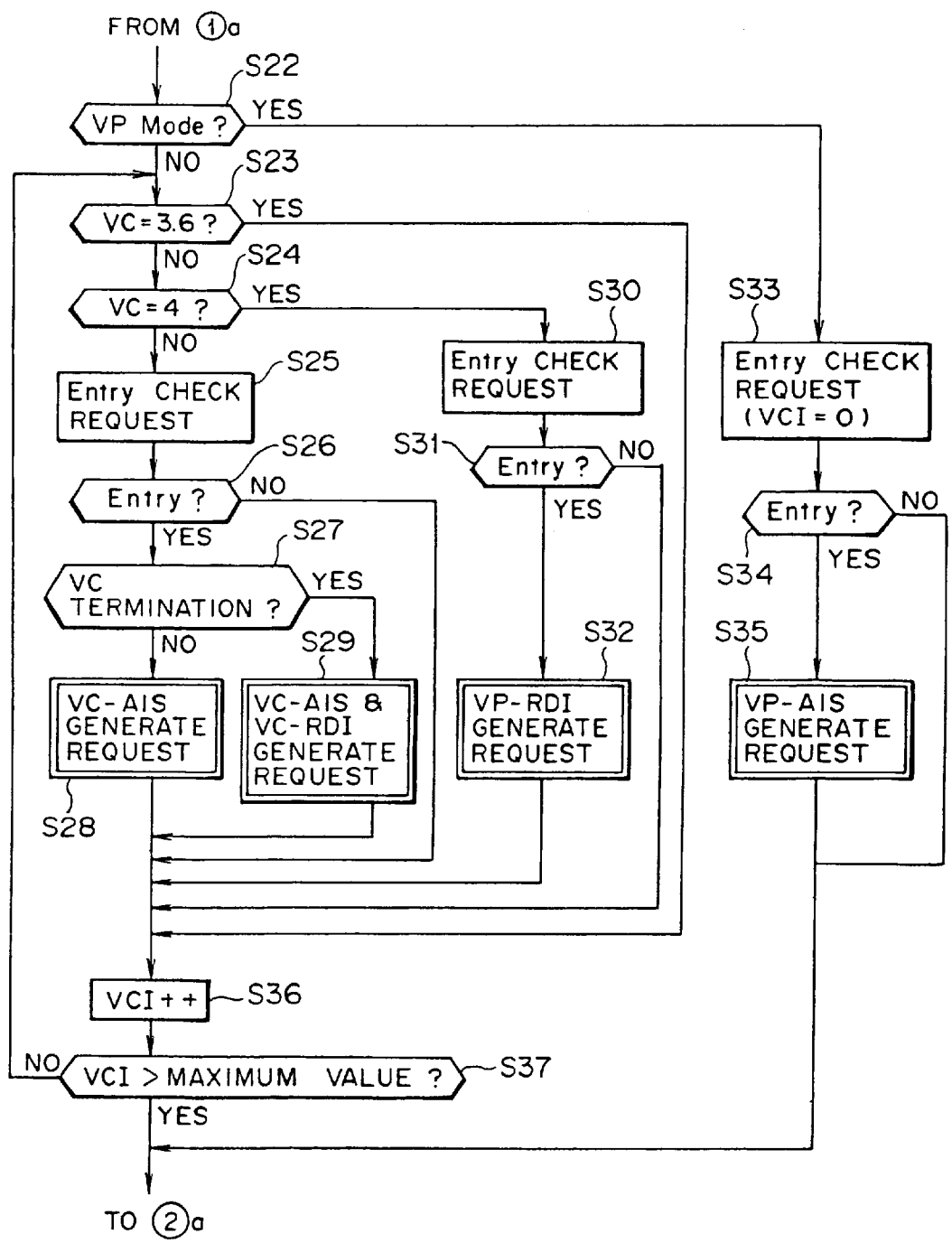
FIG. 38 is a flowchart for illustrating the ALM cell generating process in the ALM cell generating unit according to the embodiment of this invention.

FIGS. 37 and 38 are flowcharts for illustrating an operation to generate an ALM cell.

As shown first in FIG. 37, the control unit 33a in the ALM cell generating unit 33 outputs STS channel #i information to the VP counter unit 33b to receive a count value (VPI "$000_H$") (Step t1), and reads ALM information on VPI "$000_H$" from the alarm managing unit 32 (Step t2).

The entry RAM control unit 33c in the ALM cell generating unit 33 determines an alarm state (AIS state or SONET alarm state) or not from the read information (Step t3). In the case of an alarm state, the entry RAM control unit 33c further determines whether the 500 mF (500 mili flag) is raised or not (from YES route at Step t3 to Step t4).

When the 500 mF is not raised, the entry RAM control unit 33c determines whether a polarity of the 1 sF and a polarity of the is timer are the same or not (from NO route at Step t4 to Step t5). When the polarities of the 1 sF and the is timer are the same or the 500 mF (500 mili flag) is raised, the entry RAM control unit 33c writes a value (0 or 1) having a characteristic reversal to that of a is timer value in the 1 sF (1 second flag), rewrites the 500 mF to "0", and sets the VCI to "$000_H$" (from YES route at Step t4 to Step t6, or from YES route at Step t5 to Step t6).

The entry RAM control unit 33c then determines whether the ALM information read out from the alarm managing unit 32 is SONET alarm or not (Step t7). When the ALM information read out from the alarm managing unit 32 does not correspond to SONET alarm, the entry RAM control unit 33c determines any one of "3", "4" and "6" the VC corresponds to (from NO route at Step t7 to Step t8) When the VC corresponds to any one of "3", "4" and "6", the entry RAM control unit 33c in the ALM cell generating unit 33 outputs STS channel #i information to the VC counter unit 33d, and receives a count value counted up (from YES route at Step t8 to Step t14).

When the VC does not correspond to any one of "3", "4" and "6", the entry RAM control unit 33c outputs an entry check request to the entry RAM 94 (from NO route at Step t8 to Step t9), and determines whether the VC is set an entry or not on the basis of information read out from the entry RAM 94 (Step t10).

When the VC is set an entry, the entry RAM control unit 33c determines whether the VC is an object of VC termination or not (from YES route at Step t10 to Step t11). When the VC is an object of VC termination, the entry RAM control unit 33c outputs a request to generate a VC-AIS and VC-RDI cells to the cell inserting/discarding unit 39 and the UpS cell inserting unit 80 (from YES route at Step t11 to Step t13). Incidentally, the VC-AIS cell generate request is transmitted along with information about a VPI/VCI of the cell to be generated to the cell inserting/discarding unit 39.

After the entry RAM control unit 33c outputs the generate request (insert request) to the UpS cell inserting unit 80 and the timing control unit 33e receives a insertion permit signal from the UpS cell inserting unit 80, a VC-RDI cell (insert cell) is outputted from the timing control unit 33e to the UpS cell inserting unit 80.

When the VC is not an object of VC termination, the entry RAM control unit 33c outputs a request to generate a VC-AIS cell (from NO route at Step t11 to Step t12).

The entry RAM control unit 33c outputs STS channel #i information to the VC counter unit 33d to receive a count value counted up (Step t14), and determines whether the VCI value reaches a maximum value or not (Step t15). When the VCI value does not reach the maximum value, the entry RAM control unit 33c performs a process such as an entry check and the like on the counted-up VCI in the same VP (from NO route at Step t15 to Step t8). When the VCI value reaches the maximum VCI value, the entry RAM control unit 33c shift to counting-up of the VPI (from YES route at Step t15 to Step t16).

When the ALM information read out from the alarm managing unit 32 corresponds to SONET alarm, the entry RAM control unit 33c, as shown in FIG. 38, determines the VP mode or not (from YES route at Step t7 shown in FIG. 37 to Step S22 shown in FIG. 38). When the VP is set termination, the entry RAM control unit 33c outputs a request for entry check to the entry RAM 94 (from YES route at Step S22 to step S33).

The entry RAM control unit 33c determines whether the VP is set an entry or not on the basis of information received from the entry RAM 94 (Step S34). When the VP is set an entry, the entry RAM control unit 33*c* outputs a VP-AIS generate request to the cell inserting/discarding unit 39 (from YES route at Step S34 to Step S35). The VP-AIS cell generate request is sent along with information such as a VPI/VCI and the like of a cell to be generated to the cell inserting/discarding unit 39.

When the VP is not set VP termination, the entry RAM control unit 33*c* determines either "3" or "6" the VC corresponds to (from NO route at Step S22 to Step S23). When the VC corresponds to neither "3" nor "6", the entry RAM control unit 33*c* further determines whether the VC is "4" or not (from NO route at Step S23 to Step S24).

When the VC is "4", the entry RAM control unit 33*c* outputs an entry check request to the entry RAM 94 (from YES route at Step S24 to Step S30), and determines whether the VC is set an entry or not on the basis of information read out from the entry RAM 94 (Step S31). The VC is set an entry, the entry RAM control unit 33*c* outputs a VP-RDI cell generate request (request for generating a VP-RDI cell) to the UpS cell inserting unit 80. When the timing control unit 33*e* receives an insertion permit signal from the UpS cell inserting unit 80, the timing control unit 33*e* transmits a VP-RDI cell (insert cell) to the Ups cell inserting unit 80.

The entry RAM control unit 33*c* outputs the entry check request to the entry RAM 94 even when the VC does not correspond to "4" (from NO route at Step S24 to Step S25), and determines on the basis of information received from the entry RAM 94 whether the VC is set an entry or not (Step S26). When the VC is set an entry, the entry RAM control unit 33*c* determines from information read out from the entry RAM 94 whether the VC is set VC termination or not (Step S27).

When the VC is set VC termination, the entry RAM control unit 33*c* outputs VC-AIS and VC-RDI generate requests (requests for generating VC-AIS cell and VC-RDI cell) to the cell inserting/discarding unit 39 and the UpS cell inserting unit 80 (from YES route at Step S27 to Step S29). When the VC is not set VC termination, the entry RAM control unit 33*c* outputs a VC-AIS generate request to the cell inserting/discarding unit 39 (from NO route at Step S27 to Step S28).

The entry RAM control unit 33*c* outputs STS channel #i information to the VC counter unit 33*d* to receive a count value counted up (Step S36), and determines whether the VCI value reaches a maximum value or not (Step S37). When the VCI value does not reach the maximum value, the entry RAM control unit 33*c* carries out an entry check and the like on the VCI counted up in the same VP (from NO route at Step S37 to Step S23). When the VCI value reaches the maximum VCI value, the entry RAM control unit 33*c* shift to counting-up of the VPI (from YES route at Step S37 in FIG. 38 to Step t16 in FIG. 37).

The above generating process is performed for each STS channel #i. After the ALM cell generating process is performed on one STS channel #i, the ALM cell generating process on another STS channel #i is started.

Figure 39:
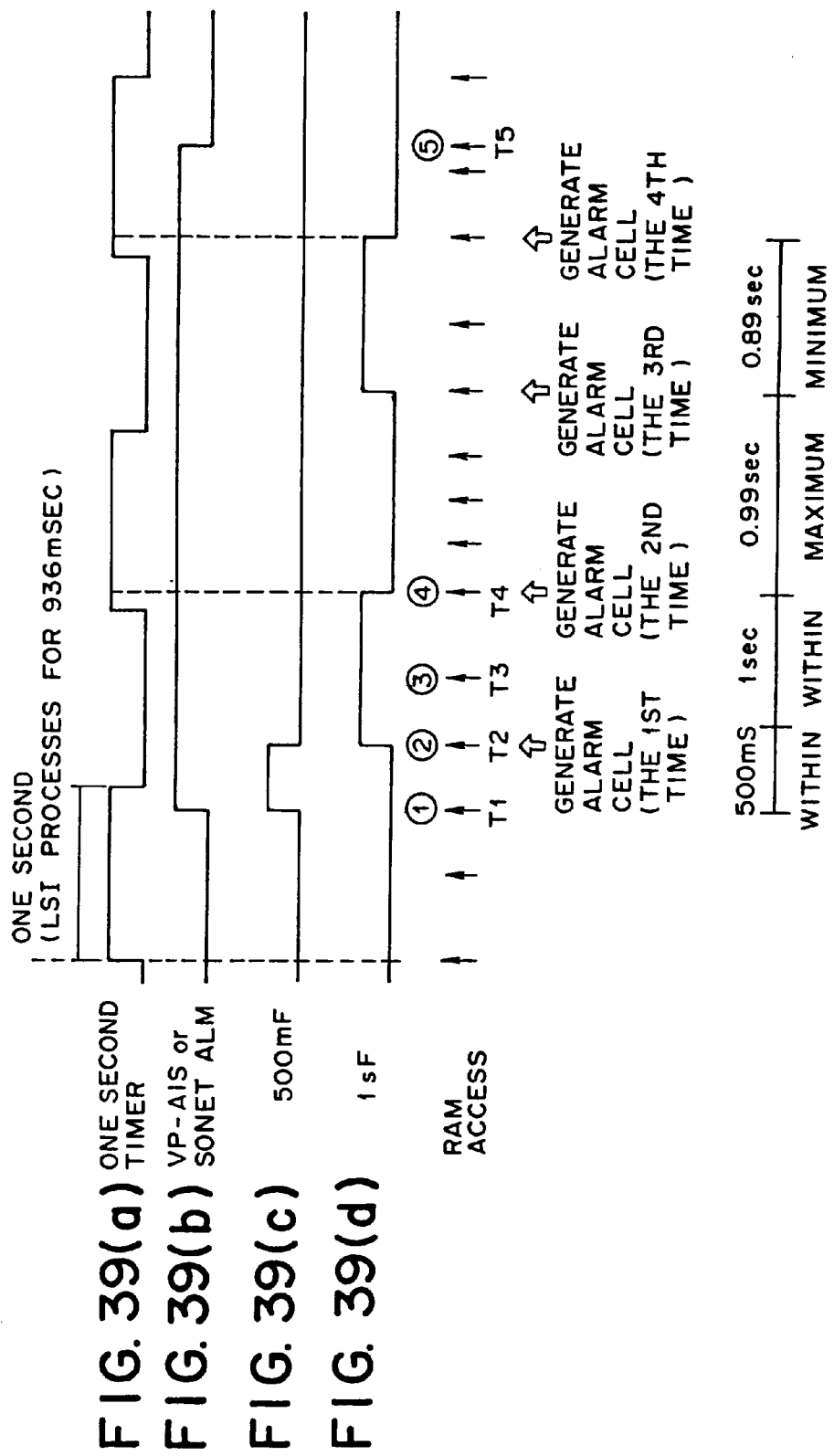
FIGS. 39(a) through 39(d) are timing diagrams for illustrating a process of generating a cell generate request in the ALM cell generating unit according to the embodiment of this invention.

FIG. 39 is a timing diagram for illustrating outputting of an ALM cell generate request in the ALM cell generating unit 33. As shown in FIG. 39, the ALM cell generating unit 33 holds an alarm state at a timing T1, and the 500 mF is stored in the VP managing RAM 32*b*. At a timing T2, the ALM cell generating unit 33 clears the 500 mF and raises the 1 sF having a polarity reversal to that of the 1 s timer when detecting the 500 mF.

At a timing T3, the ALM cell generating unit 33 cannot output a generate request since a polarity of the is timer differs from that of the 1 sF. At a timing T4 when the polarities of the 1 s timer and the 1 sF coincide, the ALM cell generating unit 33 outputs the generate request.

The cell inserting/discarding unit 39 transmits an ATM cell sent from the cell identifying unit 31 to the UTOPIA 20 on the downstream side, and discards a predetermined ATM cell by receiving a discard request from the cell identifying unit 31 or a discard request from the LB processing unit 40.

When there is a vacancy in a cell flow in the downstream, the cell inserting/discarding unit 39 generates an alarm cell in response to the generate request from the ALM cell generating unit 33 and inserts the generated alarm cell in the vacant position, or inserts a generated cell to a position of a cell to be discarded.

According to the cell processing unit 30 of this embodiment, entry information and the like on a plurality of channels is held commonly to VPI/VCI in the external entry RAM 94, entry information on a received channel is read out from the entry RAM 94 to identify a received cell, or alarm states of a plurality of channels are collectively held in the VP managing RAM 32*b* or the VC managing RAM 32*d* to monitor an alarm state or perform a process of generating an ALM cell. Therefore, the apparatus can have a simplified structure.

An address of the entry RAM 94 is generated on the basis of VPI/VCI so that entry information on a number of ATM cells is readily read and written, which enables a quick processing.

The VP termination information RAM 37 holds a plural pieces of VP mode (termination) information in a region at an address designated by a part of VPI/VCI so that a RAM performance is improved as compared with a case where one piece of VP termination information is held using one address.

The VP managing RAM 32*b* or the VC managing RAM 32*d* holds alarm states commonly using VPI or VCI information so that the RAM can be configured simply as compared with a case where a RAM is prepared for each VPI or VCI.

The VP managing RAM 32*b* or the VC managing RAM 32*d* stores an alarm state and a timer value in the same holding region so that the apparatus is configured simply.

When the alarm managing unit 32 detects SONET alarm or VP-AIS, the alarm managing unit 32 cancels, at the time of processing, VP-AIS or VC-AIS in a lower order held in the VP managing RAM 32*b* or the VC managing RAM 32*d* so that repetitive generation of alarm is avoided.

The VP managing RAM 32*b* holds 1 sF information along with alarm information so that the apparatus is configured simply.

The terminal VC managing RAM 32*f* holds information on a VP to which a VC that can be an object of termination belongs so as to cancel a VC alarm state managed using a unique number of an address of the VC managing RAM 32*d*.

Further, there are provided a plurality of the terminal VC managing RAMs 32*f*, and VP information on four STS channels # is divided and held in each of the terminal VC managing RAMs 32*f*. When the VP information to which a VC belongs is retrieved, the VP information on a common STS channel #i is read in parallel from each of the terminal VC managing RAMs 32*f*. This enables a quick processing.

When an alarm cell is generated, the ALM cell generating unit 33 detects an alarm state managed in the alarm managing unit 32, and the cell inserting/discarding unit 39 generates the alarm cell on the basis of information by reading out data necessary to generate the alarm cell from the entry RAM 94. It is therefore unnecessary to hold a large volume of information for generating cells, which leads to a simplified structure of the apparatus.

The cell inserting/discarding unit 39 inserts an alarm cell generated by the ALM cell generating unit 33 instead of an ATM cell identified as data to be discarded by the cell identifying unit 31 so as to readily insert the ATM cell in a cell flow.

(3) Description of the LB Processing Unit

The LB processing unit (continuity test processing unit) 40 shown in FIG. 2 generates an LB cell when receiving an LB execution request (request for executing a continuity test) from the microcomputer 95, transmits and receives the generated LB cell to and from another ATM processing apparatus 4, thereby executing the LB processing. The LB processing unit 40 then notifies of a result of the LB processing the microcomputer 95. Further, the LB processing unit 40 determines whether a received LB cell from an opposite other ATM processing apparatus 4 is an ATM cell having been generated by its own station or an ATM cell having been generated in the other ATM processing apparatus 4, and performs a processing such as looping-back or the like.

Figure 40:
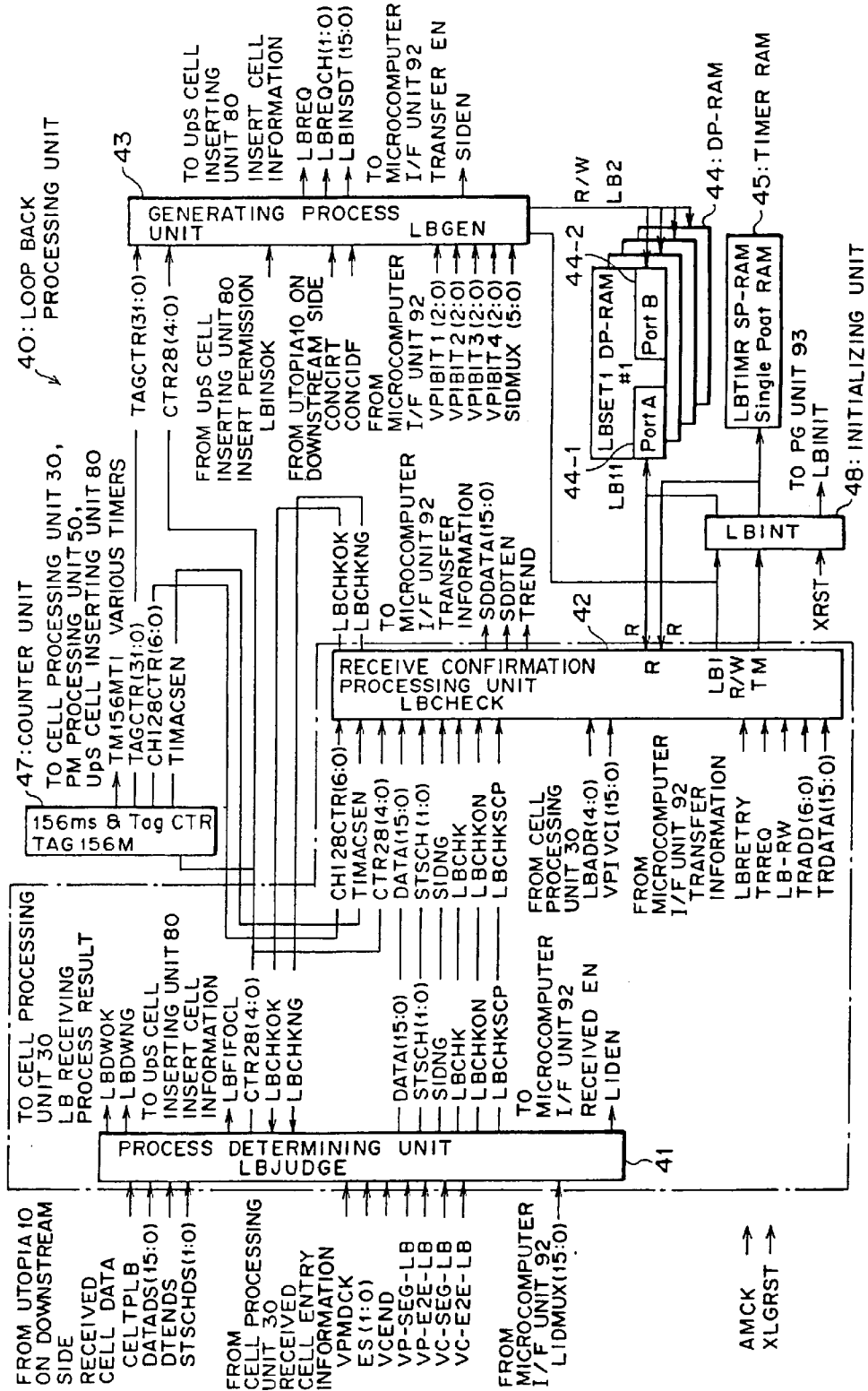
FIG. 40 is a block diagram showing an LB processing unit according to the embodiment of this invention.

To this end, the LB processing apparatus 40 comprises, as shown in FIG. 40, a process determining unit 41, a receive confirmation processing unit 42, a generating process unit 43, DP-RAMs 44, and a timer RAM 45.

Each of the DP-RAMs (setting data holding unit) 44 holds setting data received from the microcomputer 95. As shown in FIG. 40, the DP-RAM 44 is provided for each STS channel #i. Each DP-RAM 44 holds setting data for an ATM cell that is an object of the LB processing correspondingly to VPI/VCI. A port 44-1 of the DP-RAM 44 is used to read the setting data, while the other port 44-2 is used to read and write the setting data. From the port 44-1, the setting data is read out to the receive confirmation processing unit 42. Under a control of the generating process unit 43, the setting data is written and read through the port 44-2.

In other words, the LB cell generating process on a cell flow in the upstream and a process for receive confirmation on a cell flow in the downstream are performed with different ports.

Figure 41:
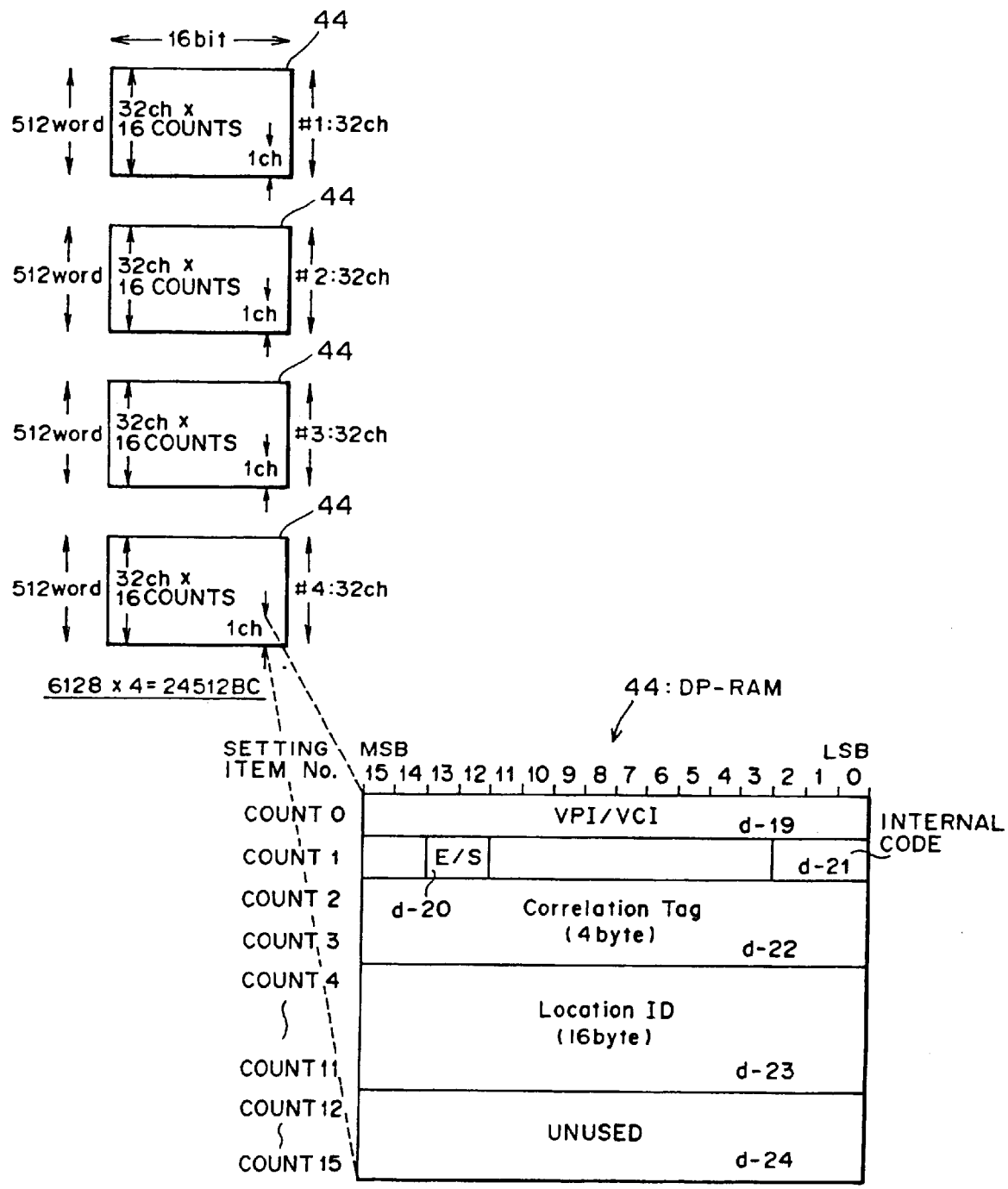
FIG. 41 is a diagram showing an example of a data structure in a DP-RAM according to the embodiment of this invention.

FIG. 41 is a diagram showing an example of a structure of the DP-RAM 44. Each DP-RAM 44 shown in FIG. 41 holds setting data for 32 channels (ch), in which 16 words are allocated to a region for one channel (16 bits for one word). For instance, a region designated by an address shown in FIG. 42 stores data shown in FIG. 41.

In concrete, an address of the DP-RAM 44 is configured with high order 5 bits (designated by "a-9" in FIG. 42) for an LB channel, and the remaining 4 bits (designated by "a-10" in FIG. 42) for bits to identify various setting items. An LB channel at the high order 5 bits is a unique number (any one from 0 to 31) set by the microcomputer 95, and held in the entry RAM 94 (refer to "d-16" in FIG. 19).

Data in the DP-RAM 44 comprises, in a region designated by an address (refer to FIG. 42), bits showing a VPI/VCI [1 byte (designated by "d-19" in FIG. 41)], bits [2 bits (designated by "d-20" in FIG. 41)] showing identification information on a communication section (End-to-End/ Segment), bits [(3 bits (designated by "d-21" in FIG. 41)) showing an internal CODE (processing state), bits [2 bytes (designated by "d-22" in FIG. 41)] showing information (Correlation Tag) such as a time at which an LB cell is generated and the like, bits [16 bytes (designated by "d-23" in FIG. 41)] showing information (Location ID) such as a loopback point of an LB cell and the like, and a non-used region [8 bytes (designated by "d-24" in FIG. 41)].

In the Correlation Tag designated by "d-22" in FIG. 41, there is held a time (Time Stamp) at which an LB cell is generated. The time at which the LB cell is generated is used to confirm whether a cell received from an opposite ATM processing apparatus 4 is a cell having been generated by itself or not, and is written by the generating process unit 43 to be described later when generated.

Table 5 below shows examples of the internal CODEs. In the internal CODE, 3 bits are used for internal, 2 bits among which are used for notification. For instance, an internal CODE of "judgement OK" shows a state where a received LB cell is determined as an LB cell that has been generated in another ATM processing apparatus 4, and should be looped back from this station, or a state where an LB cell having been generated by this station is received from another ATM processing apparatus 4. An internal CODE of "judgement NG" shows a state where a received cell has been generated in another ATM processing apparatus 4, and does not correspond to an LB cell to be looped back from this station. An internal CODE of "transmit wait" shows a state where an LB cell waits to be transmitted from the UpS cell inserting unit 80. On the other hand, an internal CODE of "receive wait" shows a state where this station waits to receive an LB cell having been generated in this station from an opposite ATM apparatus 4. Incidentally, information showing management states of "OK", "NG" and "requesting" using the 2 bits for notification is transmitted to the microcomputer 95.

TABLE 5

EXAMPLE OF INTERNAL CODES

| Internal Code | | | Management State | |
|---|---|---|---|---|
| — | For Notification | | Internal | μ-com |
| 0 | 0 | 0 | — | — |
| 0 | 0 | 1 | Judgement OK | OK |
| 0 | 1 | 0 | Judgement NG | NG |
| 0 | 1 | 1 | Transmit Wait | In Process of Request |
| 1 | 1 | 1 | Receive Wait | In Process of Request |

These internal Codes are rewritten by the generating process unit 43 on the basis of transition information of the LB processing in a RAM accessing unit 42-2 to be described later.

When the setting data is transferred to or from the microcomputer 95, when a received LB cell is confirmed or when a generated cell is detected (searched) or a cell is generated, an access is had to the DP-RAM 44. An access timing to the DP-RAM 44 is assigned at a predetermined time within 28 clocks, as shown in FIG. 43, for example. "R1" in FIG. 43 signifies that a setting item 1 (count 1; refer to FIG. 41) is read, and "WA" (A is a decimal digit 10 expressed in hexadecimal notation) signifies that information is written in a setting item 10 (count 10; refer to FIG. 41).

In concrete, an opportunity to get an access to the DP-RAM 44 is when a writing/reading is done from the microcomputer 95 or an internal CODE is read (mentioned as "R, W" in FIG. 43), when setting information is read at the time of a check on a received LB cell or a record of reception results or an internal code for monitoring a timer is read (mentioned as "confirm, TM" in FIG. 43), when an internal code "transmit wait" is retrieved at the time of LB cell generation, sell generation setting information is read or Correlation Tag is counted (mentioned as "search, generate" in FIG. 43), and the like.

At E/S held in the DP-RAM 44, there is held the same information as E/S (designated by "d-15" in FIG. 19) held in the entry RAM 94.

Figure 42:
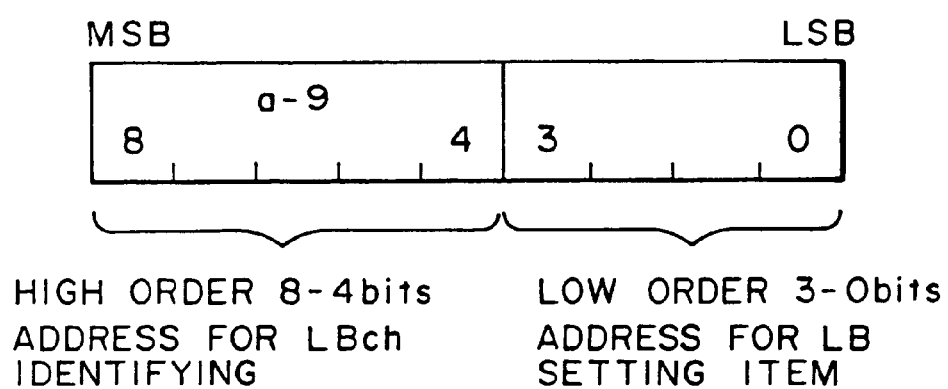
FIG. 42 is a diagram showing an example of a structure of an address of the DP-RAM according to the embodiment of this invention.

The timer RAM (count data holding unit) 45 holds elapsed time information on a time elapsed since an LB cell is sent out as a count value. The timer RAM 45 also holds a re-try count value showing the number of times of re-sending (also referred as "a re-try number", occasionally). The high order 5 bits in an address of the DP-RAM 44 shown in FIG. 42 are used as an address of the timer RAM 45, and an address of the timer RAM 45 is configured with channel information (refer to "d-16" in FIG. 19) shown by these 5 bits. A count value held in the timer RAM 45 is counted up by the generating process unit 43 to be updated.

The process determining unit 41 determines a process to be performed on a received LB cell. The process determining unit 41 synthetically determines a process to be performed on a received cell. In other words, the process determining unit 41 determines which process should be performed on an LB cell received from the donwstream side on the basis of entry information received from the cell identifying unit 31 and a result of checking received from the receive confirmation processing unit 42.

In the case where a received cell has been generated in an opposite ATM processing apparatus 4, for example, the process determining unit 41 outputs a discard request (LB receive processing result) to the cell inserting/discarding unit 39 when receiving a result of checking meaning that the cell should be looped back from this station from the receive confirmation processing unit 42, while outputting insert cell (LB cell to be looped back) information to the UpS cell inserting unit 80.

When receiving a result of checking (judgement NG) signifying that the received LB cell does not correspond to a cell to be looped back from this station, the process determining unit 41 transmits a cancel signal (loopback cancel request) to the UpS cell inserting unit 80.

In the case where the received cell has been generated in this station, the process determining unit 41 outputs a discard request (LB reception processing result) to the cell inserting/discarding unit 39 when receiving a result of checking (judgement OK) signifying that the received cell corresponds to an LB cell having been generated in this station from the receive confirmation processing unit 42, and transmits a cancel signal (loopback cancel request) to the UpS cell inserting unit 80.

When the process determining unit 41 synthetically makes a determination on a received LB cell, the process determining unit 41 outputs data of the received cell, STS channel #i information, and a check request to the receive confirmation processing unit 42. In the LB processing unit 40, determination, confirmation or the like is done in a parallel processing by 16 bits. For example, an LB cell (ATM cell) that has been formatted in a form processable in parallel by 16 bits is received from the UTOPIA 10 on the downstream side.

Data of the received LB cell comprises payload (Correlation Tag, Location Indication, Source ID, Function Type, OAM cell type, etc.) along with header information (GFC, VPI, VCI, PTI, CLIP, HEC). Here, "Loopback Indication" comprises information showing a loopback request, for example. According to this information, the determining process performed in the receive confirmation processing unit 42 is varied. "Source ID" is used as information on a station in which the ATM processing apparatus 4 is installed. Here, in "Loopback Indication", there is held information of "0" or "1", where "1" signifies a loopback request, whereas "0" signifies that the cell has been looped back from another ATM processing apparatus 4.

The receive confirmation processing unit 42 checks reception of an LB cell, interfaces with the microcomputer 95 and the DP-RAM 44, or the like. The receive confirmation processing unit 42 reads data stored in a region designated by an address shown in FIG. 42 from the DP-RAM 44 on the basis of received cell data, an STS channel #i number and a check request received from the process determining unit 41, an LB address [LB channel (unique number); refer to "d-16" in FIG. 19] and a VPI/VCI received from the cell identifying unit 31, and confirms coincidence with payload of the received cell and confirms whether the received cell should be handled by this station or not.

When Loopback Indication information of the received cell is "0", for example, the receive confirmation processing unit 42 confirms whether "Correlation Tag" and "Source ID" of the received cell coincide with those held in the DP-RAM 44 or not. When they coincide, the receive confirmation processing unit 42 notifies of check OK (judgement OK) the process determining unit 41. When they do not coincide, the receive confirmation processing unit 42 notifies of check NG (judgement NG) the process determining unit 41. When the Loopback Indication information of the received LB cell is "1", the receive confirmation processing unit 42 confirms coincidence of "Location ID". When the "Location ID" coincides, the receive confirmation processing unit 42 notifies of check OK (judgement OK) to direct the process determining unit 41 to loop back the cell. When they do not coincide, the receive confirmation processing unit 42 notifies of check NG (judgement NG) the process determining unit 41. Incidentally, the receive confirmation processing unit 42 receives "Source ID" held in the microcomputer I/F unit 92 to confirm coincidence of "Source IDs".

Namely, the above process determining unit 41 and the receive confirmation processing unit 42 function as a confirming process unit which, when receiving an LB cell from another ATM processing apparatus 4, confirms which the received LB cell is looped-back data that has been looped back from another ATM processing apparatus 4 and received, or an LB cell that has been generated in another ATM processing apparatus 4 and is required to be looped back. The process determining unit 41 and the receive confirming process unit 42 also function as a loopback processing unit which executes a looping back process to loop back a received LB cell to another ATM processing apparatus 4 when the received LB cell is confirmed to be a loopback LB cell.

The receive confirming processing unit (interface unit, notifying process unit) 42 receives rewrite information for the setting data stored in the DP-RAM 44 from the microcomputer 95 via the microcomputer I/F unit 92, transmits the setting data read out from the DP-RAM 44 to the microcomputer 95 via the microcomputer I/F unit 92, generates an access cycle to the timer RAM 45, and holds transition information on an internal CODE held in the DP-RAM 44.

To this end, the receive confirming process unit 42 comprises a microcomputer transfer I/F unit 42-1, and a RAM accessing unit 42-2 not shown in FIG. 40 (refer to FIG. 45) When the microcomputer transfer I/F unit (interface unit) 42-1 receives a transfer request to write or read the setting data from the microcomputer I/F unit 92, the microcomputer transfer I/F unit 42-1 transmits write information to the generating process unit 43, or transmits read information to the microcomputer I/F unit 92.

The microcomputer transfer I/F unit 42-1 generates an address used when setting data sent from the microcomputer 95 via the microcomputer I/F unit 92 is written in the DP-RAM 44 or an address used when setting data is read out from the DP-RAM 44 according to a read request from the microcomputer 95. To this end, the microcomputer transfer I/F unit 42-1 comprises a counter 42-1a shown in FIG. 17.

The counter 42-1a generates lower 4 bits of an address (refer to FIG. 42) of the DP-RAM 44. The counter 42-1a starts a counting process when receiving an "HA" bit and "W" or "R" to generates an address (lower 4 bits) used to specify a position in which setting items (refer to counts 0 to 15 of the setting items in FIG. 41) necessary when one setting datum is stored or a position from which the setting items are read out.

Accordingly, the microcomputer transfer I/F unit 42-1 outputs an "STS-3c. NO (STS channel #i information) and an "internal RAM address" (refer to FIG. 18) set by the microcomputer 95 together with 4 bits (a count value of the counter 42-2a) to the accessing process unit 43-1 (to be described later) when setting data is written in the DP-RAM 44 or read out from the DP-RAM 44. Incidentally, an address outputted from the microcomputer transfer I/F unit 42-1 is for each setting item in order to write one setting datum in the DP-RAM 44 or read out one setting datum from the DP-RAM 44.

The RAM accessing unit 42-2 periodically generates an access timing to the timer RAM 45, and transmits a count value updated or a re-try number with a time elapsed and an internal code updated with a transition of the internal processing state to the generating process unit 43. The RAM accessing unit 42-2 receives a timer value or a re-try number read out from the timer RAM 45 by the generating process unit 43, and outputs information (updated information) on a count value or a re-try number updated to the generating process unit 43 on the basis of the read information. The RAM accessing unit 42-2 also transmits information about an internal CODE "transmit wait" when a count value read out from the generating process unit 43 reaches a maximum value, further transmits information about an internal CODE "judgement NG" when a re-try number reaches a maximum re-try number set by the microcomputer 95.

Next, when the generating process unit (continuity testing data generating process unit) 43 shown in FIG. 40 receives an LB execution request from the microcomputer 95, the generating process unit 43 generates an LB cell on the basis of data for generating an LB cell in the DP-RAM 44, and sends the LB cell to another ATM processing apparatus 4. The generating process unit 43 rewrites data held in the DP-RAM 44 or the timer RAM 45.

Figure 45:
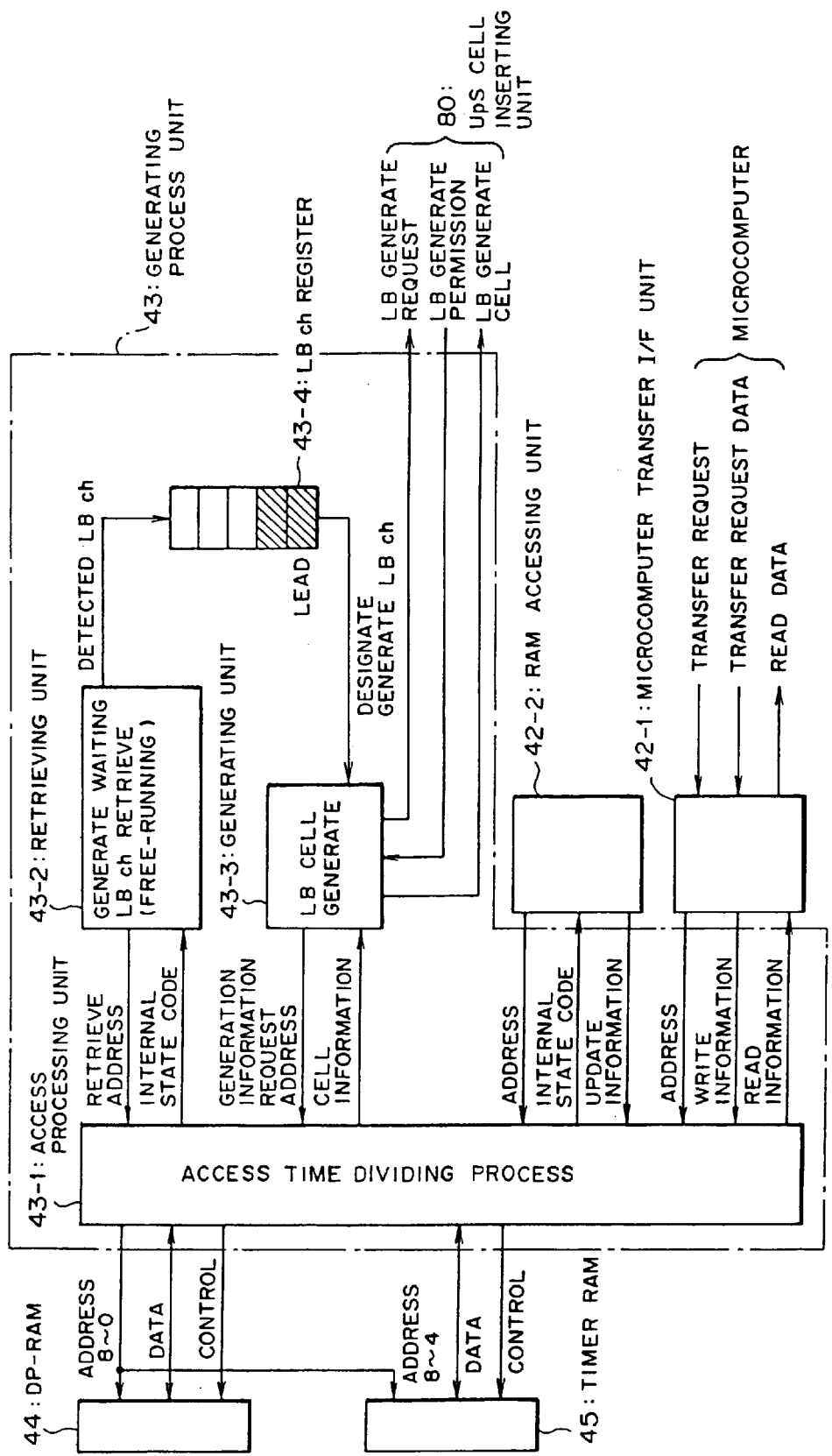
FIG. 45 is a block diagram showing a generating process unit according to the embodiment of this invention.

To this end, the generating process unit 43 comprises, as shown in FIG. 45, an accessing process unit 43-1, a retrieving unit 43-2, a generating unit 43-3 and an LB channel register 43-4.

The retrieving unit (generation waiting identification information retrieving unit) 43-2 periodically monitors internal CODEs (refer to FIG. 41 and Table 5) stored in the DP-RAM 44. When detecting that an internal OCDE read out from the DP-RAM 44 via the accessing process unit 43-1 is "transmit wait (011)", the retrieving unit 43-2 outputs channel information on a channel (unique number set by the microcomputer 95; refer to "d-16" in FIG. 19) in a waiting state to transmit the LB cell to the LB channel register 43-4.

The LB channel register (transmission route identification information holding unit) 43-4 holds channel information on a channel in a waiting state ("transmit wait") to wait for generation of an LB cell retrieved by the retrieving unit 43-2, while holding channel information on a plurality of channels and outputting the channel information to the generating unit 43-3 in the order in which the channels have been received from the retrieving unit 43-2.

Figure 44:
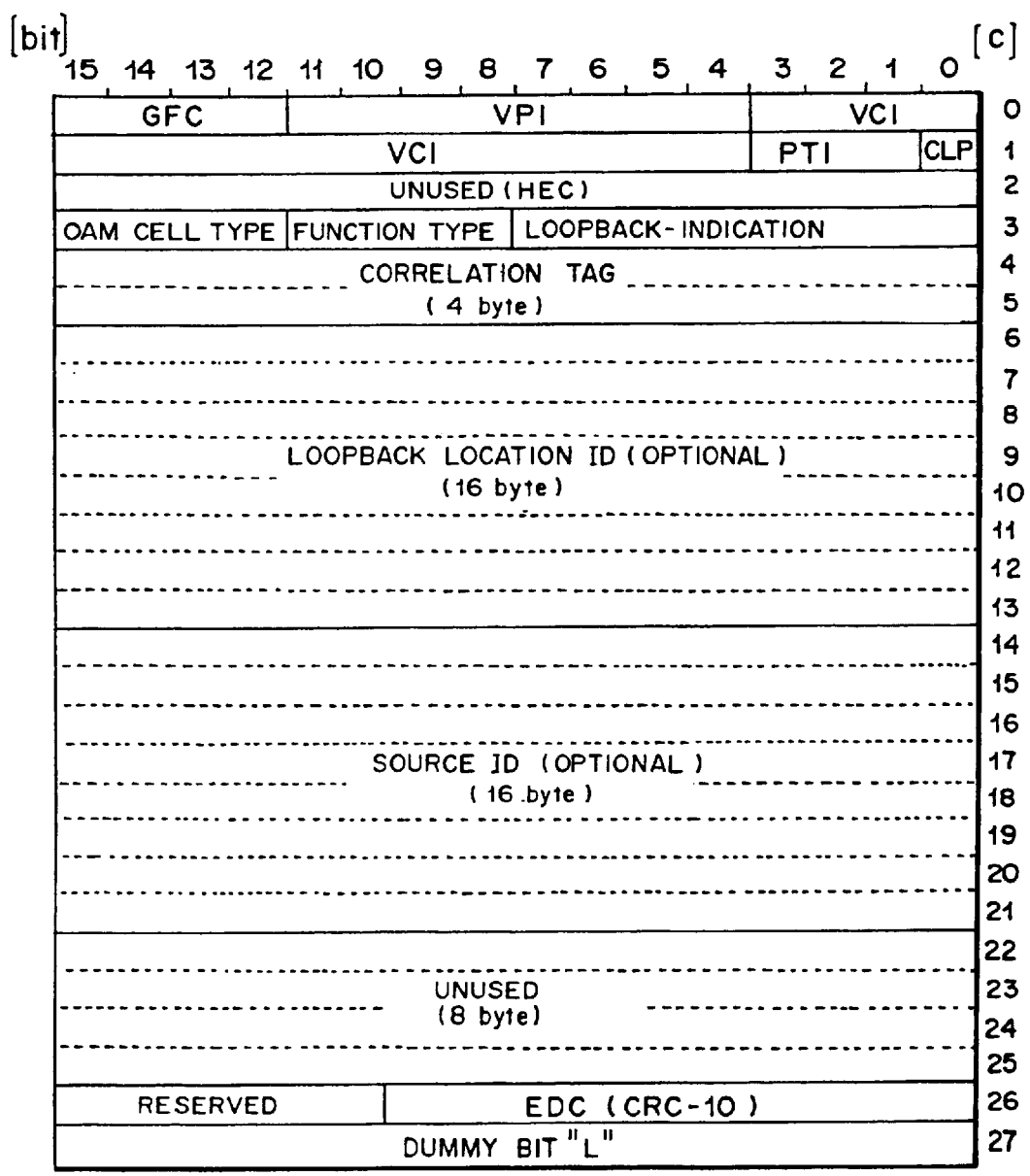
FIG. 44 is a diagram showing an example of a format of an LB cell according to the embodiment of this invention.

The generating unit 43-3 generates an LB cell corresponding to the channel information received from the LB channel register 43-4. When generating the LB cell, the generating unit 43-4 receives information read out from the DP-RAM 44 through the accessing process unit 43-1. The generating unit 43-3 generates an LB cell as shown in FIG. 44 using information for LB cell set from the microcomputer 95 in addition to the information read out from the DP-RAM 44. To "OAM Cell type" and "Function Type" in FIG. 44, a fixed value showing the LB processing is added. To "Source ID", which is a unique number of a station in which the ATM processing apparatus 4 is installed received from the microcomputer I/F unit 92, added is, for example, information "1" (Loopback Indication) showing a loopback request.

The generated LB cell information is outputted to the UpS cell inserting unit 80 with reception of a response signal indicating a permission (LB cell insert permission) in response to a generate request (LB cell generation request) from the UpS cell inserting unit 80 as an opportunity.

The accessing process unit 43-1 reads data held in the DP-RAM 44 or the timer RAM 45, or writes data in the RAM 44 or 45. A timing to read or write is as shown in FIG. 43.

In a process of searching generation of an LB cell, the accessing process unit 43-1 reads an internal CODE of a desired channel stored in the DP-RAM 44 on the basis of a designated retrieve address (channel, refer to "d-16" in FIG. 19), and outputs the internal CODE to the retrieving unit 43-2.

In a process of generating an LB cell, the accessing process unit 43-1 reads information for generating a desired LB cell from the DP-RAM 44 on the basis of a generation information request address (channel of a generated LB cell), and outputs the information to the generating unit 43-3.

In a process of confirming a predetermined time after the LB cell is sent, the accessing process unit 43-1 read a count value or a re-try number of a desired channel stored in the timer RAM 45 on the basis of a designated address (channel), and outputs the count value or the re-try number to the RAM accessing unit 42-2, while writing an updated count value or an updated re-try number in the timer RAM 45. The accessing process unit 43-1 writes an updated internal code "transmit wait" received from the RAM accessing unit 42-2 in the DP-RAM 44 when the count value reaches a maximum value and the LB cell is re-sent, or writes an updated internal code "judgement NG" received from the RAM accessing unit 42-2 in the DP-RAM 44 when the re-try number reaches a maximum value.

The accessing process unit 43-1 does writing and reading of the setting data with a transfer request from the microcomputer 95 at timings as shown in FIG. 43.

The counter unit 47 shown in FIG. 40 generates 156 ms pulses and various timer values. The initializing unit 48 initializes the RAMs 44 and 45 when the LB processing unit 40 is actuated.

According to the LB processing unit 40 with the above structure of this embodiment, the process determining unit 41 determines a process on a cell on the basis of entry information received from the cell identifying unit 31 and a result of checking received from the receive confirming process unit 42 when receiving an LB cell via the UTOPIA 10 on the downstream side. In concrete, the process determining unit 41 determines whether a loopback request is outputted to the UpS cell inserting unit 80 or not.

For instance, in the case where a received LB cell has been generated in another ATM processing apparatus 4, the process determining unit 41 outputs a discard request (result of the LB receiving process) to the cell inserting/discarding unit 39 when receiving a result of checking (judgement OK) signifying that the LB cell should be looped back by this station from the receive confirming process unit 42. When receiving a result of checking (judgement NG) signifying that the received LB cell does not correspond to a cell to be looped back by this station, the process determining unit 41 outputs a loopback cancel request (cancel signal) to the UpS cell inserting unit 80.

In the case where the received LB cell has been generated in this station, the process determining unit 41 outputs a discard request (a result of the receive processing) to the cell inserting/discarding unit 39 when receiving a result of checking (judgement OK) signifying that the received LB cell corresponds to an LB cell having been generated in this station, while outputting a loopback cancel request (cancel signal) to the UpS cell inserting unit 80.

The process determining unit 41 outputs data of a received cell, STS channel #i information and a check request to the receive confirming process unit 42, when performing a synthetic determination on an received LB cell.

The receive confirming process unit 42 reads information necessary for checking from the DP-RAM 44 on the basis of a check request and received LB cell information (STS channel #i number, VPI/VCI) from the process determining unit 41, and an LB address [LB channel (unique number; refer to "d-16" in FIG. 19) received from the cell identifying unit 31, and confirms coincidence of payload of the received LB cell and confirms whether the received cell should be handed by this station or not on the basis of the read data.

For instance, when Loopback Indication information (refer to Loopback Indication in FIG. 44) of the received LB cell is "0", the receive confirming process unit 42 confirms whether a cell generation time (Time Stamp) and Source ID of the received cell coincide with those in the Correlation Tag held in the DP-RAM 44 or not. When they coincide, the receive confirming process unit 42 notifies of check OK (judgement OK) the process determining unit 41, whereas notifies of check NG (judgement NG) the process determining unit 41 when they do not coincide.

When the Loopback Indication information of the received cell is "1", the receive confirming process unit 42 confirms coincidence of Location IDs. When they coincide, the receive confirming process unit 42 notifies of check OK (judgement OK) signifying that the received LB cell should be looped back the process determining unit 41. When they do not coincide, the receive confirming process unit 42 notifies of check NG (judgement NG) the process determining unit 41.

The microcomputer transfer I/F unit 42-1 in the receive confirming process unit 42 exchanges data with the microcomputer 95. When there is a write request to the DP-RAM 44, the microcomputer transfer I/F unit 42-1 outputs write information received from the microcomputer 95 to the access processing unit 43-1 in the generating process unit 43. When there is a request to read information stored in the DP-RAM 44 from the microcomputer 95, the microcomputer I/F unit 42-1 notifies of the setting data received from the access processing unit 43-1 the microcomputer 95.

The RAM accessing unit 42-2 in the receive confirming process unit 42 generates access timings to the timer RAM 45, and outputs a count value held in the timer RAM 45 or update information on an internal CODE held in the DP-RAM 44 to the access processing unit 43-1 on the basis of information received from the access processing unit 43-1.

In the generating process unit 43, when the retrieving unit 43-2 detects a channel (unique number) waiting for LB generation from the internal CODEs held in the DP-RAM 44, the retrieving unit 43-2 outputs the detected channel to the LB channel register 43-4. The generating unit 43-3 receiving an LB channel on the cell to be generated outputted from the register 43-1 generates an LB cell on the basis of cell information read out via the access processing unit 43-1, and sends the generated LB cell to the UpS cell inserting unit 80, when receiving an insertion permit signal.

The access processing unit 43-1 rewrites the internal CODE held in a predetermined DP-RAM 44 holding channel information on the sent LB cell, and counts up the count value stored in the timer RAM 45 at a predetermined timing.

After that, when the count value reaches a maximum value, the access processing unit 43-1 clears the timer value of the timer RAM 45 in response to information from the RAM access unit 42-2, writes a re-try number counted up in the timer RAM 45, and rewrites data of the internal CODE held in the DP-RAM 44 to "transmit wait". When the re-try number reaches the maximum value, the RAM accessing unit 42-2 rewrites the internal CODE held in the DP-RAM 44 to "NG".

Write information to the DP-RAM 44 received from the microcomputer transfer I/F unit 42-1 in the receive confirming process unit 42 is written in a predetermined region on the DP-RAM 44 at a predetermined timing under a control of the access processing unit 43-1. Setting data in response to a read request from the microcomputer 95 is read out from the DP-RAM 44 via the access processing unit 43-1, and outputted to the microcomputer transfer I/F unit 42-1.

When the microcomputer 95 generates a request to execute the LB processing to confirm a continuity state of the ATM communication, the LB processing unit 40 according to this embodiment generates an LB cell in response to the LB execution request from the microcomputer 95, exchanges the generated LB cell with another ATM processing apparatus 4 to execute the LB processing, and notifies a result of the LB process the microcomputer 95. It is therefore possible to readily execute the LB test using an ATM cell in the ATM network, and appropriately execute the LB test to confirm a connection between the stations while continuing the operation of the network.

Further, each of the DP-RAMs 44 holds the setting data for each STS channel #i, and an access to each of the DP-RAMs 44 is had by identifying an STS channel #i so that a process such as a judgement on loopback is performed readily.

Reading or writing is done using ports in two systems of the DP-RAM 44 so that it is possible to prevent the access processing from being performed at the same time, and to perform quickly the LB generating process and the confirming process, which leads to a simplified process sequence.

States of the LB process are coded, thereby performing the LB process on a plurality of channels at the same time. Therefore, it is unnecessary to separately prepare a state indicate signal, which leads to a simplified structure of the apparatus and a decrease of power consumption.

When a timer value held in the timer RAM 45 indicates that a predetermined time has elapsed, an internal CODE of a corresponding channel is rewritten to "transmit wait", after that, an LB cell is re-transmitted. It is thereby possible to prevent isolation of the apparatus since the apparatus does not receive a loopback cell from the opposite ATM processing apparatus 4.

The RAM accessing unit 42-2 monitors a re-try number held in the timer RAM 45, rewrites a corresponding internal CODE to "NG" when the re-try number reaches a maximum value, and notifies of information of this the microcomputer 95. It is thereby possible to prevent isolation of the apparatus since the apparatus does not receive a loopback LB cell from the opposite ATM apparatus 4.

Addresses of the DP-RAM 44 and the timer RAM 45 are configured on the basis of the same unique number (channel) so that not only a process of reading the setting data or a count value is performed readily, but also mismatching of an execute channel and a monitoring timer is prevented.

In the generating process unit 43, the retrieving unit 43-2 detects an internal CODE indicating "transmit wait" of an LB cell, and the LB channel register 43-4 holds the detected LB channel, whereas the generating unit 43-3 generates an LB cell on the basis of the LB channel outputted from the LB channel register 43-4, whereby detection and generation of an LB cell is performed in two systems. It is therefore possible to improve an execute time of the LB processing which enables a continuous generating process, and efficiently use a cell flow.

(4) Description of a Scheme of an Operation in the Inside and Outside of the ATM Processing Apparatus Hereinafter, description will be made of a scheme of an operation in the inside and outside of the ATM processing apparatus 4. Incidentally, like reference characters used in above (1) through (3) designate parts having similar functions.

In the ATM processing apparatus 4 according to this embodiment, the UTPIA 10 on the downstream side receives an ATM cell from a UTOPIA 20-1 in the mapping/demapping unit 3, which is determined as an object of reception by exchanging a signal such as Clav or the like between the UTOPIA 10 and the UTOPIA 20-1, transfers the ATM cell to a process reference timing in the ATM processing apparatus 4, and sends the ATM cell to the cell processing unit 30.

The ATM cell sent to the cell processing unit 30 is identifies as to what contents the ATM cell has, and discarded according to circumstances or inserted ATM cell in a position of a cell having been discarded.

The ATM cell outputted from the cell processing unit 30 is transmitted to the UTOPIA 20 on the upstream side, and outputted to a UTOPIA 10-1 which is a desired destination determined by exchanging Clav or the like between the UTOPIA 20 and the UTOPIA 10-1 in the mapping/demapping unit 2.

On the upstream side, the UpS cell inserting unit 80 monitors a cell flow in the upstream, and switches the normal cell flow to a cell flow of AIS cell when detecting disconnection of the cell flow.

The UpS cell inserting unit 80 generates an AIS cell flow while satisfying a minimum cell interval when detecting the input disconnection, repeatedly makes a VP mode check and an entry check on each VPI/VCI when generating an AIS cell during detection of input disconnection, and operates so as to output a request to generates a corresponding AIS cell when the conditions are satisfied.

After the normal cell flow is switched to the cell flow of AIS cell when disconnection of the cell flow in the upstream is detected, the cell inserting process is performed on the switched cell flow.

Namely, an LB cell (loopback cell) received from the opposite ATM processing apparatus 4, VP-RDI or VC-RDI from the cell processing unit 30, an LB cell from the LB processing unit 40, or a PM cell from the PM processing unit 50 is inserted in a vacant position in the switched AIS cell flow.

Cells are inserted in the cell flow in the upstream in the order in which cell generate requests have arrived from the intervening circuit unit 80-2c in the UpS cell inserting unit 80 shown in FIG. 7 at the intervening circuit unit 80-2c. When the cell generate requests arrive simultaneously at the intervening circuit unit 80-2c, the inserting process is performed in the order of priority as shown in Table 1 above.

Since a cell to be looped back (LB cell from the opposite ATM processing apparatus 4) from the FIFO unit 80-2f (refer to FIG. 7) is inserted most preferentially, the cell inserting process from the cell processing unit 30, the LB processing unit 40 or the PM processing unit 50 is performed while no cell to be sent is prepared in the FIFO unit 80-2f.

The above cell inserting process from the cell processing unit 30, the LB processing unit 40 or the PM processing unit 50 is performed in such a manner that a management CODE for each type of generation managed for each STS channel #i in the memory 80-2v is retrieved, a management CODE having the highest priority is selected among the management CODEs held in the lead of the management CODEs held for respective STS channel #i, and the cell inserting process is performed (refer to FIG. 9). The UpS cell inserting unit 80 stops the inserting process when receiving an insertion inhibit signal from the UTOPIA 20 on the upstream side until the insertion inhibit signal is cancelled.

In the ATM processing apparatus 4 shown in FIG. 2, there are a plurality of access requests to the entry RAM 94 caused by an entry check (on whether an entry is set by the microcomputer 95 or not), from the process of generating an ALM cell on the downstream side, the process of confirming a loopback LB cell, the process of generating an ALM cell on the upstream side, the process of updating entry information from the microcomputer 95, etc. The RAM access intervening unit 91 intervenes access timings for these accesses according to priority shown in Table 2 above, for example. As shown in FIG. 16, for example, an access is had to the entry RAM 94 at an access timing obtained by dividing a reference cycle (one cycle of 28 clocks) of the ATM processing apparatus 4 by 7. A timing at which an access is available is assigned to each access request as shown in Table 2 above. An access to the entry RAM 94 for entry check on a received cell, for example, is determined to be at an access timing A.

Rewriting of information (refer to FIG. 19) held in the entry RAM 94 from the microcomputer 95, rewriting of the setting information (refer to FIG. 41) held in the DP-RAM 44 in the LP processing unit 40 or the like is done via the microcomputer I/F unit 92. The microcomputer I/F unit 92 corrects an error if detecting an error in E/S when receiving the setting data for LB processing received from the microcomputer 95. In concrete, when E/S is in error, the microcomputer I/F unit 92 rewrites a VCI value to a predetermined value and transmits the value to the LB processing unit 40.

A process of rewriting to and reading from the DP-RAM 44 in the LB processing unit 40 is done on the basis of an access timing to the microcomputer register 92-1 as shown in FIG. 20. When HA bit (transfer trigger) is "H", the microcomputer 95 cannot rewrite data held in the bit map (refer to FIG. 18) of the microcomputer register 92-1. When HA bit is "L", the microcomputer 95 sets a writing, after that, when HA bit becomes "H", the rewritten information is transferred to the microcomputer transfer I/F unit 42-1 (refer to FIG. 45) in the LB processing unit 40. A control to read is set by the microcomputer 95 when HA bit is "L". When HA bit is "L", the microcomputer 95 reads the setting information held in the DP-RAM 44 transmitted from the microcomputer transfer I/F unit 42-1 in the LB processing unit 40 while HA bit is "H".

Figure 46:
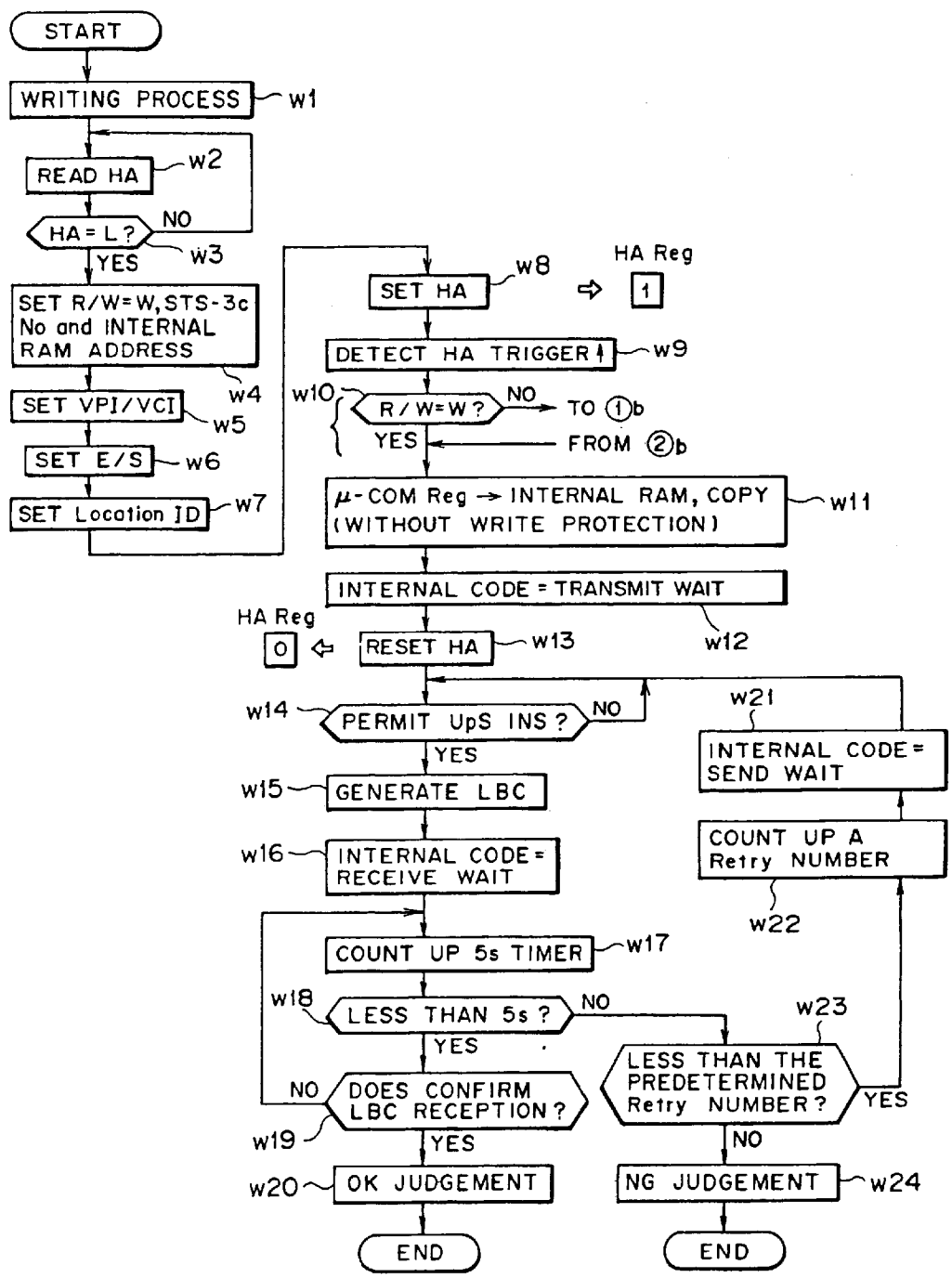
FIG. 46 is a flowchart for illustrating a process performed between the microcomputer and the LB processing unit when a setting of an LB processing (writing) is done from the microcomputer.
Figure 47:
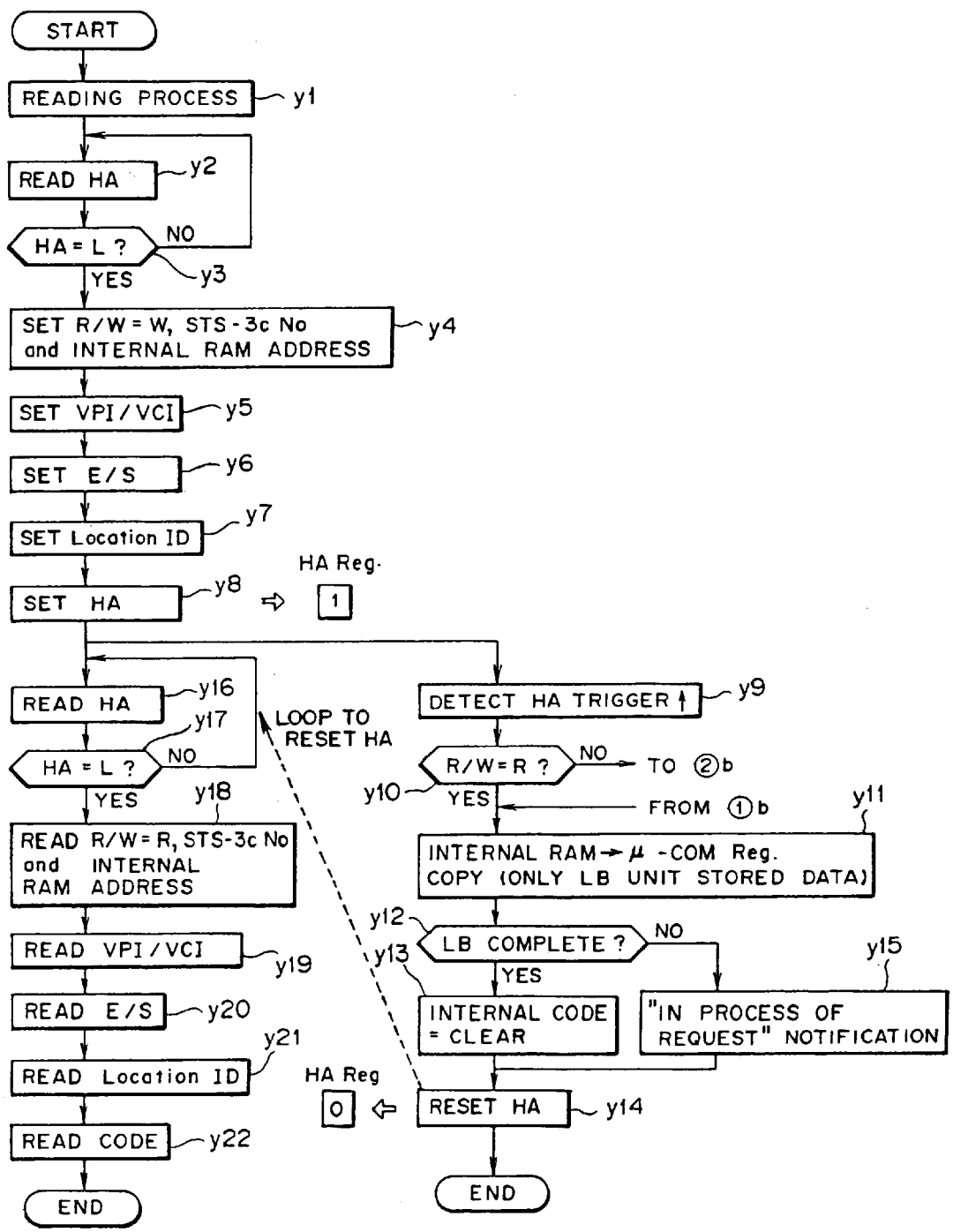
FIG. 47 is a flowchart for illustrating a process performed between the microcomputer and the LB processing when a setting of an LB processing (reading) is done from the microcomputer.
Figure 48:
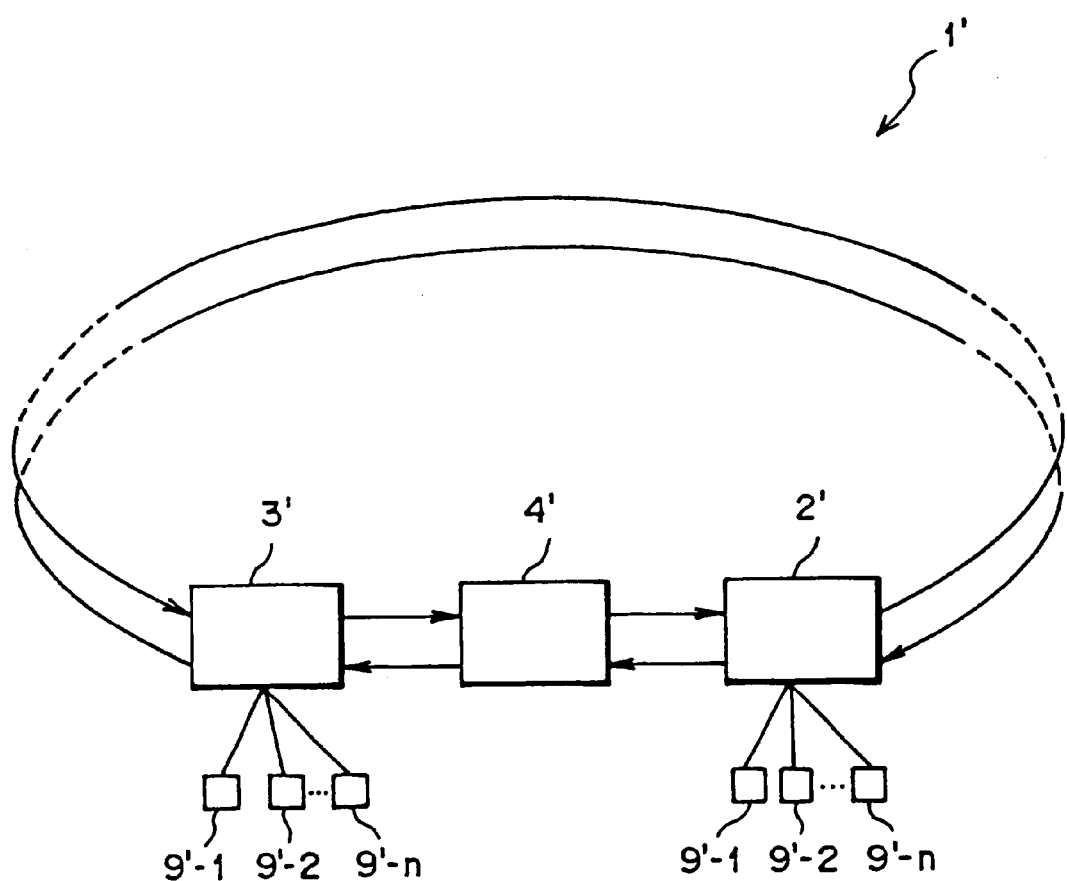
FIG. 48 is a block diagram showing a ring network 1' configuring an SDH transmission network.
Figure 49:
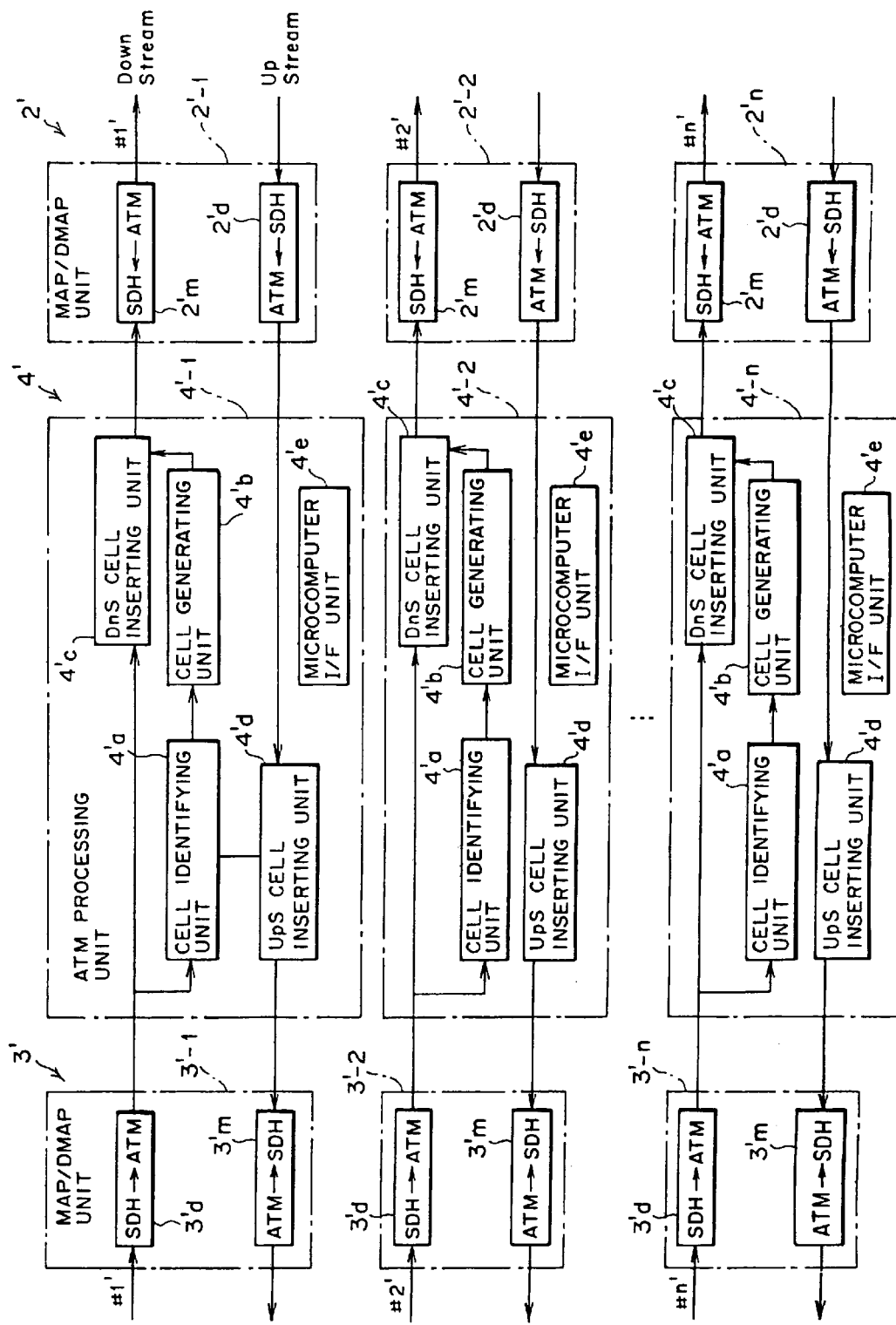
FIG. 49 is a block diagram showing an SDH transmitting apparatus and an ATM processing apparatus.

FIGS. 46 and 47 are flowcharts for illustrating the writing process and the reading process to the LB processing unit 40 by the microcomputer 95, descriptions of which will be made in the case of a setting of LB generation. As shown in FIGS. 46 and 47, the microcomputer 95 sets the writing process (Step w1), and reads HA bit (Step w2) to determine whether the HA bit is "L" or not (Step w3). Until "L" of the HA bit is detected (until judged YES at Step w3), the microcomputer 95 continues to read the HA bit (from NO route at Step w3 to Step w2).

When detecting "L" of the HA bit, the microcomputer 95 sets "W", "STS-3c. NO", "internal RAM address (refer to "d-16" in FIG. 19), "VPI/VCI", "E/S", "Location ID" and "HA", with the write setting on the bit map (refer to FIG. 18) of the microcomputer register 92-1 (Steps w4 through w8).

When the LB processing unit 40 detects "H" (HA trigger) of the HA bit (step w9), the LB processing unit 40 determines either the write setting "W" or the read setting "R" (step w10). In the case of the write setting "W", the LB processing unit 40 reads data held in the bit map of the microcomputer register 92-1 through the microcomputer I/F unit 92, and writes the data in the DP-RAM 44 (from YES route at Step w10 to Step w11). The LB processing unit 40 then rewrites the internal CODE to "transmit wait" (refer to Table 5 above and FIG. 41) (Step w12), and rewrites the HA bit to "L" (Step w13).

Since the internal CODE is "transmit wait", the LB processing unit 40 outputs a generate request to the UpS cell inserting unit 80, determines whether a generate permission is received or not (Step w14), generates an LB cell after receiving the generate permission and outputs the LB cell (from YES route at Step W14 to Step w15), and updates the internal CODE to "receive wait" (Step w16) The LB processing unit 40 waits until receiving a generate permission from the UpS cell inserting unit 80 (until judged YES at Step w14).

After sending the LB cell, the LB processing unit 40 updates a timer value of the timer RAM 45 (Step w17), determines whether 5 seconds have been elapsed or not (whether the timer value reaches a maximum count value or not) (step w18), determines whether an LB cell is received or not if 5 seconds has not elapsed (from YES route at Step w18 to Step w19), updates the timer value when not receiving the LB cell (from NO route at Step w19 to Step w17), and updates the internal CODE to "OK judgement" when confirming the reception (from YES route at Step w19 to Step w20).

When 5 second has elapsed, the LB processing unit 40 determines whether a re-try number reaches a maximum value or not (from NO route at Step w18 to Step w23). When the re-try number reaches the maximum value, the LB processing unit 40 updates the internal code to "NG judgement" (from NO route at Step w23 to Step w24). When the re-try number does not reach the maximum value, the LB processing unit 40 updates the re-try number and the internal code to "transmit wait" (from YES route at Step w23 to Steps W22 and 21), outputs a generate request to the UpS cell inserting unit 80, and waits until receiving a permission (until judged YES at Step w14).

On the other hand, the microcomputer 95, as shown in FIG. 47, sets the reading process (Step y1) reads HA bit (Step y2), and determines whether the HA bit is "L" or not (Step y3). The microcomputer 95 continuously reads the HA bit (from NO route at Step y3 to Step y2) until detecting "L" of the HA bit (until judged YES at Step y3).

When detecting "L" of the HA bit, the microcomputer 95 sets "R", "STS-3c. NO", "Internal RAM address" (refer to "d-16" in FIG. 19), "VPI/VCI", "E/S", "Location ID", and "HA", with the read setting on the bit map (refer to FIG. 18) of the microcomputer register 92-1 (Steps y4 through y8).

When detecting "H" (HA trigger) of the HA bit (Step y9), the LB processing unit 40 determines either the write setting "W" or the read setting "R" (Step y10). In the case of the read setting "R", the LB processing unit 40 reads setting data designated by "STS-3c. NO", "internal RAM address" and the like from the DP-RAM 44, transfers the data to the microcomputer register 92-1 of the microcomputer I/F unit 92 (from YES route at Step y10 to Step y11), and determines whether the LB processing is completed or not (Step y12). When the LB processing is completed, the LB processing unit 40 clears the internal CODE (refer to Table 5 above and FIG. 41) (from YES route at Step y12 to Step y13). When the LB processing is not completed, the LB processing unit 40 notifies of an internal CODE "in process of request" the microcomputer 95 (from NO route at Step y1 to Step y15). The LB processing unit 40 then updates the HA bit to "L" (Step y14).

On the other hand, after the read setting (Steps y1 through y8), the microcomputer 95 reads the HA bit (Step y16) to determine whether the HA bit is "L" or not (Step y17). The microcomputer 95 repeatedly reads the HA bit until detecting "L" of the HA bit (until judged YES at Step y17). When detecting "L" of the HA bit, the microcomputer 95 reads data, that is, "R", "STS-3c. NO", "internal RAM address" (refer to "d-16" in FIG. 19), "VPI/VCI", "E/S", "Location ID" and "internal CODE", sent from the LB processing unit 40 held on the bit map (refer to FIG. 18) of the microcomputer register 92-1 (Steps y18 through y22), and terminates the reading process.

The Ups cell inserting unit 80 intervenes when cell generate requests from the cell to be looped back, the cell processing unit 30, the PM processing unit 50 and the LB processing unit 40 are generated at the same time, and outputs the cells in the order of priority to the UTOPIA 20 on the upstream side.

The ATM processing apparatus 4 of this invention has the entry RAM 94 collectively holding a large volume of information for identifying a received cell and the cell processing unit 30 for collectively managing faults for a plurality of ATM cells, whereby the ATM apparatus 4 is configured simply.

The ATM processing apparatus 4 can exchange an LB cell with another ATM processing apparatus 4 according to an instruction of the microcomputer 95, so that a continuity test is made on the network having a high transmission rate.

The continuity test can be made on a plurality of STS channels #i with one ATM processing apparatus 4 so that the apparatus can be in a simplified configuration. It is also possible to conduct operation and management on a complex system suitable to a high-speed communication or a variable bit rate communication.

Cells in the upstream and in the downstream are transferred to a reference timing of the ATM processing unit 4-1 at the UTOPIA 10 so as to be synchronized. It is therefore possible to readily identify or process cells within the ATM processing apparatus 4.

The cell processing unit 30 performs the process on cells commonly to a plurality of STS channels #i received from the UTOPIA 10, so that a structure of the apparatus is simplified.

Entry information and VP termination information are collectively held in the RAM so that the structure of the apparatus is simplified. Moreover, the entry information is collectively held for each STS channel #i, which enables a simplified structure of the apparatus.

The RAM access intervening unit 91 intervenes a plurality of accesses to the entry RAM 94 in consideration of priority and access timings shown in Table 2, so that the process is performed smoothly.

The apparatus separately has the entry RAM 94 holding a large volume of information for identify a cell and the LB processing unit 40 for performing the LB processing, which leads to a simplified structure of the apparatus.

The LB processing unit 40 processes looping-back of an LB cell or a generated LB cell via the UTOPIA 20 commonly to a plurality of channels [32 channels (unique numbers); refer to FIG. 19] in each STS channel #i received via the UTOPIA 10, so that the structure of the apparatus is simplified.

As shown in FIG. 20, write information from the microcomputer 95 is transferred to the LB processing unit 40 with "H" of the HA bit as an opportunity. Since while the information is transferred, an access by the microcomputer 95 is inhibited, an bit error in the setting data or an error in the setting can be avoided so that the process is performed smoothly.

"R" or "W" is set in the microcomputer register 92-1 on the basis of "L" of the HA bit, thereby preventing a bit error in the data, and suppressing an erroneous operation at the time of reading and writing.

Further, it is possible to arbitrarily set a re-try number according to the setting from the microcomputer 95, so that accuracy of the LB processing is selectively optimized.

The microcomputer register 92-1 holding write information from the microcomputer 95 or information read out from the LB processing unit 40 is provided commonly to VPI/VCI, so that a structure of the apparatus is simplified.

Even when a value of E/S bits set by the microcomputer 95 is inappropriate, a cell in which VCI and PTI are matched can be generated, which leads to an efficient use of a cell flow.

Since the UpS cell inserting unit 80 monitors a cell flow in the upstream, and generates and outputs an AIS cell when the cell flow is disconnected, the process to comply with occurrence of abnormality can be quickly performed.

The UpS cell inserting unit 80 switches a normal cell flow to a cell flow of AIS cell when detecting input disconnection, and inserts a cell in the switched cell flow, whereby the intervening circuit is simplified. This is effective to a decrease in size of the circuit, a decrease of burden of a layout work, and a decrease of a power consumption.

The RAM 80-2g holding a cell to be looped back to be inserted in a cell flow in the upstream is such configured as to hold only a part of data, as shown in FIG. 10, which leads to a simplified structure of the apparatus, a decrease of burden of a layout work, and a decrease of a power consumption.

When a cancel signal to cancel insertion of a cell in a cell flow in the upstream is received from the LB processing unit 40 or the like, the inserting process is halted, and cell information or the like held in the RAM 80-2g is overwritten to be canceled. Therefore, the apparatus does not additionally require an element to hold a cell until a final result of determination of identification is brought, so that the structure of the apparatus is simplified, and a power consumption is decreased.

The intervening circuit unit 80-2c (refer to FIG. 7) inserts a cell in a cell flow in the upstream in consideration of priority as shown in Table 1 above. It is thereby possible to spontaneously output a cell to be looped back requiring spontaneousness, and perform a smooth inserting process even when transmit requests arrive at the same time.

The UpS cell inserting unit 80 compares the leads in the insertion management codes for each STS channel #i, selects a code according to priority, after that, gives a higher priority to the next STS channel #i obtained by incrementing an STS channel #i that has been selected immediately before, thereby preventing a state where selection and insertion of a cell having a lower priority are delayed even though the cell arrived earlier. This improves an efficiency of cell insertion.

While an insertion inhibit signal is received from the UTOPIA 20 on the upstream side, the inserting process is halted so that a desired cell flow on the upstream is secured.

(5) Others

The above embodiments have been described by way of an example where the DP-RAMs 44 and the timer 45 are separately provided in the LB processing unit 40. However, it is possible to use a non-used region (region designated by "count 12", for example, in FIG. 41) in the DP-RAM 44 for a timer counter to simplify the structure of the apparatus.

When VCI corresponds to any one of "3", "4" or "6" in generating the above ALM cell, the AIS cell generating process is not performed since the VCI is limited to a specific use in the ATM communication. Similarly, in the case of a VCI value limited to a specific use in the ATM communication other than the above VCI value, the ATM cell generating process is not performed.

In the above embodiments, one ATM cell processing unit 4-1 is used for a plurality of STs channels #i. However, it is possible to configure the ATM processing apparatus (hereinafter, designated by a reference character "4a" in order to discriminate it from the ATM processing apparatus 4) with the ATM cell processing units 4-1 for respective STS channels #i.

Even in the ATM processing apparatus 4a, each of the ATM cell processing units 4-1 receives an ATM cell from the mapping/demapping unit 2-i or 3-i, and operates similarly to the above ATM cell processing unit 4-1. In this case, the UTOPIAs 10 and 20 in the ATM cell processing unit 4-1 do not need to exchange a control signal such as Clav or the like with the mapping/demapping unit 2-i or 3-i handling an STS channel #i other than the STS channel #i handled by the ATM processing unit 4-1.

The ATM processing apparatus 4a can readily perform the LB processing even in a transmission system having a high transmission rate, similarly to the above ATM processing apparatus 4.

As compared with the above ATM processing apparatus 4, the ATM processing apparatus (designated by a reference character "4b" in order to discriminate it from the ATM processing apparatus 4) may have a plurality of ATM processing unit 4-1.

Even the ATM processing apparatus 4b can readily perform the LB processing similarly to the above ATM processing apparatus 4, and execute operation and management of a complex system suitable for a high-speed communication or a variable bit rate communication.

Although each of the above ATM processing apparatus 4, 4a and 4b is interposed between the SDH transmitting apparatus 2 and 3. It is possible to dispose each of the ATM processing apparatus 4, 4a and 4b on another transmission route. For instance, the ATM processing apparatus 4 α can be disposed on a transmission route in a lower hierarchy of the SDH transmission apparatus 2 and 3. In which case, the ATM processing apparatus 4 α can readily perform the LB processing on an ATM cell with an increase of a communication capacity.

Note that the present invention is not limited to the above examples but may be modified in various ways without departing from a scope of the invention.

What is claimed is:

1. A fixed length data processing apparatus for processing fixed length data used for an asynchronous communication network, said fixed length data having transmission route identification information, said transmission route identification information being different depending upon a transmission route, said fixed length data processing apparatus comprising:

a registration information holding unit for commonly holding for a plurality of transmission routes registration information necessary to identify fixed length data that is an object of a processing corresponding to a transmission route; and a data processing unit for identifying whether or not received fixed length data is fixed length data that is an object of a processing on the basis of at least said registration information in said registration information holding unit, to perform a data processing for fault management correspondingly to said transmission route, which data processing includes a process of generating alarm data to be notified to another fixed length data processing apparatus and inserting said alarm data to a flow of fixed length data passing through toward said another fixed length data processing apparatus, in said asynchronous communication network on the basis of said fixed length data when identifying that said fixed length data is fixed length data that is an object of a processing.

2. The fixed length data processing apparatus according to claim 1, wherein said data processing unit performs said data processing according to a process timing in synchronization with a length of said fixed length data.

3. The fixed length data processing apparatus according to claim 1, wherein when a plurality of fixed length data are handled in a plurality of transmission apparatus, respectively, said data processing unit commonly performs said processing for said plurality of transmission apparatus on the basis of apparatus identification information unique to each transmission apparatus.

4. A fixed length data processing apparatus for processing fixed length data used for an asynchronous communication network, said fixed length data having transmission route identification information, said transmission route identification information being different depending upon a transmission route, said fixed length data processing apparatus comprising:

a registration information holding unit for commonly holding for a plurality of transmission routes registration information necessary to identify fixed length data that is an object of a processing corresponding to a transmission route; and a data processing unit for identifying whether received fixed length data is fixed length data that is an object of a processing or not on the basis of at least said registration information in said registration information holding unit, to perform a data processing for fault management correspondingly to said transmission route in said asynchronous communication network on the basis of said fixed length data when identifying that said fixed length data is fixed length data that is an object of a processing, including:

a termination information holding unit for holding termination information necessary to identify fixed length data that is to be terminated corresponding to a transmission route;

an identifying unit for identifying whether received fixed length data is data that is at least an object of the processing and an object of termination, and is alarm data for notifying of an alarm state of a transmission route and identifying in correspondence to said transmission route on the basis of the information in said registration information holding unit and said termination information holding unit;

an alarm managing unit for holding and managing alarm state information corresponding to said transmission route on the basis of said alarm data when said identifying unit identifies that said fixed length data is said alarm data;

an alarm data generating unit for generating alarm data to be notified to another fixed length data processing apparatus on the basis of said alarm state information held and managed in correspondence to said transmission route in said alarm managing unit; and an inserting process unit for inserting said alarm data generated by said alarm data generating unit to an empty region in a flow of fixed length data that is identified by said identifying unit as fixed length data not required to be terminated and should be passed through toward said another fixed length data processing apparatus.

5. The fixed length data processing apparatus according to claim 4, wherein said registration information holding unit is configured with a RAM.

6. The fixed length data processing apparatus according to claim 4, wherein said registration information holding unit holds said registration information according to an address based on at least said transmission route identification information, said identifying unit including an address generating unit for generating an address based on transmission route identification information of a received fixed length data; and wherein said fixed length data processing apparatus designates an address generated by said address generating unit to said registration information holding unit to read registration information necessary to identify said received fixed data from said registration information holding unit.

7. The fixed length data processing apparatus according to claim 6, wherein said address generating unit uses a part of said transmission route identification information according to the number of digits of an address of said registration information holding unit to generate an address to be designated to said registration information holding unit.

8. The fixed length data processing apparatus according to claim 4, wherein said termination information holding unit is configured with a RAM.

9. The fixed length data processing apparatus according to claim 4, wherein said termination information holding unit uses a part of said transmission route identification information as an address indicating a position in which said termination information is stored.

10. The fixed length data processing apparatus according to claim 4, wherein said transmission route is designated by a virtual path and a virtual channel belonging to said virtual path; and wherein said alarm managing unit comprises:
a virtual path alarm state holding unit for holding alarm state information for said virtual path in correspondence with apparatus identification information unique to each transmitting apparatus; and
a virtual channel alarm state holding unit for holding alarm state information for said virtual channel correspondingly to said apparatus identification information.

11. The fixed length data processing apparatus according to claim 10, wherein said virtual path alarm state holding unit and said virtual channel alarm state holding unit are configured with RAMs.

12. The fixed length data processing apparatus according to claim 10, wherein said alarm managing unit including a canceling process unit being able to cancel said alarm state information in said virtual path alarm state holding unit and said virtual channel alarm state holding unit.

13. The fixed length data processing apparatus according to claim 12, wherein each of said virtual path alarm state holding unit and said virtual channel alarm state holding unit holds elapsed time information including a time elapsed since said alarm state information is held; and wherein said canceling process unit monitors said elapsed time information in said virtual path alarm state information holding unit and said virtual channel alarm state holding unit to cancel alarm state information held over a predetermined time.

14. The fixed length data processing apparatus according to claim 12, wherein said canceling process unit cancels said alarm state information in said virtual path alarm state holding unit and said virtual channel alarm state holding unit when said identifying unit identifies reception of higher order alarm data having a higher notification priority than said alarm data.

15. The fixed length data processing apparatus according to claim 10, wherein said virtual path alarm state holding unit holds in combination with said alarm state information, generation time information defining a generate time interval for said alarm data in said alarm data generating unit; and wherein said alarm data generating unit generates said alarm data at predetermined time intervals according to said generate time information in said virtual path alarm state holding unit.

16. The fixed length data processing apparatus according to claim 12, wherein said alarm managing unit including a virtual path information holding unit for holding information on a virtual path to which belongs to a virtual channel that can be an object of cancellation of said alarm state information in said virtual channel alarm state holding unit;

wherein when said fixed length data processing apparatus receives alarm data for a virtual path having information on said virtual path held in said virtual path information holding unit, said canceling process unit cancels alarm state information, in said virtual channel alarm state holding unit, on a virtual channel belonging to said virtual path.

17. The fixed length data processing apparatus according to claim 16, wherein said virtual path information holding unit comprises a plurality of RAMs, and divides information on said virtual path into plural pieces to hold said information in said plurality of RAMs correspondingly to a plurality of virtual channel groups consisting of a plurality of virtual channels; and wherein said canceling process unit reads information on said virtual path from said plurality of RAMs within a predetermined cycle to collate whether alarm data for said virtual path has information on said virtual path held in said virtual path information holding unit.

18. The fixed length data processing apparatus according to claim 4, wherein said registration information holding unit holds alarm data generating information necessary to generate said alarm data in correspondence to said transmission route; and wherein said alarm data generating unit including an alarm state information detecting unit for detecting said alarm state information held and managed in correspondence to said transmission route in said alarm managing unit, and an alarm data generating information detecting unit for detecting said alarm data generating information necessary for said alarm data to be generated on the basis of said alarm state information detected by said alarm state information detecting unit in said registration information holding unit and to generate said alarm data on the basis of said alarm state information detected by said alarm state information detecting unit and said alarm data generating information detected by said alarm data generating information detecting unit.

19. The fixed length data processing apparatus according to claim 18, wherein when said fixed length data is handled in a predetermined transmitting apparatus, said registration information holding unit holds said alarm data generating information in correspondence to apparatus identification information unique to each transmitting apparatus; and wherein said alarm state information detecting unit and said alarm data generating information detecting unit perform said information detecting on the basis of said apparatus identification information correspondingly to said transmitting apparatus.

20. The fixed length data processing apparatus according to claim 4, wherein said identifying unit identifies whether received fixed length data is data to be discarded or not; and wherein said inserting process unit inserts said alarm data generated by said alarm data generating unit instead of fixed length data identified as data to be discarded by said identifying unit.

21. The fixed length data processing apparatus according to claim 4, wherein when said fixed length data is handled in a predetermined transmitting apparatus, said inserting process unit separately performs an inserting process to insert said alarm data on the basis of apparatus identification information unique to said transmitting apparatus correspondingly to said transmitting apparatus.

22. The fixed length data processing apparatus according to claim 18, wherein said data processing unit including an intervening control unit that arbitrates between duplication of at least an access timing from said identifying unit to said registration information in said registration information holding unit and an access timing from said alarm data generating unit to said alarm data generating information in said registration information holding unit according to predetermined priority.

* * * * *